US012467937B2

(12) United States Patent
Sun

(10) Patent No.: US 12,467,937 B2
(45) Date of Patent: Nov. 11, 2025

(54) APPARATUS FOR QUANTITATIVELY TREATING LIQUID

(71) Applicant: YUNZEHUITONG (Beijing) Technology Co., Ltd., Beijing (CN)

(72) Inventor: Chengzhang Sun, Beijing (CN)

(73) Assignee: YUNZEHUITONG (BEIJING) TECHNOLOGY CO., LTD., Beijing (CN)

( * ) Notice: Subject to any disclaimer, the term of this patent is extended or adjusted under 35 U.S.C. 154(b) by 308 days.

(21) Appl. No.: 18/246,623

(22) PCT Filed: Jan. 22, 2021

(86) PCT No.: PCT/CN2021/073383
§ 371 (c)(1),
(2) Date: Mar. 24, 2023

(87) PCT Pub. No.: WO2022/062283
PCT Pub. Date: Mar. 31, 2022

(65) Prior Publication Data
US 2023/0366905 A1   Nov. 16, 2023

(30) Foreign Application Priority Data
Sep. 24, 2020   (CN) .......................... 202011017846.8

(51) Int. Cl.
G01N 35/10   (2006.01)
B01L 3/00    (2006.01)
G01N 35/00   (2006.01)

(52) U.S. Cl.
CPC .... *G01N 35/1016* (2013.01); *B01L 3/502738* (2013.01); *B01L 2200/0605* (2013.01);
(Continued)

(58) Field of Classification Search
CPC ..... G01N 35/1016; G01N 2035/00237; G01N 2035/1039; G01N 25/1072; G01N 35/00;
(Continued)

(56) References Cited

U.S. PATENT DOCUMENTS 3,572,994 A    3/1971  Hochstrasser
2006/0002824 A1*  1/2006  Chang ................ G01N 35/1016
                                                    422/400
(Continued)

FOREIGN PATENT DOCUMENTS

CN   102607889   7/2012
CN   206847994   1/2018
(Continued)

OTHER PUBLICATIONS

International Search Report, issued in the corresponding PCT application No. PCT/CN2021/073383, dated Jun. 23, 2021, 9 pages.

Primary Examiner — Peter J Macchiarolo
Assistant Examiner — John M Royston
(74) Attorney, Agent, or Firm — HSML P.C.

(57) ABSTRACT

The present application relates to the field of liquid treatment, and discloses a solution for quantitatively treating a liquid. The solution includes: a container used for containing a liquid to be extracted or discharged; and a micro tubule including: a flow passage extending outwards from the interior of the container to a bifurcation point; a first by-pass communicating with the flow passage and extending from the bifurcation point to a first port; and a second by-pass communicating with the flow passage and extending from the bifurcation point to a second port. A peristaltic pump is disposed in series in at least one of the flow passage, the first by-pass and the second by-pass, and a cut-off valve or another peristaltic pump is disposed in series in at least another of the flow passage, the first by-pass and the second by-pass, so that a predetermined volume of liquid between (Continued)

1b-basic type the bifurcation point and the first port or the second port can be intercepted.

6 Claims, 35 Drawing Sheets

(52) U.S. Cl.
CPC ............... *B01L 2300/0627* (2013.01); *B01L 2400/0487* (2013.01); *G01N 35/00* (2013.01); *G01N 2035/00178* (2013.01); *G01N 2035/00237* (2013.01); *G01N 2035/1034* (2013.01); *G01N 2035/1039* (2013.01); *G01N 35/1072* (2013.01)

(58) Field of Classification Search
CPC .. G01N 2035/00178; G01N 2035/1034; B01L 3/502738; B01L 3/50273; B01L 2200/0605; B01L 2300/0627; B01L 2400/0487; B01L 2400/0622

USPC ..................................................... 73/864.81
See application file for complete search history.

(56) References Cited

U.S. PATENT DOCUMENTS

| 2006/0257992 | A1* | 11/2006 | McDevitt ............... B01L 9/527 435/287.2 |
| 2015/0072411 | A1* | 3/2015 | West ............... G01N 35/00029 435/309.1 |
| 2015/0238132 | A1* | 8/2015 | Lightman ........ A61B 5/150755 600/581 |

FOREIGN PATENT DOCUMENTS

| CN | 107860614 | 3/2018 |
| CN | 209327054 | 8/2019 |
| CN | 112362583 | 2/2021 |
| WO | 2010/108091 | 9/2010 |

* cited by examiner 3-basic type 4-basic type 7-basic type 8-basic type

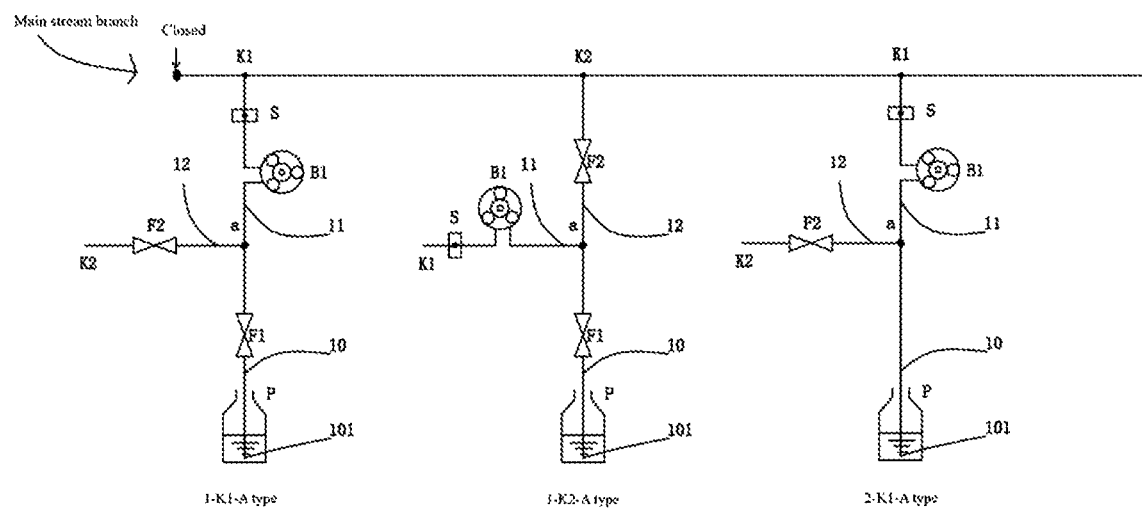
FIG. 11A (A type combined flow path)
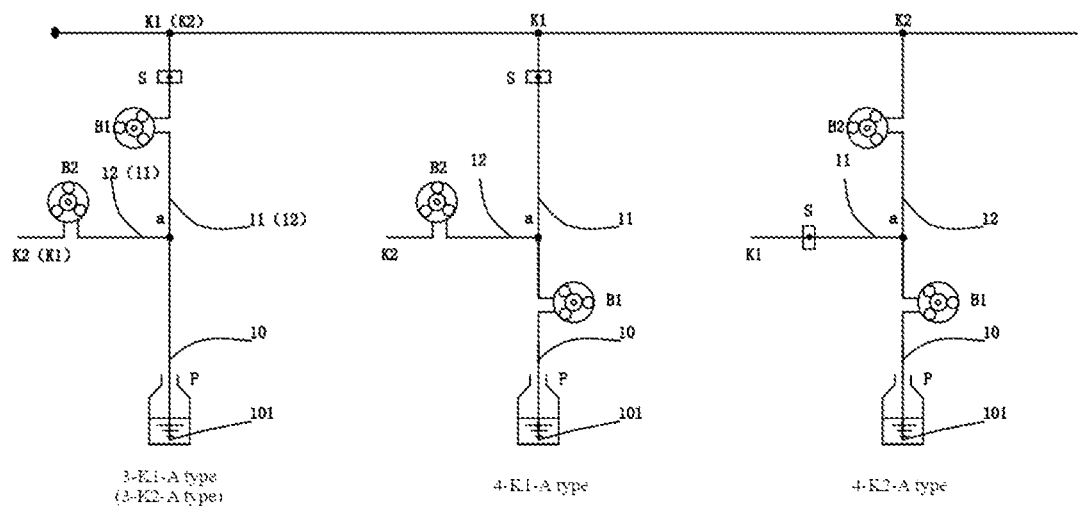
FIG. 11B (A type combined flow path)
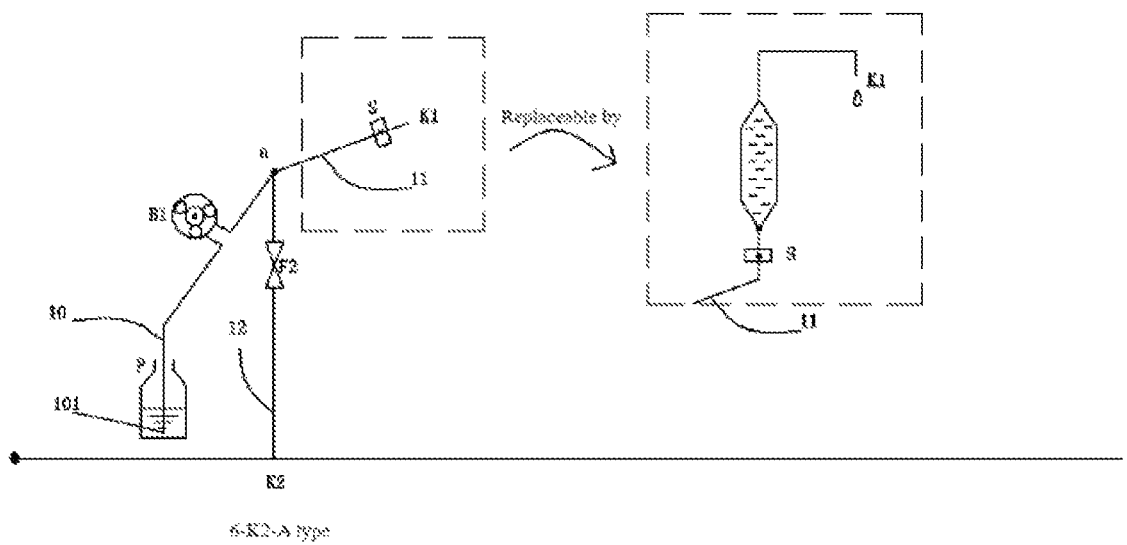
FIG. 11C (A type combined flow path)

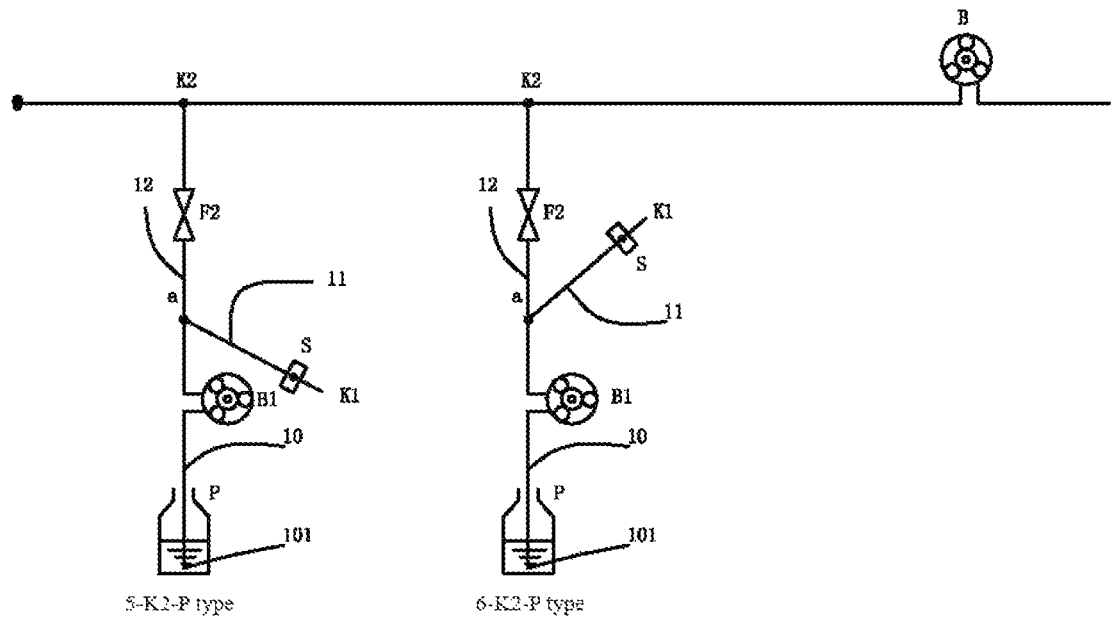
FIG. 12 (P type combined flow path)
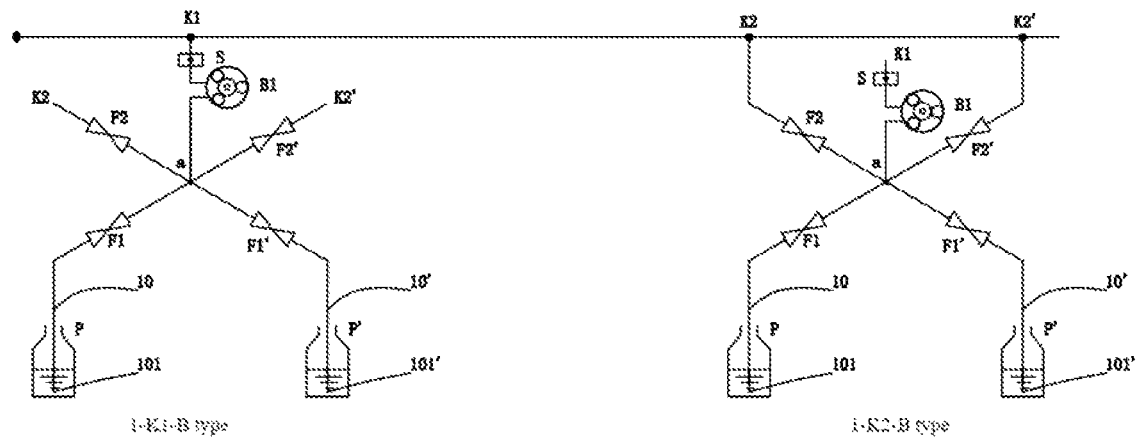
FIG. 13A (B type combined flow path)

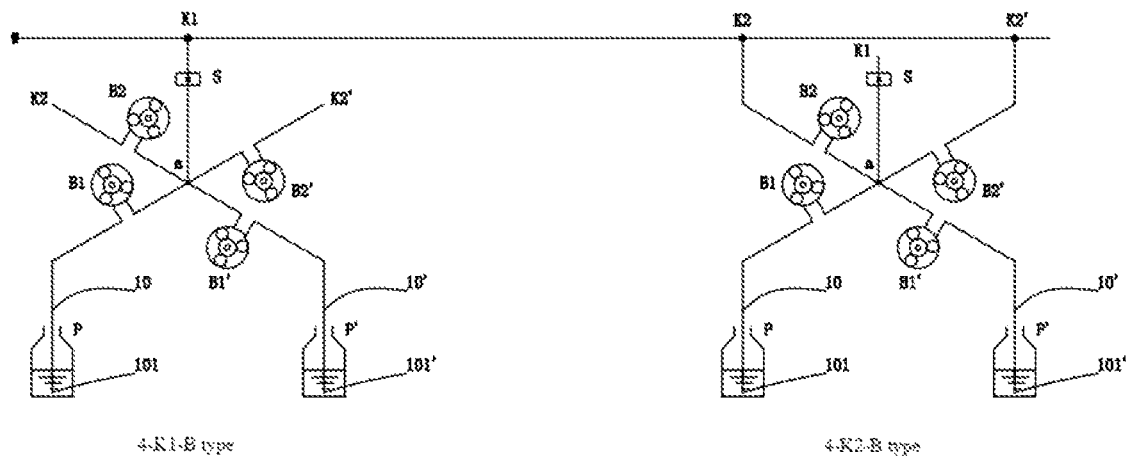
FIG. 13B (B type combined flow path)
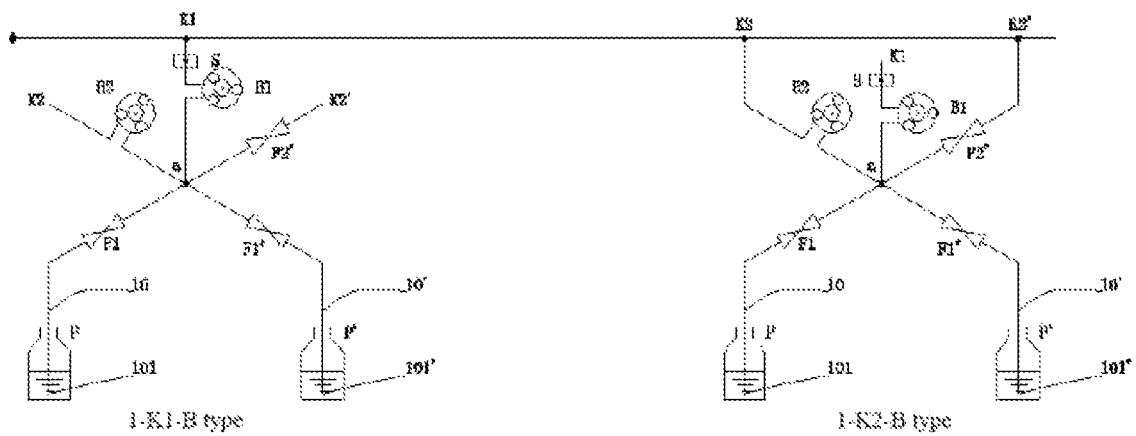
FIG. 13C (B type combined flow path)

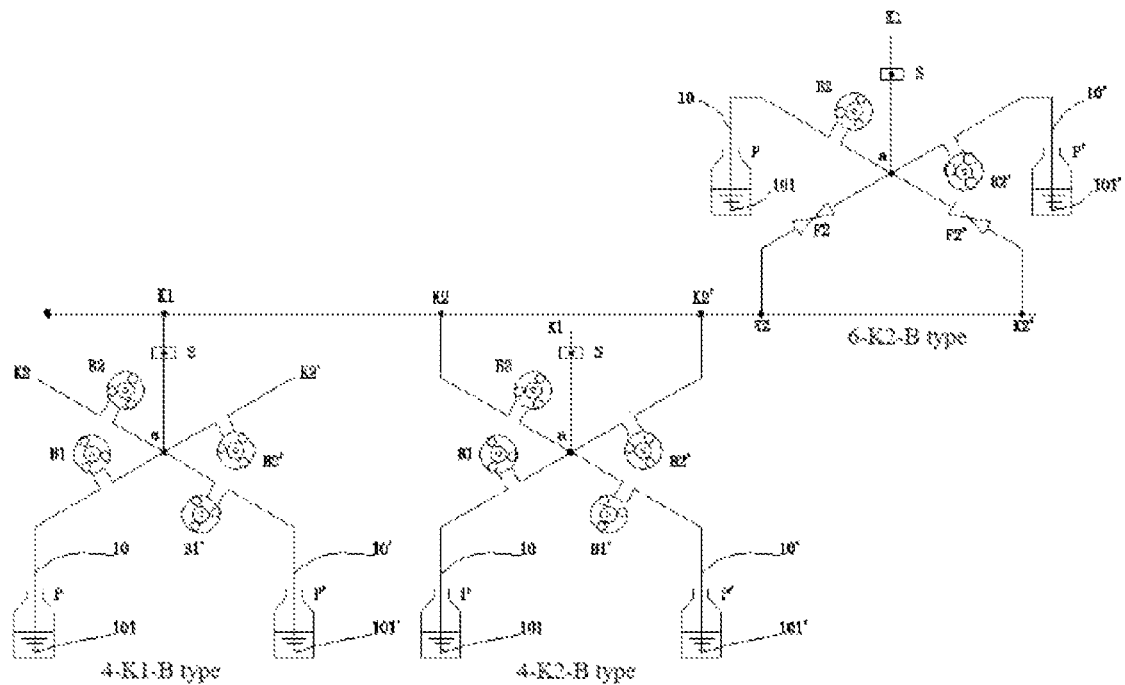
FIG. 13D (B type combined flow path)
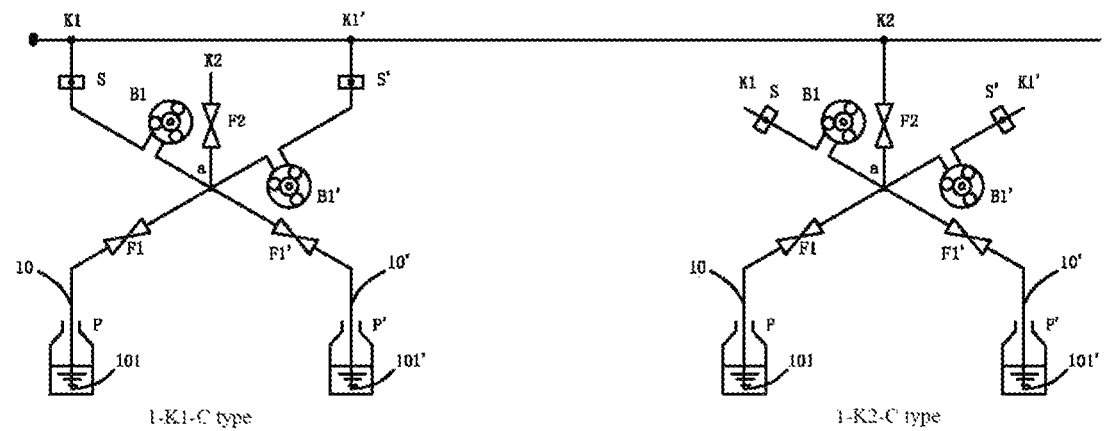
FIG. 14A (C type combined flow path)

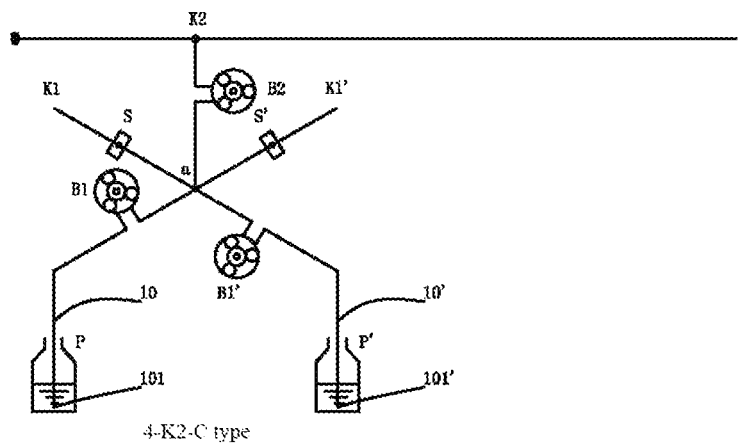
FIG. 14B (C type combined flow path)
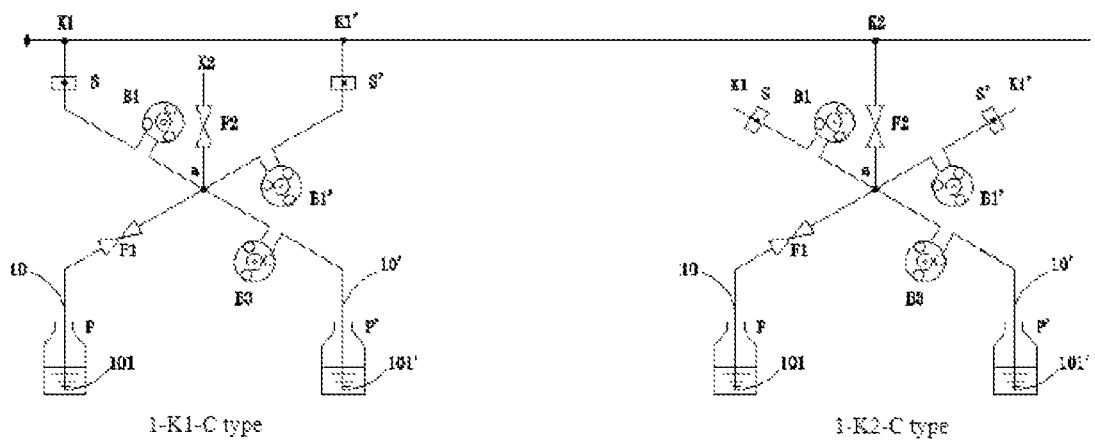
FIG. 14C (C type combined flow path)
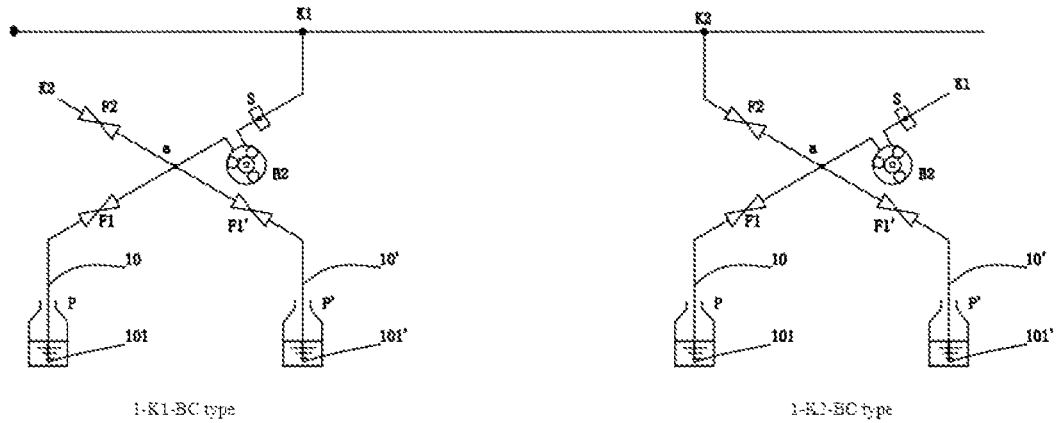
FIG. 15A (BC type combined flow path)

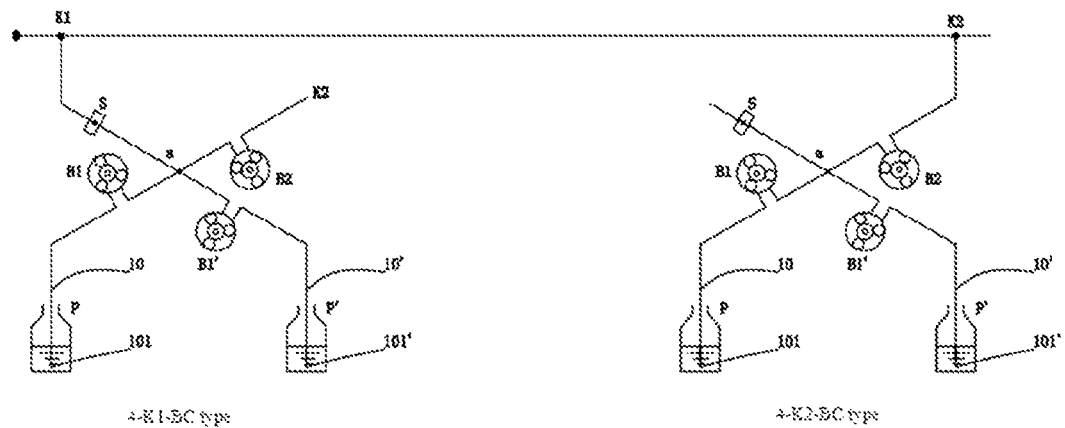
FIG. 15B (BC type combined flow path)
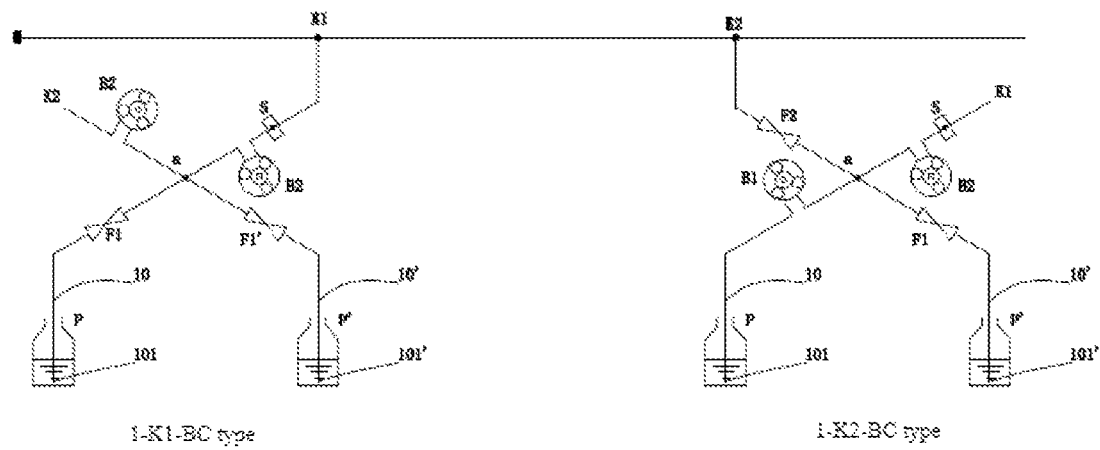
FIG. 15C (BC type combined flow path)

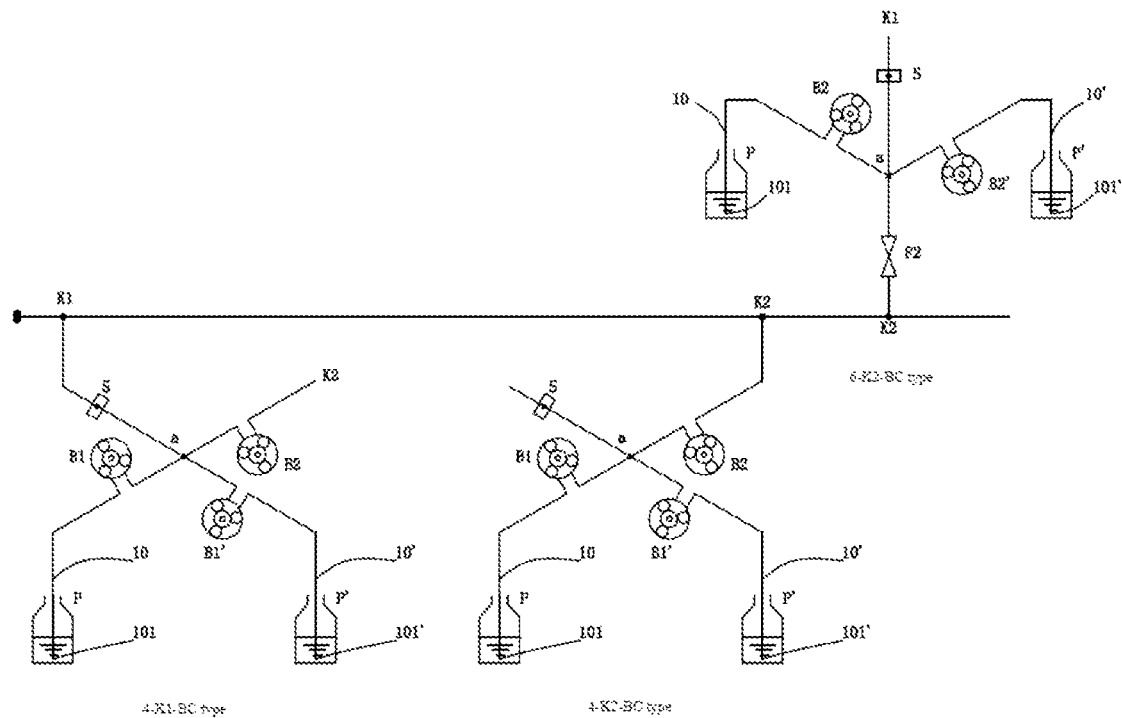
FIG. 15D (BC type combined flow path)
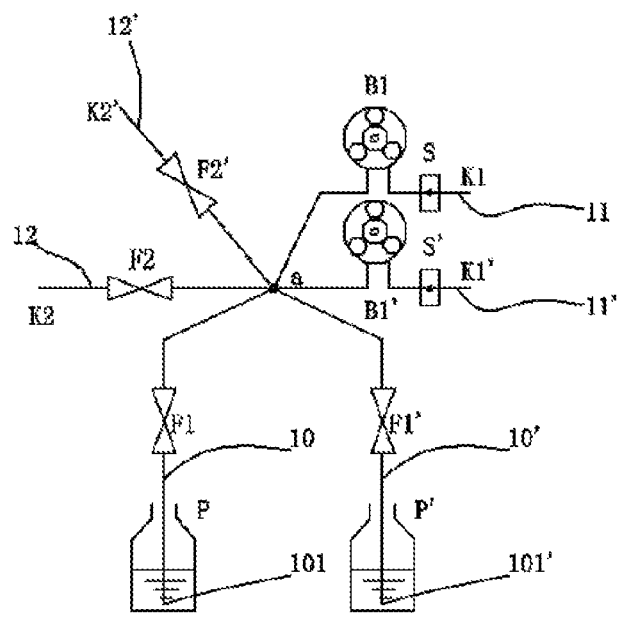
FIG. 16A (H type combined flow path)

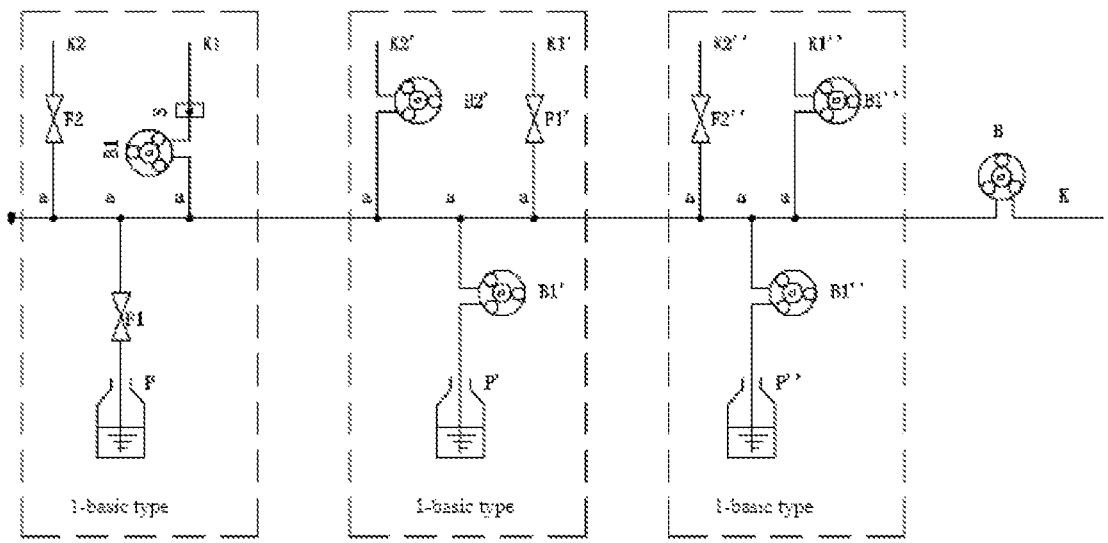
FIG. 16B (H type combined flow path)
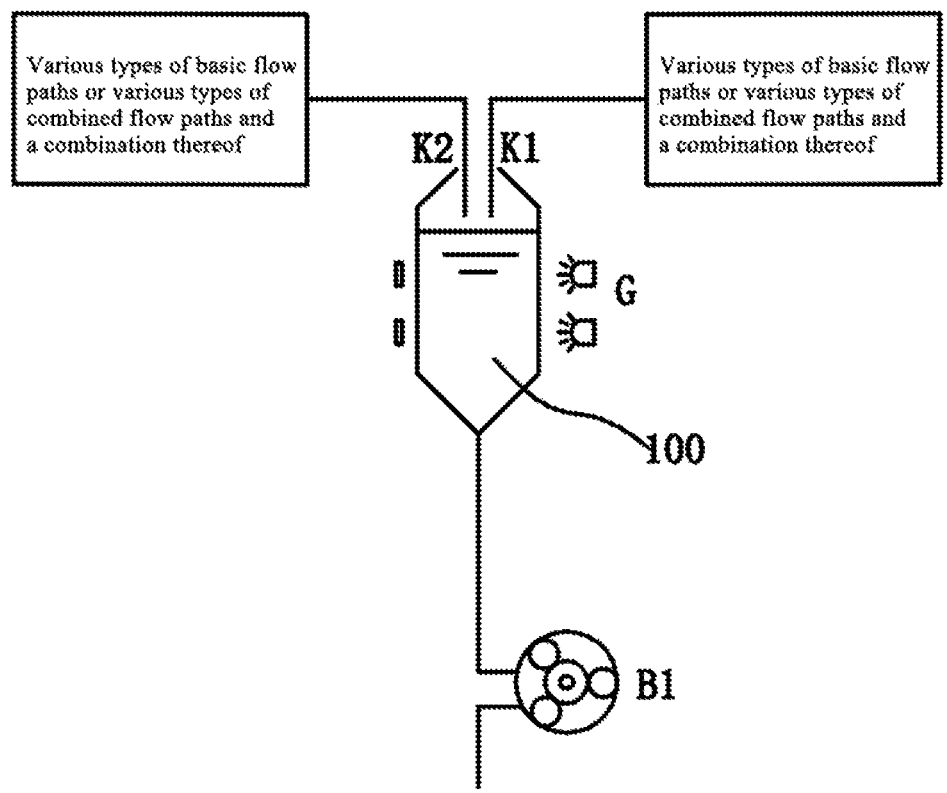
FIG. 17

APPARATUS FOR QUANTITATIVELY TREATING LIQUID

FIELD

The present application relates to the field of liquid treatment, analysis or detection, and specifically relates to an apparatus for quantitatively treating a liquid.

BACKGROUND

At present, treatment and/or analysis of liquids are involved in many technical fields. For example, in the fields of medical treatment, food, laboratory analysis, agriculture, forestry, animal husbandry, fishery, etc., samples to be tested and reagents need to be quantitatively treated for the analysis of the samples. As another example, for water quality detection in the field of environmental protection, it is necessary to intercept a quantified small test sample and carry out detection and analysis on the small test sample. The accuracy of the intercepted amount of a liquid to be tested has a vital direct impact on detection results. Once the test sample cannot be accurately intercepted or the sampling volume of the liquid cannot be known, a big error in the detection results will be caused.

Traditionally, many analytical instruments or liquid treatment apparatuses are capable of carrying out accurate liquid feeding in a small volume (such as 0.05 ml to 2 ml) range, but the object to be detected is usually a relatively clear and clean liquid subjected to pretreatments such as flocculation, sedimentation and filtration in a laboratory, and the cost of liquid pretreatment apparatuses and labor is usually high.

This traditional solution is difficult to meet the actual working conditions of the current industrial circles, because it is difficult to ensure the cleanliness of the liquid to be tested in some actual working conditions. On the other hand, once the liquid to be tested is pretreated, the cleaned liquid is obviously different from an actual liquid on the first spot (such as COD, total phosphorus, total nitrogen for water quality detection), which is likely to affect the accuracy of measurement, and even suspended substances or impurities in the liquid may block a pretreatment passage. As another example, for the field of on-line monitoring under severe working conditions, such as on-line detection for an electroplating treatment solution, a wet-process ore smelting solution, environmentally-friendly wastewater, etc., the traditional technical solution cannot realize the accurate quantitative detection of the harsh liquid to be tested under such working conditions. Especially, there is a lack of a quantification technology for a micro amount of (e.g. 0.05-2 ml) liquid, which can be easily maintained at a relatively low cost for a relatively long period of time or even requires no maintenance.

In addition, atypical quantitative metering flow path widely used at present in the fields of analytical instruments and liquid treatment is a metering technology of "sequentially injected" liquid intake. This flow path technology has good stability. However, in recent ten years, with the emergence of a series of new demanding requirements of instruments and equipment for low cost, high accuracy, and consideration of both micro-amount liquid intake (such as 0.05-2 ml) and conventional-amount liquid intake (such as 2-10 ml) as well as fast metering and detection, several congenital defects of the traditional metering technology of sequentially injected liquid intake have become increasingly obvious. For example, firstly, flow path devices in such a traditional apparatus are high in cost because of needing the use of a multi-channel switch valve (or valve set) and a metering and detection apparatus for liquid intake. Secondly, both liquid intake and liquid discharge need to be carried out sequentially in a transfer manner in a flow path solution of the traditional apparatus, so operation steps are complicated and will take a long time, which leads to relatively low overall working efficiency. Thirdly, a more serious defect is that if a water sample and several different reagents need to be taken in continuously in the detection procedure under certain working conditions, the flow path in the traditional solution has to meter the water sample and the reagents in turn according to the sequence; and sometimes, the passage needs to be fully cleaned for the intake of a next reagent, thus making the whole analysis procedure of the instrument consume too much time and seriously affecting the working efficiency. Finally, in the flow path of the traditional apparatus, the transfer passage has a long length of travel, which easily leaves the liquid remaining on walls or elsewhere inside guide tubes and devices, thus resulting in low measurement accuracy in treatment of micro-amount liquid.

In view of this, how to overcome at least part of the above-mentioned technical defects in the traditional solution at least to some extent has become an urgent technical problem to be solved in this field.

SUMMARY

The present application provides a novel solution for quantitatively treating a liquid. In order to achieve the above objective, the present application provides an apparatus for quantitatively treating a liquid. The apparatus includes: a container used for containing a liquid to be extracted; and a micro tubule including: a flow passage extending outwards from the interior of the container to a bifurcation point; a first by-pass communicating with the flow passage and extending from the bifurcation point to a first port; and a second by-pass communicating with the flow passage and extending from the bifurcation point to a second port. A peristaltic pump is disposed in series in at least one of the flow passage, the first by-pass and the second by-pass, and a cut-off valve or another peristaltic pump is disposed in series in at least another of the flow passage, the first by-pass and the second by-pass, so that a predetermined volume of liquid between the bifurcation point and the first port or the second port can be intercepted. The micro tubule has a pore diameter ranging from 0.05 mm to 5 mm, preferably from 0.1 mm to 3 mm, more preferably from 0.2 mm to 2 mm.

Preferably, the container is a container communicating with the atmosphere, and the flow passage extends outwards out of the container from the interior of the container.

Preferably, a first peristaltic pump or a third peristaltic pump is disposed in series in the flow passage and/or the first by-pass, a second peristaltic pump or a cut-off valve is disposed in series in the second by-pass, and the peristaltic pumps and/or the cut-off valve cooperate to enable the predetermined volume of liquid between the bifurcation point and the first port to flow out of the first port or the second port. In a working state, the first peristaltic pump is used to suck the liquid in the container and enable the liquid to overflow from the first port; and in a non-working state, both the first peristaltic pump and the second peristaltic pump are in a cut-off state.

Preferably, the first peristaltic pump is disposed in series in the first by-pass, the first cut-off valve is disposed in series in the flow passage, and the second cut-off valve or the second peristaltic pump is disposed in series in the second by-pass; or the first peristaltic pump is disposed in series in the first by-pass, the flow passage is a hollow tube, and the second cut-off valve or the second peristaltic pump is disposed in series in the second by-pass; or the first peristaltic pump is disposed in series in the first by-pass, the third peristaltic pump is disposed in series in the flow passage, and the second peristaltic pump or the second cut-off valve is disposed in series in the second by-pass; or the third peristaltic pump is disposed in series in the flow passage, the first cut-off valve is disposed in series in the first by-pass, and the second peristaltic pump or the second cut-off valve is disposed in series in the second by-pass; or the first by-pass is a hollow tube, the second peristaltic pump or the second cut-off valve is disposed in series in the second by-pass, and the first peristaltic pump is disposed in series in the flow passage.

In a preferred case, the first by-pass is a passage extending obliquely from the bifurcation point to the first port, preferably extending obliquely upwards or downwards.

Preferably, the first by-pass is provided with a liquid detector at a position close to the first port, and the predetermined volume of liquid between the bifurcation point and the first port is the liquid between the bifurcation point and the liquid detector; and/or the second by-pass is provided with a liquid detector at a position close to the second port, and the predetermined volume of liquid between the bifurcation point and the second port is the liquid between the bifurcation point and the liquid detector.

Preferably, the liquid between the bifurcation point and the liquid detector is the liquid from the bifurcation point to the predetermined offset point based on the liquid detector.

Preferably, the container is a closed container which does not communicate with the atmosphere. The closed container is connected with a pressurization apparatus for increasing the air pressure in the container. The flow passage extends outwards out of the container from the interior of the container.

Preferably, the first cut-off valve is disposed in series in the flow passage, the third peristaltic pump is disposed in series in the second by-pass, and the third peristaltic pump, the first cut-off valve and the pressurization apparatus cooperate to enable the predetermined volume of liquid between the bifurcation point and the first port to flow out of the first port or the second port.

Preferably, the second cut-off valve is disposed in series in the first by-pass, and the third peristaltic pump also serves as the pressurization apparatus.

Preferably, the pressurization apparatus is a heater disposed in the container, and the heater is used for heating air in the container; or the pressurization apparatus includes an auxiliary container communicating with the atmosphere, and the auxiliary container communicates with the container through a fourth peristaltic pump to pump the liquid in the auxiliary container into the container; or the pressurization apparatus includes the fourth peristaltic pump, and the liquid container communicates with the outside atmosphere through the fourth peristaltic pump.

Preferably, the first by-pass is provided with a liquid detector at a position close to the first port, and the predetermined volume of liquid between the bifurcation point and the first port is the liquid between the bifurcation point and the liquid detector; and/or an extension section extending downwards, preferably extending vertically downwards, is disposed at the first port.

Preferably, the liquid between the bifurcation point and the liquid detector is the liquid from the bifurcation point to the predetermined offset point based on the liquid detector.

According to the technical solution of the present application, the working characteristics of the micro tubule, the peristaltic pumps and/or the cut-off valves can be utilized, and at least some of the following beneficial technical effects can be realized.

For example, by adopting a combination mode of the micro tubule plus the peristaltic pumps and/or the cut-off valves, through simple control of the peristaltic pumps and the cut-off valves, the taken-in liquid to be metered can be conveniently filled into the selected volume-defining micro tubule so as to realize accurate volume defining by overflow. Meanwhile, possible bubbles at the beginning of liquid intake can be eliminated by overflow, thus realizing high-accuracy intake of micro-amount liquid. In a preferred case, in addition to accurately defining the volume of the liquid to be tested, the technical solution of the present application can also realize high-accuracy metering and rapid intake of the liquid, and transport the liquid having a high-accuracy volume into subsequent treating containers or procedures.

As another example, in the technical solution of the present application, the topology of the flow path is very simple, the types of required flow path devices are few, and the devices are simple, thus facilitating mold opening and mass production. For some flow paths, only devices of one type (i.e. peristaltic pumps) are needed besides the guide tubes, so the cost can be greatly reduced, the assembly in the manufacturing process is very simple, and the daily maintenance and repair in the use process are also very convenient.

In addition, in the technical solution of the present application, the (small and minisize) peristaltic pumps and cut-off valves which are currently used in the industrial field and have large output are mainly adopted. Meanwhile, the cheap micro tubule is used as a volume-defining tube. These components are not only cheap, but also have stable and reliable performance. Therefore, compared with the traditional solution, it can greatly reduce the cost and obtain good reliability.

In addition, in the technical solution of the present application, as mentioned above, high-accuracy volume-defined metering can be realized by using the flow path solution design. In a preferred case, a liquid intake operation having a higher accuracy can be realized by using the peristaltic pumps (tubes of the peristaltic pumps are directly connected to the micro tubule, so the peristaltic pumps can more easily eliminate the dead volume interference problem of residual liquid compared with the cut-off valves).

In addition, in the present application, not only various expanded and modular combinations of the flow path solution can be conveniently realized, but also a "concurrent micro-equivalent rapid liquid intake technology" similar to "cartridge loading" can be realized in part of combined flow path solutions: in the traditional sequential liquid intake manner (such as the "sequentially injected" liquid intake technology), since there are usually only one volume-defined metering apparatus and only one peristaltic pump, the water sample or reagents must be driven in turn by the peristaltic pump into the volume-defined metering apparatus and finally pushed or sucked into a specified container or passage; however, in the preferred embodiments of the present application, by using a "concurrent micro-equivalent rapid liquid intake technology" of a "reagent pre-loaded" type (such as FIGS. 21-24 showing an applied flow path, FIGS. 33-42, etc.), the water sample and various reagents can be pre-filled to the specified volume in their respective branches at the same time, then driven simultaneously or sequentially by the pump on each branch or driven sequentially by the pump in a main line passage, and injected into a reaction vessel, which greatly saves the overall time for completing metering and liquid intake of all the reagents and subsequent washing.

Moreover, the "sequentially injected" liquid intake technology needs to pump the water sample or reagents into a quantification tube at first for transfer and volume defining, and then pump the water sample or reagents in the quantification tube into a predetermined container (such as a colorimetric tube). After detection, the discharge of a waste liquid also needs a reverse process. Such operations take a long time and easily increase a risk of leaving the liquid on the flow path. However, in the preferred embodiments of the present application, no liquid storage unit is needed for the flow path, the flow path solution in each combined flow path can independently allow the liquid to be tested (such as a water sample) and reagents to directly enter for example the colorimetric tube open to the reaction container, operations of liquid delivery and volume metering can be simultaneously completed, and the liquid discharge is simpler since the liquid only needs to be discharged to a waste liquid port continuously and at a high speed. Moreover, due to the improvement of the metering accuracy, the volume of the liquid taken in by the present application is greatly reduced, and the length of travel for the flow path is also greatly shortened. Therefore, compared with the traditional manner, this will greatly shorten the liquid intake time and improve the working efficiency. Moreover, due to the reduction of core components such as a plunger pump and a metering and quantification tube, not only the cost is greatly reduced, but also the volume of the apparatus can be reduced, and miniaturization and portability can be realized.

Other features and advantages of the present application will be described in detail in the detailed description which follows.

BRIEF DESCRIPTION OF THE DRAWINGS

The accompanying drawings are included to provide a further understanding of the present application and constitute a part of the specification. They are used to explain the present application together with the specific implementations below, but are not intended to limit the present application. In the accompanying drawings:

FIG. 11A to FIG. 11C and FIG. 12 to FIG. 16 are schematic diagrams of various basic flow path combined solutions of an apparatus for quantitatively treating a liquid according to the present application respectively.

FIG. 17 to FIG. 43 are schematic diagrams of various reaction flow paths of an apparatus for quantitatively treating a liquid according to the present application respectively.

DETAILED DESCRIPTION OF THE EMBODIMENTS

Figure 1A:
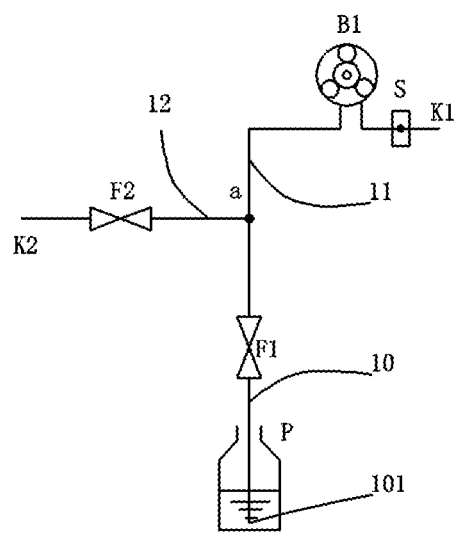
FIG. 1A to FIG. 1E and FIG. 2 to FIG. 10 are schematic diagrams of various basic flow path solutions of an apparatus for quantitatively treating a liquid according to the present application respectively.

In the technical solution of the present application, the basic flow paths, combinations of the basic flow paths and various applied flow paths of the apparatus for quantitatively treating the liquid are described emphatically. It can be understood that in practical engineering applications, various liquid flow control modes can be realized by combining the flow path solutions in the technical solution of the present application under the control of computer systems (for example, control units such as industrial personal computers, single-chip microcomputers, etc.) on various elements, and the selection of the control units and program designs may depend on the application in actual working conditions.

As mentioned above, the technical solution of the present application can be applied to various technical fields involving liquid treatment and/or analysis, such as the fields of medical treatment, food and laboratory analysis, but it is especially suitable to water quality detection and analysis in the field of environmental protection. For example, the technical solution of the present application is especially applicable to a water quality analyzer.

Specific embodiments of the present application will be described in detail below in conjunction with the accompanying drawings. It should be understood that the specific implementations described herein are merely illustrative of the present application and are not intended to limit the present application.

I. Definition of Terms

1. Micro Tubule

In the technical solution of the present application, the flow path adopts a micro tubule design. The micro tubule has a pore diameter ranging from 0.05 mm to 5 mm, preferably from 0.1 mm to 3 mm, more preferably from 0.2 mm to 2 mm, further preferably from 0.5 mm to 1.6 mm. In addition, in the whole flow path, the micro tubule generally has a uniform pore diameter. However, different pore diameters can also be designed in case that the accuracy is in an allowable range or in positions where components (such as peristaltic pumps or cut-off valves) are disposed.

A material for the micro tubule includes, but not limited to a variety of rubber, plastics or metals. Commonly used tubes include silicone rubber tubes, fluororubber tubes, polytetrafluoroethylene tubes, etc.

In the technical solution of the present application, the micro tubule design is adopted for the following reasons.

As mentioned above, the use of the micro tubule (in combination with the simple control of peristaltic pumps and/or cut-off valves) can not only realize high-accuracy volume defining of micro-amount liquid, but also realize high-accuracy intake of micro-amount liquid (such as 0.1-2 ml). By way of example, if a micro tubule with a pore diameter of 0.5 mm and a length of 500 mm is used for volume defining, the technical solution of the present application can easily realize volume-defined metering of about 100 µl (0.1 ml) of sewage with an accuracy up to +/−2 µl, and then the high-accuracy volume-defined liquid can be transported out without residue. In addition, due to the adoption of the micro tubule, a liquid sample with a smaller volume can be treated and used for the subsequent detection work, thus greatly reducing the cost of consumed reagents.

Figure 44:
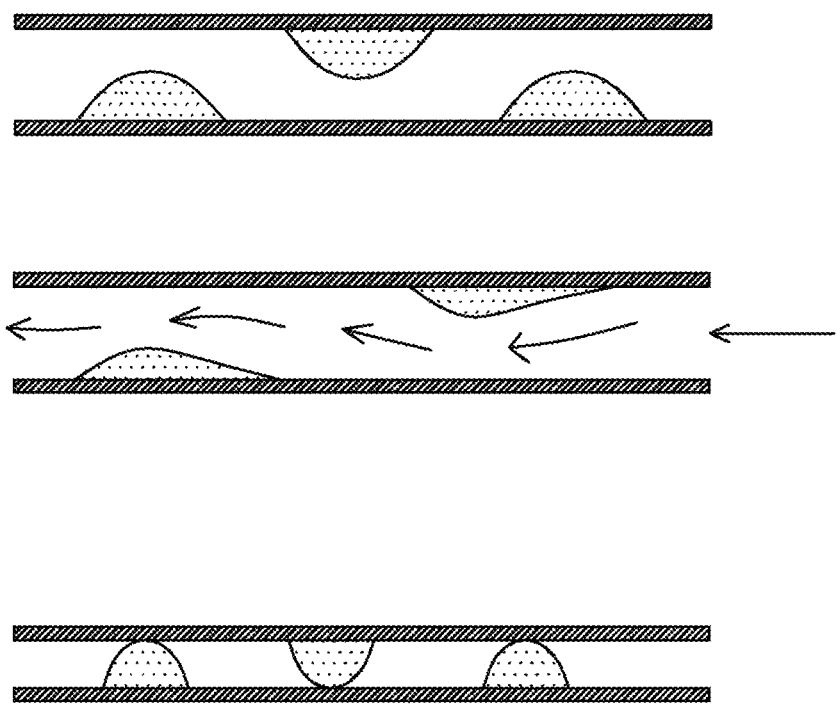
FIG. 44 is a principle schematic diagram showing the technical advantages of a micro tubule used in the technical solution of the present application when in use.

More importantly, in the field of on-line monitoring under severe working conditions, the use of the micro tubule (with an inner diameter optimally selected as 0.5-1.6 mm) also has 3 outstanding advantages below: I. The micro tubule is convenient to plug/unplug and repair, and the cost of regular replacement is very low, which is especially important for on-line monitoring instruments under severe working conditions. II. For a roughly filtered liquid, such a tube diameter can basically avoid passage blockage caused by possible suspended substances or impurities in the liquid and ensure the working stability of the flow path. III. When the guide tube is slim enough, its inner diameter will be smaller than the height of droplets formed inside the guide tube due to surface tension and infiltration; at this time, the liquid will naturally converge and then close the micro tubule; and under the drive of a pump, the liquid can be slowly fed into a target container, thus avoiding or reducing the amount of stagnant or residual liquid in the passage which will affect the accuracy. If the diameter of the guide tube is designed to be too large, after the liquid passes through the guide tube, the liquid remaining on the inner wall of the passage is difficult to remove by gas blown in from the outside, because in this case, the maximum radial size of the droplets of the residual liquid is difficult to reach the height of the inner diameter of the passage, so even if the gas is introduced, it is difficult to completely remove the residual liquid on the inner wall of the passage due to the existence of the above gaps, as shown in FIG. 44. In the technical solution of the present application, by selecting the above-mentioned pore size range of the micro tubule, the maximum radial size of the droplets formed by the final convergence of the residual liquid on the inner wall of the passage can reach or exceed the height of the inner diameter of the passage (as shown in FIG. 44). Therefore, an introduced fluid (such as liquid or gas) can be used to more thoroughly remove the residual liquid on the inner wall of the passage, and at the same time, the defect that too many impurities of the liquid to be tested in the field of online monitoring under severe working conditions may easily block the passage can be avoided.

It can be understood that although the present application emphasizes the use of the micro tubule, it does not mean excluding other non-micro tubule devices which can compose various complex combined channels in the present application, such as a combination of passages with larger pore diameters. Under the condition of not affecting the realization of the inventive purpose of the present application, a passage with a larger pore diameter can also be used locally, such as a thick volume-defining tube (see FIGS. 29-32) when it is necessary to define a conventional volume of more than 2 ml, and a thick tube connected to a liquid discharge port for discharging the waste liquid. In this way, it is not only flexible in wiring and low in cost, but also convenient for maintenance in later use. The micro tubule may part of be a micro tubule device such as an organic multi-branch board, or a microfluidic chip trench.

2. Peristaltic Pump

In the technical solution of the present application, a peristaltic pump is broadly defined as a device or a combination of devices having a peristaltic pump function. Unless otherwise specified, it generally refers to a device or a combination of devices which can drive a liquid in both forward and reverse directions (sometimes only enabling its driving function in certain a direction) and can cut off and close the passage when being at rest. The above-mentioned peristaltic pump in a broad sense includes but not limited to the following several specific devices or a combination of the devices: a peristaltic pump in a narrow sense, a cut-off valve and a pump which can drive a fluid in both forward and reverse directions (sometimes only enabling its driving function in certain a direction) or a series combination of pump sets (such as a combination of several diaphragm pumps, centrifugal pumps, etc.), etc.

3. Cut-Off Valve

In the technical solution of the present application, a cut-off valve is broadly defined as a device or a combination of devices having a function of cutting off and closing certain a passage, including but not limited to the following several specific devices: a diaphragm type two-way cut-off valve, a two-way pinch valve (二通夹管阀), a peristaltic pump in a narrow sense (equivalent to closing when being at rest and opening when rotating), a two-way or multi-way rotary switch valve, etc.

4. 1-from-N Multi-Channel Valve (where N is a Natural Number Greater than or Equal to 2)

In the technical solution of the present application, a 1-from-N multi-channel valve is broadly defined as a device or a combination of devices. The device or the combination of devices has one common port and N distribution ports, and the common port may uniquely turn on one of the N distribution ports or not turn on any distribution port through control signals. The above-mentioned 1-from-N multi-channel valve in a broad sense includes but not limited to the following several specific devices or a combination of the devices: a valve set composed of N cut-off valves connected to the same common port, a multi-port rotary switch valve (see FIG. 35), other valve sets consisting of a plurality of cut-off valves and a plurality of multi-channel switch valves, etc.

II. Basic Flow Path Solution

As shown in FIG. 1A to FIG. 1E and FIG. 2 to FIG. 10, the present application provides an apparatus for quantitatively treating a liquid (according to a basic flow path solution). The apparatus includes:

a container P, the container P being used for containing a liquid to be extracted; and a micro tubule, the micro tubule including:

a flow passage 10, the flow passage 10 extending outwards from the interior of the container P to a bifurcation point a;

a first by-pass 11, the first by-pass 11 communicating with the flow passage 10 and extending from the bifurcation point a to a first port K1; and a second by-pass 12, the second by-pass 12 communicating with the flow passage 10 and extending from the bifurcation point a to a second port K2;

a peristaltic pump B1 is disposed in series in at least one of the flow passage 10, the first by-pass 11 and the second by-pass 12, and a cut-off valve F1, F2 or another peristaltic pump B2 is disposed in series in at least another of the flow passage 10, the first by-pass 11 and the second by-pass 12, so that a predetermined volume of liquid between the bifurcation point a and the first port K1 or the second port K2 can be intercepted. The micro tubule has a pore diameter ranging from 0.05 mm to 5 mm, preferably from 0.1 mm to 3 mm, more preferably from 0.2 mm to 2 mm.

The container P is used for containing a liquid to be treated or analyzed. The container P can be made of various suitable materials, such as glass or plastics. The capacity of the container P can be selected and designed according to specific working conditions. Generally, the maximum capacity of the container P is 100-2000 ml. In addition, the container P can be open, that is, communicating with the atmosphere; and it can also be closed, that is, not directly communicating with the atmosphere. These two forms will be described in detail respectively in the following embodiments.

The flow passage 10 has one end located in the container P and extend outwards to the bifurcation point a. From the bifurcation point a, the flow passage 10 is divided into the first by-pass 11 and the second by-pass 12. The first by-pass 11 has the first port K1, and the second by-pass 12 has the second port K2.

In order to accurately acquire a liquid sample to be treated or detected, the peristaltic pump B1 is disposed in series in at least one of the flow passage 10, the first by-pass 11 and the second by-pass 12, and the cut-off valve F1, F2 or another peristaltic pump B2 is disposed in series in at least another of the flow passage 10, the first by-pass 11 and the second by-pass 12, so that the predetermined volume of liquid between the bifurcation point a and the first port K1 or the second port K2 can be intercepted. Specifically, the peristaltic pump is disposed in series in at least one of the flow passage 10, the first by-pass 11 and the second by-pass 12, and the cut-off valve or another peristaltic pump is disposed on at least another of the flow passage, the first by-pass and the second by-pass. The peristaltic pump serves as a power source for sucking or pushing the liquid. When rotating to operate, the peristaltic pump can draw the liquid from the container P and can also pump out the liquid which is subjected to accurate volume defining. Meanwhile, when stopping rotating, the peristaltic pump can also achieve a cut-off function. Therefore, the cooperation of the peristaltic pump and the cut-off valve can accurately cut off the predetermined volume of the liquid sample between the bifurcation point a and the first port K1 or the second port K2, thereby realizing accurate acquisition of the liquid sample. Hereinafter, the interception process will be described in detail.

There are many preferred embodiments according to the technical solution based on the innovative ideas of the present application, mainly characterized by multiple permutation and combination modes between the flow passage 10, first by-pass 11 and second by-pass 12 and the peristaltic pump and cut-off valve. Specifically, any one of peristaltic pump arrangement, cut-off valve arrangement and no-element (hollow tube) arrangement can be selected for each of the flow passage 10, the first by-pass 11 and the second by-pass 12, so there are 3*3*3=27 combination modes in total. Meanwhile, combination modes in which the flow passage 10, the first by-pass 11 and the second by-pass 12 each adopt the cut-off valve arrangement and each adopt the no-element arrangement need to be excluded (because these two combination modes are not applicable), so there are 25 combination modes in total. These combination modes are all within the scope of the present application.

Hereinafter, the structural composition, connection relationship, operation process and technical advantages of the embodiments will be described respectively in conjunction with each preferred embodiment exemplarily illustrated in the accompanying drawings.

FIG. 1A to FIG. 1E and FIG. 2 to FIG. 10 mainly describe various embodiments of an individual apparatus. For the convenience of explanation, the present application stipulates the subsequent definition of naming for each type of basic flow path. The name is divided into two parts which are connected by a "-" sign. For example, "1A-basic type" represents a basic flow path shown in FIG. 1A, "2-basic type" represents a basic flow path shown in FIG. 2, and so on. In addition, since there are five variations of the basic type in FIG. 1A to FIG. 1E (their principles are the same or similar), we use the "1-basic type" to represent the five basic flow paths shown in FIG. 1A to FIG. 1E, and explanation will be carried out by generally taking the "1A-basic type" as an example.

Next, the structural composition and connection relationship of various types of basic flow paths will be explained.

For the sake of brevity, the description of the basic type in the present application only schematically depicts some of the basic flow paths.

As shown in FIG. 1A to FIG. 1E and FIG. 2 to FIG. 6, the basic flow path may have various connection forms.

Figure 1B:
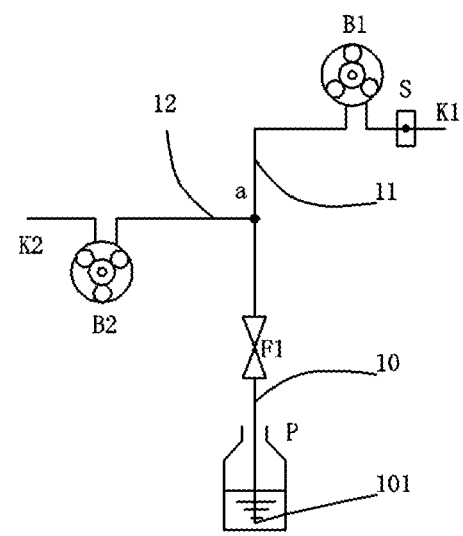

As shown in FIG. 1A and FIG. 1B, the first peristaltic pump B1 is disposed in series in the first by-pass 11, the first cut-off valve F1 is disposed in series in the flow passage 10, and the second cut-off valve F2 or the second peristaltic pump B2 is disposed in series in the second by-pass 12.

Figure 1C:
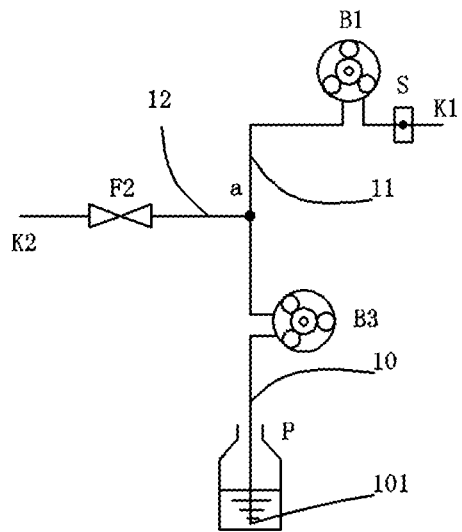
Figure 1D:
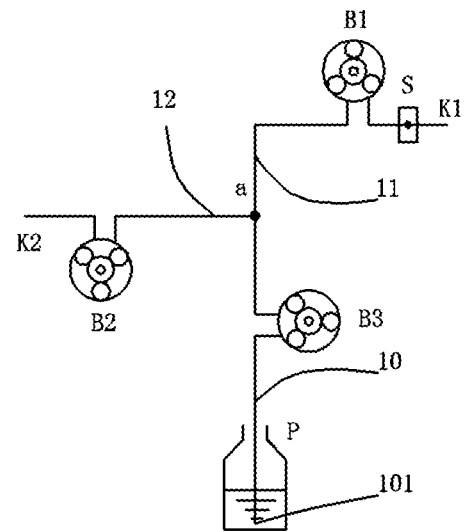

As shown in FIG. 1C and FIG. 1D, the first peristaltic pump B1 is disposed in series in the first by-pass 11, a third peristaltic pump B3 is disposed in series in the flow passage 10, and the second peristaltic pump B2 or the second cut-off valve F2 is disposed in series in the second by-pass 12.

Figure 1E:
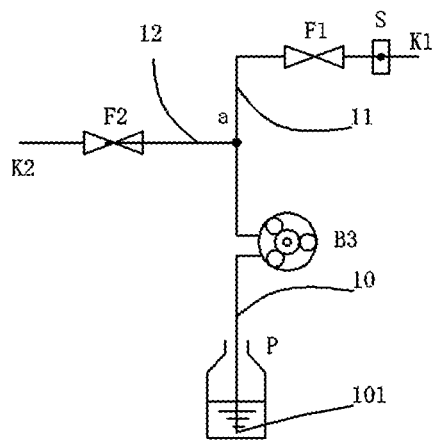

As shown in FIG. 1E, the third peristaltic pump B3 is disposed in series in the flow passage 10, the first cut-off valve F1 is disposed in series in the first by-pass 11, and the second peristaltic pump B2 (not shown) or the second cut-off valve F2 is disposed in series in the second by-pass 12.

Figure 2:
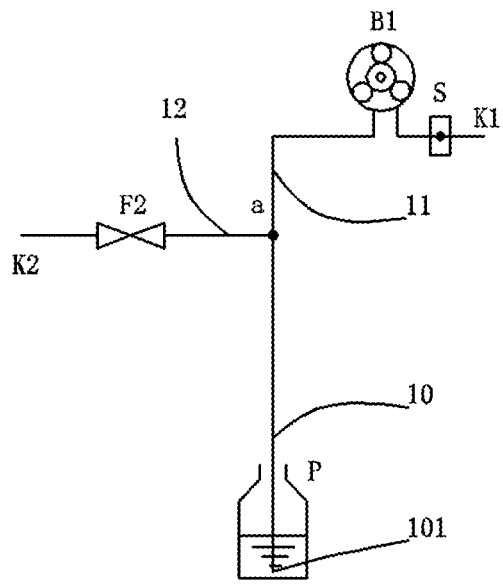
Figure 3:
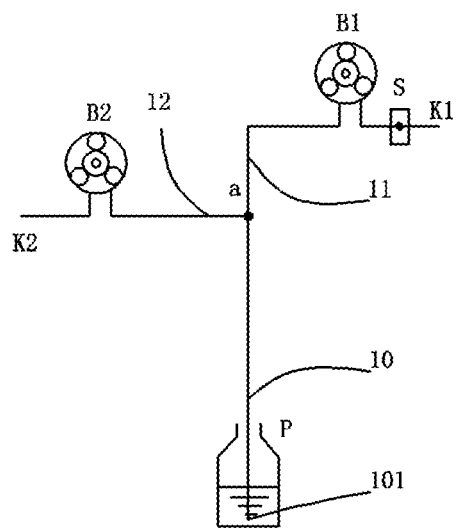

As shown in FIG. 2 and FIG. 3, the first peristaltic pump B1 is disposed in series in the first by-pass 11, the flow passage 10 is a hollow tube, and the second cut-off valve F2 or the second peristaltic pump B2 is disposed in series in the second by-pass 12.

Figure 4:
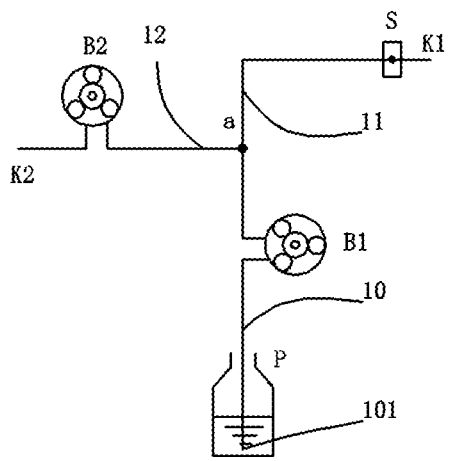
Figure 5:
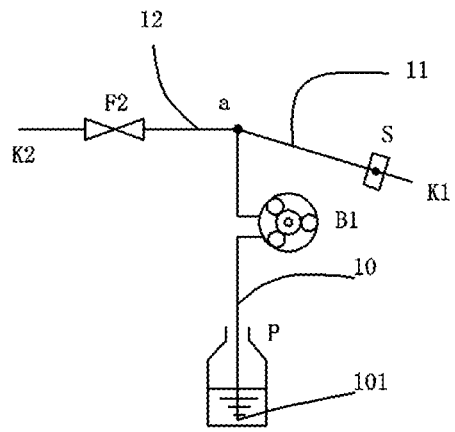
Figure 6:
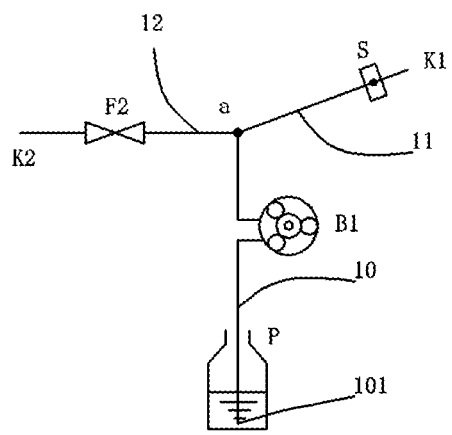

As shown in FIG. 4 to FIG. 6, the first by-pass 11 is a hollow tube, the second peristaltic pump B2 or the second cut-off valve F2 is disposed in series in the second by-pass 12, and the first peristaltic pump B1 is disposed in series in the flow passage 10.

The basic flow path shown in FIG. 1A to FIG. 1E and FIG. 2 to FIG. 10 will be described in more detail below.

Embodiment I

As shown in FIG. 1A to FIG. 1E, the structural composition and connection relationship of the apparatus for quantitatively treating a liquid conform to the following solution.

The container P is used for containing a liquid to be extracted. The container P is a container communicating with the atmosphere. The flow passage 10 of the micro tubule extends outwards (preferably extending upwards) out of the container P from the interior of the container P and extends to the bifurcation point a. At the bifurcation point a, the flow passage 10 is divided into the first by-pass 11 and the second by-pass 12. The first by-pass 11 extends from the bifurcation point a to the first port K1, and the second by-pass 12 extends from the bifurcation point a to the second port K2.

One peristaltic pump or cut-off valve is disposed in series in each of the flow passage 10, the first by-pass 11 and the second by-pass 12, and one peristaltic pump is disposed in series on at least one of the flow passage 10, the first by-pass 11 and the second by-pass 12. Several different "1-basic type" flow paths will be described below:

For the "1A-basic type" basic flow path as shown in FIG. 1A, the first cut-off valve F1 is disposed in series in the flow passage 10, the first peristaltic pump B1 is disposed in series in the first by-pass 11, and the second cut-off valve F2 is disposed in series in the second by-pass 12.

The working process of the embodiment shown in FIG. 1A is as follows.

First, the first cut-off valve F1 is opened, and the second cut-off valve F2 is kept closed. Then, the first peristaltic pump B1 is rotated clockwise (with the orientation shown in the figure as a reference but not as a limitation to the present application). At this time, the liquid in the container P enters the flow passage 10 under the drawing action of the first peristaltic pump B1, travels through the first cut-off valve F1 and the first peristaltic pump B1, and then overflows through the first port K1 to be discharged.

Then, the first cut-off valve F1 is closed, the second cut-off valve F2 is opened, and the first peristaltic pump B1 is rotated counterclockwise. At this time, air blows in from the first port K1, so that a defined volume of liquid in the tube between the bifurcation point a and the first port K1 can be taken out from the opening K2. Alternatively, the first peristaltic pump B1 is rotated clockwise, then air blows in from the second port K2, so that the defined volume of liquid in the tube between the bifurcation point a and the first port K1 is taken out from the first port K1.

For the "1B-basic type" basic flow path as shown in FIG. 1B, the main difference from the "1A-basic type" basic flow path shown in FIG. 1A lies in that the second cut-off valve F2 is replaced by the second peristaltic pump B2. Therefore, when being at rest, the second peristaltic pump B2 can achieve a cut-off function. By adopting a liquid intake operation procedure of the "1A-basic type" flow path, the liquid can be metered and subjected to volume defining in a first by-pass tube or a second by-pass tube. When the defined volume of liquid in the tube between the bifurcation point a and the first port K1 or the second port K2 needs to be taken out, the first peristaltic pump B1 and the second peristaltic pump B2 can be enabled to rotate in the same direction but at different speeds, so that the liquid is taken out from the first port K1 or the second port K2. In this solution, the devices on the first by-pass 11 and the second by-pass 12 are preferably designed to be interchangeable, but they can also be different peristaltic pumps.

For the "1C-basic type" basic flow path as shown in FIG. 1C, the main difference from the "1A-basic type" basic flow path shown in FIG. 1A lies in that the first cut-off valve F1 is replaced by the third peristaltic pump B3. Therefore, when being at rest, the third peristaltic pump B3 can achieve a cut-off function. By adopting the liquid intake operation procedure of the "1A-basic type" flow path, the liquid can be metered and subjected to volume defining in the first by-pass tube or the second by-pass tube. When the defined volume of liquid in the tube between the bifurcation point a and the first port K1 or the second port K2 needs to be taken out, the first peristaltic pump B1 and the third peristaltic pump B3 can be enabled to rotate in the same direction but at different speeds, so that the liquid is taken out from the first port K1 or the second port K2.

For the "1D-basic type" basic flow path as shown in FIG. 1D, the main difference from the "1A-basic type" basic flow path shown in FIG. 1A lies in that the first cut-off valve F1 and the second cut-off valve F2 are respectively replaced by the third peristaltic pump B3 and the second peristaltic pump B2. Therefore, when being at rest, the second peristaltic pump B2 or the third peristaltic pump B3 can achieve a cut-off function. By adopting the liquid intake operation procedure of the "1A-basic type" flow path, the liquid can be metered and subjected to volume defining in the first by-pass tube or the second by-pass tube. When the defined volume of liquid in the tube between the bifurcation point a and the first port K1 or the second port K2 needs to be taken out, the first peristaltic pump B1 and the second peristaltic pump B2 can be enabled to rotate in the same direction but at different speeds, so that the liquid is taken out from the first port K1 or the second port K2.

For the "1e-basic type" basic flow path as shown in FIG. 1E, the third peristaltic pump B3 is disposed in series in the flow passage 10, the first cut-off valve F1 is disposed in series in the first by-pass 11, and the second cut-off valve F2 is disposed in series in the second by-pass 12.

The working process of the embodiment shown in FIG. 1E is as follows.

First, the first cut-off valve F1 is opened, and the second cut-off valve F2 is kept closed. Then, the third peristaltic pump B3 is rotated counterclockwise (with the orientation shown in the figure as a reference but not as a limitation to the present application). At this time, the liquid in the container P enters the flow passage 10 under the drawing action of the third peristaltic pump B3, travels through the third peristaltic pump B3 and the first cut-off valve F1, and then overflows through the first port K1 to be discharged.

Then, the first cut-off valve F1 is opened, the first peristaltic pump B1 is kept at rest, and the second cut-off valve F2 is opened. At this time, air blows in from the first port K1, so that the defined volume of liquid in the tube between the bifurcation point a and the first port K1 is taken out from the second port K2 under the action of gravity. Similarly, due to the design of the micro tubule, when the third peristaltic pump B3 is kept at rest and the second cut-off valve F2 is closed, the defined volume of liquid in the tube between the bifurcation point a and the first port K1 will not flow downwards by itself, but will flow out by itself under the action of gravity when the second cut-off valve F2 is opened.

It can be known from the above description that, since the peristaltic pump has a working condition of rotating in both directions, it can be used to suck the liquid in the container P and discharge the liquid from the corresponding end opening. The various types of basic flow paths in FIG. 1 have the following characteristics: at least one peristaltic pump or cut-off valve must be connected in series on each of the flow passage, the first by-pass and the second by-pass, and one peristaltic pump must be connected in series on one of the flow passage, the first by-pass and the second by-pass.

According to the embodiments shown in FIG. 1A to FIG. 1E, the predetermined volume of a liquid sample can be extracted at high working efficiency, and the accuracy of the volume of the acquired liquid sample is relatively high. Moreover, because the pore diameter of the micro tubule is small, the volume of the intercepted liquid sample is relatively small. By adjusting the lengths of the first by-pass 11 and the second by-pass 12, the volume of the liquid to be intercepted can be determined. This method is also applicable to other embodiments below.

Embodiment II

As shown in FIG. 2, the structural composition and connection relationship of the apparatus for quantitatively treating a liquid conform to the following solution.

The container P is used for containing a liquid to be extracted. The container P is a container communicating with the atmosphere. The flow passage 10 of the micro tubule extends outwards (preferably extending upwards) out of the container P from the interior of the container P and extends to the bifurcation point a. At the bifurcation point a, the flow passage 10 is divided into the first by-pass 11 and the second by-pass 12. The first by-pass 11 extends from the bifurcation point a to the first port K1, and the second by-pass 12 extends from the bifurcation point a to the second port K2.

As shown in FIG. 2, no component is disposed in series in the flow passage 10, the first peristaltic pump B1 is disposed in series in the first by-pass 11, and the second cut-off valve F2 is disposed in series in the second by-pass 12.

The working process of the embodiment shown in FIG. 2 is as follows.

First, the second cut-off valve F2 is kept closed. Then, the first peristaltic pump B1 is rotated clockwise (with the orientation shown in the figure as a reference but not as a limitation to the present application). At this time, the liquid in the container P enters the flow passage 10 under the drawing action of the first peristaltic pump B1, travels through the first peristaltic pump B1, and then overflows through the first port K1 to be discharged.

Then, the first peristaltic pump B1 is kept at rest (equivalent to a cut-off state), and the second cut-off valve F2 is opened. At this time, air blows in from the second port K2, so that the liquid between the bifurcation point a and the container P flows back into the container P under the action of gravity, and the defined volume of liquid in the tube between the bifurcation point a and the first port k1 is kept at rest due to cut-off of the peristaltic pump B1 as well as surface tension and swelling-shrinkage resistance of the liquid.

Subsequently, the first peristaltic pump B1 is rotated clockwise, then since the airflow resistance at the second port K2 is smaller than gravity to be overcome for rise of the liquid in the guide tube in the container P, air blows in from the second port K2, so that the defined volume of liquid in the tube between the bifurcation point a and the first port k1 is taken out from the first port K1.

It can be known from the above description that the technical solution of the present application can be realized at low cost by utilizing the pore diameter characteristics of the micro tubule in conjunction with the physical effects of gravity as well as swelling-shrinkage resistance and surface tension of the liquid.

Embodiment III

For the preferred Embodiment III as shown in FIG. 3, the main difference from the Embodiment II shown in FIG. 2 lies in that the second cut-off valve F2 is replaced by the second peristaltic pump B2. Therefore, when being at rest, the second peristaltic pump B2 can achieve a cut-off function. When the defined volume of liquid in the tube between the bifurcation point a and the first port K1 needs to be taken out, the first peristaltic pump B1 and the second peristaltic pump B2 can be enabled to rotate in the same direction but at different speeds, so that the liquid is taken out from the first port K1 or the second port K2.

Embodiment IV

As shown in FIG. 4, the structural composition and connection relationship of the apparatus for quantitatively treating a liquid conform to the following solution.

The container P is used for containing a liquid to be extracted. The container P is a container communicating with the atmosphere. The flow passage 10 of the micro tubule extends outwards (preferably extending upwards) out of the container P from the interior of the container P and extends to the bifurcation point a. At the bifurcation point a, the flow passage 10 is divided into the first by-pass 11 and the second by-pass 12. The first by-pass 11 extends from the bifurcation point a to the first port K1, and the second by-pass 12 extends from the bifurcation point a to the second port K2.

As shown in FIG. 4, the first peristaltic pump B1 is disposed in series in the flow passage 10, no device is disposed in series in the first by-pass 11, and the second peristaltic pump B2 is disposed in series in the second by-pass 12.

The working process of the embodiment shown in FIG. 4 is as follows.

First, the second peristaltic pump B2 is kept at rest. Then, the first peristaltic pump B1 is rotated counterclockwise (with the orientation shown in the figure as a reference but not as a limitation to the present application). At this time, the liquid in the container P enters the flow passage 10 under the drawing action of the first peristaltic pump B1, travels through the first peristaltic pump B1 and the bifurcation point a, and then overflows through the first port K1 to be discharged.

Then, the first peristaltic pump B1 is kept at rest (equivalent to a cut-off state), and the second peristaltic pump B2 is rotated counterclockwise. At this time, air blows in from the first port K1, so that the defined volume of liquid in the tube between the bifurcation point a and the first port K1 is taken out from the second port K2. Alternatively, the second peristaltic pump B2 is rotated clockwise, then air blows in from the second port K2, so that the defined volume of liquid in the tube between the bifurcation point a and the first port K1 is taken out from the first port K1.

It can be known from the above description that, by using an at-rest cut-off working condition and a working condition of rotating in both directions of the two peristaltic pumps, the predetermined liquid sample can be intercepted from the first port K1 or the second port K2 as required.

Embodiment V and Embodiment VI

As shown in FIG. 5 and FIG. 6, the structural composition and connection relationship of the apparatus for quantitatively treating a liquid conform to the following solution.

The container P is used for containing a liquid to be extracted. The container P is a container communicating with the atmosphere.

The flow passage 10 of the micro tubule extends outwards (preferably extending upwards) out of the container P from the interior of the container P and extends to the bifurcation point a.

At the bifurcation point a, the flow passage 10 is divided into the first by-pass 11 and the second by-pass 12. The first by-pass 11 extends from the bifurcation point a to the first port K1, and the second by-pass 12 extends from the bifurcation point a to the second port K2. The first by-pass 11 is a passage extending obliquely from the bifurcation point a to the first port K1, preferably extending obliquely upwards or downwards. The oblique angle of the oblique passage relative to the horizontal plane can be selected and designed according to working conditions of a specific application, such as ranging between 30 degrees and 90 degrees, or preferably about 45 degrees.

As shown in FIG. 5 and FIG. 6, the first peristaltic pump B1 is disposed in series in the flow passage 10, no component is disposed in series in the first by-pass 11, and the second cut-off valve F2 is disposed in series in the second by-pass 12.

The working processes of the embodiments shown in FIG. 5 and FIG. 6 are as follows.

First, the second cut-off valve F2 is kept closed. Then, the first peristaltic pump B1 is rotated counterclockwise (with the orientation shown in the figure as a reference but not as a limitation to the present application). At this time, the liquid in the container P enters the flow passage 10 under the drawing action of the first peristaltic pump B1, travels through the first peristaltic pump B1 and the bifurcation point a, and then overflows through the first port K1 to be discharged.

Then, in the working condition shown in FIG. 5, the first peristaltic pump B1 is kept at rest, and the second cut-off valve F2 is opened. At this time, air blows in from the second port K2, so that the defined volume of liquid in the tube between the bifurcation point a and the first port K1 flows out from the first port K1 under the action of gravity. In this situation, due to the design of the micro tubule, when the first peristaltic pump B1 is kept at rest and the second cut-off valve F2 is closed, the defined volume of liquid in the tube between the bifurcation point a and the first port K1 will not flow downwards by itself, but will flow out by itself under the action of gravity when the second cut-off valve F2 is opened.

Whereas in the working condition shown in FIG. 6, the first peristaltic pump B1 is kept at rest, and the second cut-off valve F2 is opened. At this time, air blows in from the first port K1, so that the defined volume of liquid in the tube between the bifurcation point a and the first port K1 flows out from the second port K2 under the action of gravity. Similarly, due to the design of the micro tubule, when the first peristaltic pump B1 is kept at rest and the second cut-off valve F2 is closed, the defined volume of liquid in the tube between the bifurcation point a and the first port K1 will not flow downwards by itself, but will flow out by itself under the action of gravity when the second cut-off valve F2 is opened.

It can be known from the above description that, by simply utilizing an at-rest cut-off function of the peristaltic pump and the oblique design of the branch as well as the design of the micro tubule, the accurate volume of the liquid sample can be conveniently intercepted and collected by gravity.

The above embodiments are not exhaustive of various combinations under the technical solution of the present application. For example, in different embodiments, when no flow path device is disposed, the branches and the flow passage can be formed in the form of a hollow tube. In some embodiments described above, the flow passage 10 can be designed as a hollow tube. However, in other embodiments, the first by-pass 11 and/or the second by-pass can be designed as a hollow tube. For the working processes of embodiments which are not listed or illustrated in the accompanying drawings of the specification of the present application, reference can be naturally made to the detailed description of the structures and working processes of the various embodiments described above.

In the above embodiments, the container P is a container communicating with the atmosphere. However, in some working conditions having strict requirements for highly corrosive reagents, volatile reagents or a volatile water sample, the container P is designed as a closed container which does not directly communicate with the atmosphere, as shown in FIG. 7 to FIG. 10. This closed container can be obtained by injecting the liquid into the container first and then sealing it. The closed container is connected with a pressurization apparatus for increasing the air pressure in the container, and the flow passage 10 extends outwards out of the container P from the interior of the container P. It will be described in detail below in conjunction with FIG. 7 to FIG. 10.

Embodiment VII

Figure 7:
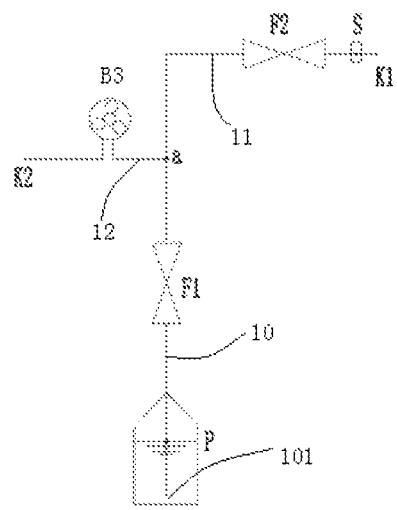

As shown in FIG. 7, the structural composition and connection relationship of the apparatus for quantitatively treating a liquid conform to the following solution.

The container P is used for containing a liquid to be extracted. The container P is a closed container which does not directly communicate with the atmosphere.

The flow passage 10 of the micro tubule extends outwards (preferably extending upwards) out of the container P from the interior of the container P and extends to the bifurcation point a. At the bifurcation point a, the flow passage 10 is divided into the first by-pass 11 and the second by-pass 12. The first by-pass 11 extends from the bifurcation point a to the first port K1, and the second by-pass 12 extends from the bifurcation point a to the second port K2.

As shown in FIG. 7, the first cut-off valve F1 is disposed in series in the flow passage 10, the second cut-off valve F2 is disposed in series in the first by-pass 11, and the third peristaltic pump B3 is disposed in series in the second by-pass 12.

The working process of the embodiment shown in FIG. 7 is as follows.

First, the first cut-off valve F1 is opened, and the second cut-off valve F2 is closed. The third peristaltic pump B3 is rotated clockwise, so that air enters the container P from the second port K2 through the first cut-off valve F1 to carry out pressurization. Therefore, at this time, the third peristaltic pump B3 functions as the pressurization apparatus.

Then, the first cut-off valve F1 is closed, and the third peristaltic pump B3 is kept at rest (cut-off). Then, the first cut-off valve F1 and the second cut-off valve F2 are opened. At this time, the liquid in the container P enters the flow passage 10 under the action of internal pressure, travels through the first cut-off valve F1 and the second cut-off valve F2, and then overflows through the first port K1 to be discharged.

Subsequently, the first cut-off valve F1 is closed, and the third peristaltic pump B3 is rotated clockwise. Then, air blows in from the second port K2, so that the defined volume of liquid in the tube between the bifurcation point a and the first port K1 is pushed out from the first port K1. Alternatively, the third peristaltic pump B3 is rotated counterclockwise, then air blows in from the first port K1, so that the defined volume of liquid in the tube between the bifurcation point a and the first port K1 is pushed out from the second port K2.

Embodiment VIII

Figure 8:
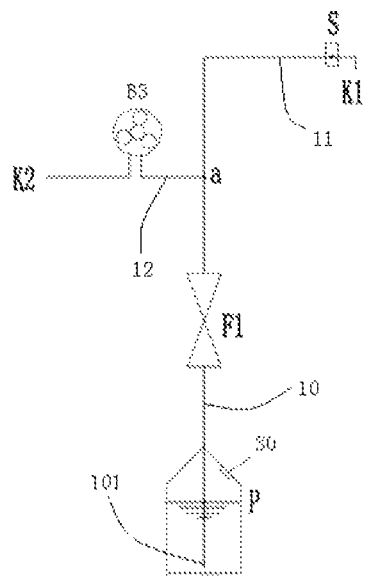

As shown in FIG. 8, the structural composition and connection relationship of the apparatus for quantitatively treating a liquid conform to the following solution.

The container P is used for containing a liquid to be extracted. The container P is a closed container which does not directly communicate with the atmosphere. The pressurization apparatus is a heater 30 disposed in the container, and the heater is used for heating air in the container.

The flow passage 10 of the micro tubule extends outwards (preferably extending upwards) out of the container P from the interior of the container P and extends to the bifurcation point a. At the bifurcation point a, the flow passage 10 is divided into the first by-pass 11 and the second by-pass 12. The first by-pass 11 extends from the bifurcation point a to the first port K1, and the second by-pass 12 extends from the bifurcation point a to the second port K2.

As shown in FIG. 8, the first cut-off valve F1 is disposed in series in the flow passage 10, no component is disposed in series in the first by-pass 11, and the third peristaltic pump B3 is disposed in series in the second by-pass 12.

The working process of the embodiment shown in FIG. 8 is as follows.

First, the first cut-off valve F1 is opened, and the third peristaltic pump B3 is at rest. The heater 30 heats and pressurizes the air in the container P. At this time, the liquid in the container P enters the flow passage 10 under the action of internal pressure, travels through the first cut-off valve F1 and the bifurcation point a, and overflows through the first port K1 to be discharged.

Subsequently, the first cut-off valve F1 is closed, and the third peristaltic pump B3 is rotated clockwise. Then, air blows in from the second port K2, so that the defined volume of liquid in the tube between the bifurcation point a and the first port K1 is pushed out from the first port K1. Alternatively, the third peristaltic pump B3 is rotated counterclockwise, then air blows in from the first port K1, so that the defined volume of liquid in the tube between the bifurcation point a and the first port K1 is pushed out from the second port K2.

In this embodiment, a cooler is preferably disposed. When the predetermined volume of the liquid sample is intercepted, the air in the container P can be cooled, so that the liquid between the bifurcation point a and an end opening 101 of the flow passage 10 flows back into the container P, thereby facilitating the next liquid interception operation.

Embodiments IX and X

Figure 9:
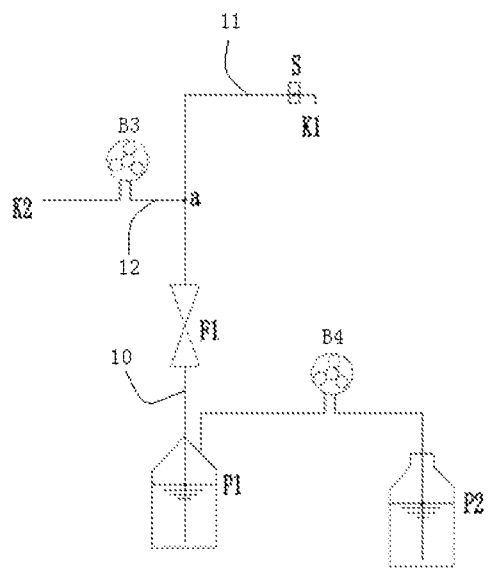
Figure 10:
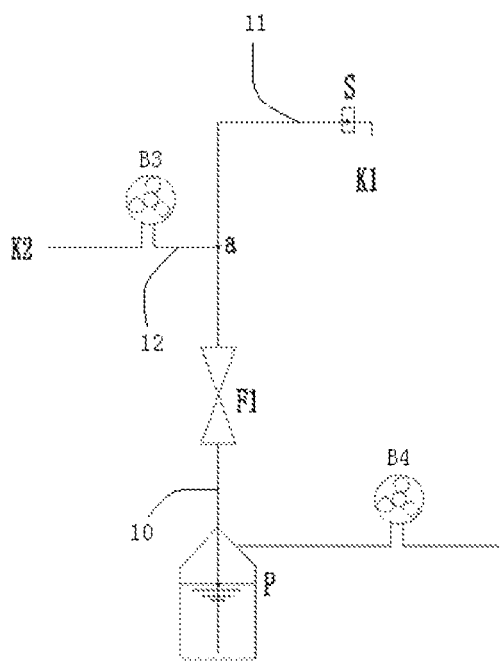

The main difference between the Embodiment IX shown in FIG. 9 and FIG. 10 and the Embodiment VIII shown in FIG. 8 lies in the pressurization apparatus.

In the Embodiment X, as shown in FIG. 10, the pressurization apparatus includes a fourth peristaltic pump B4, and the liquid container P directly communicates with the outside atmosphere through the fourth peristaltic pump B4. However, in the Embodiment IX, as shown in FIG. 9, the fourth peristaltic pump B4 can be connected with another auxiliary container P2 (containing the same liquid) communicating with the atmosphere to pump the liquid in the auxiliary container P2 into the container P, so as to realize pressurization.

For other working processes for intercepting the predetermined volume-defined liquid sample, reference can be made to the Embodiment VIII.

The above embodiments are not exhaustive of various combinations under the technical solution of the present application. For example, the peristaltic pump can also be disposed in series in the flow passage 10, and the peristaltic pump or the cut-off valve can be disposed in series in the second by-pass or the first by-pass. The peristaltic pump and the cut-off valve cooperate with the pressurization apparatus to enable the predetermined volume of the liquid sample between the bifurcation point a and the first port K1 to flow out of the first port K1 or the second port K2.

The embodiments of the closed container have been described above, and the above embodiments can be selected and applied according to specific working conditions.

In addition, as shown in the figure, in a preferred case, the first by-pass 11 is provided with a liquid detector S at a position close to the first port K1, and the predetermined volume of liquid between the bifurcation point a and the first port K1 is the liquid between the bifurcation point a and the liquid detector S. The liquid detector S can be any sensor suitable for judging the existence of a liquid, so as to judge whether the liquid exists or reaches the position where the liquid detector S is located.

By disposing the liquid detector S, it is unnecessary to determine the volume capacity by making the liquid have to flow out of the first port K1. That is to say, in the embodiment provided with the liquid detector S, a more flexible volume of the liquid sample from the bifurcation point a to somewhere near the liquid detector S can be intercepted. At the same time, because the overflow of the liquid is not needed, waste can be prevented. Further preferably, the liquid between the bifurcation point a and the liquid detector S is the liquid from the bifurcation point a to a predetermined offset point based on the liquid detector S. The distance from the predetermined offset point can be controlled by an algorithm of liquid intake through the flow path (for example, related to the flowing speed of the liquid, or related to whether the liquid contains bubbles or the length and volume of the bubbles), so that various uncertain factors during liquid intake (the bubbles, the flowing speed of the liquid, pulsed liquid intake errors of the peristaltic pump during liquid intake) can be subjected to error compensation, to obtain a more accurate predetermined volume of the liquid sample. It can be understood that, in the technical solution of the present application, the liquid detector S can also be disposed at a position close to the second port K2 in the second by-pass 12. It can be understood that the technical features of the liquid detector S can be applied to various basic flow paths in the present application, and are not limited to the embodiments illustrated in the accompanying drawings of the specification of the present application.

In a preferred case, an extension section (not shown) extending downwards, preferably extending vertically downwards, is disposed at the first port K1 to avoid the interference of the uncertain factors with volume-defined interception when the liquid overflows at the outlet of the micro tubule, thereby further improving the volume defining accuracy.

FIG. 1A to FIG. 1E and FIG. 2 to FIG. 10 mainly describe various embodiments of the basic flow path. According to further preferred embodiments, the individual basic flow paths can be appropriately permuted and combined, so as to be suitable for working occasions of multiple containers P containing the same or different liquids. Combined apparatus solutions formed by the combination of the individual basic flow paths will be described in detail below.

In addition, it can be understood that the main advantage of the above-mentioned basic flow paths over the traditional technology is that the flow path solution of combining the micro tubule with the peristaltic pump and/or the cut-off valve can realize high-accuracy volume defining and push with the characteristics of high working efficiency, very low cost and flexible combination (in-series, serial or in-parallel, parallel).

III. Combined Flow Path Solution

As mentioned above, each basic flow path includes five elements: the first port K1, the second port K2, the first by-pass 11, the second by-pass 12 and the bifurcation point a. According to different working conditions and liquid intake requirements, the above types of basic flow paths can be combined in different ways to obtain different combined flow path solutions.

For the convenience of explanation, the present application stipulates the subsequent definition of naming for each connection mode from each type of basic flow path to a main stream branch. The name is divided into three parts which are connected by "-" signs, such as "1-K1-B" type. The naming is specifically defined as follows:

The first part of the name represents a basic flow path being used. If the basic flow path in one of FIG. 1A to FIG. 1E is used, the part of the name is designated as "1"; if the basic flow path in FIG. 2 is used, the part of the name is designated as "2"; and so on. It should be noted that there are five variants of the basic flow path in FIG. 1, but their principles are the same, so we use the "1A-basic type" flow path as an example. Generally, we uniformly use "1" for naming in the combined flow path, unless special statements are needed.

The second part of the name identifies a connection point of the basic flow path and the main stream branch. If the connection point is the first port K1, the part of the name is designated as "K1"; if the connection point is the second port K2, the part of the name is designated as "K2"; if the connection point is the bifurcation point a, the part of the name is designated as "a"; and so on.

The third part of the name identifies how the various types of basic flow paths are merged and connected to the main stream branch. Different merging modes are defined as follows:

A type means that various types of basic flow paths are independent and connected to the main stream branch in parallel, which is identified as "A", as shown in FIG. 11A and FIG. 11B. FIG. 11C only exemplarily shows one basic flow path, but it can be understood that a plurality of basic flow paths can also be connected in parallel.

P type means that various types of combined flow paths are independent and connected to the main stream branch in parallel, but one peristaltic pump B needs to be configured on the main stream branch to better drive fluid metering and liquid intake. This type of combined flow path is identified as "P", as shown in FIG. 12.

B type means that the first by-passes 11 of the basic flow paths of the same type or different types are merged and shared, and then connected to the main stream branch through the first port K1 or the second port K2. This type of combined flow path is identified as "B", as shown in FIG. 13A to FIG. 13D.

C type means that the second by-passes 12 of the basic flow paths of the same type or different types are merged and shared, and then connected to the main stream branch through the first port K1 or the second port K2. This type of combined flow path is identified as "C", as shown in FIG. 14A to FIG. 14C.

BC type means that the first by-passes 11 and the second by-passes 12 of the basic flow paths of the same type or different types are merged and shared, and then connected to the main stream branch through the first port K1 or the second port K2. This type of combined flow path is identified as "BC", as shown in FIG. 15A to FIG. 15D.

H type means that the bifurcation points a of various types of basic flow paths are merged and shared, and directly connected to the main stream branch through the point a, where one peristaltic pump or cut-off valve is connected in series on the main stream branch; or one of some of the first by-passes or the second by-passes in the basic flow paths are directly used as the main stream branch. This type of combined flow path is identified as "H", as shown in FIG. 16.

It should be indicated that the naming of the so-called A type, B type, C type, BC type, P type and H type is merely used for distinguishing the flow path solutions of different forms, and does not constitute a limitation to the protection scope of the present application. The naming manner for the above-mentioned flow path solution is also applicable to flow path solutions shown in other accompanying drawings of the present application.

It should be noted that, in all of various types of combined flow paths, the bifurcation point a may physically exist as one point in the flow path or a section of the flow path. At the same time, in order to more conveniently and briefly show the topology of each combined flow path connected to the main stream branch, the present application divides the main stream branch in each drawing into sections (three lines) and displays them respectively. It should be noted that these main stream branches can also be composed of a communicating main stream branch as required.

Next, the structural composition and connection relationship of various types of combined flow paths will be explained. For the sake of brevity, the present application only schematically depicts 1 or 2 basic flow paths for certain combined flow paths. It should be noted that a design of more flow paths is possible in the application process. In addition, in the combined flow path solution, there may be one or more main line branches. These variations are all within the protection scope of the present application.

3.1 A Type Combined Flow Path:

The A type combined flow path is defined as follows: the individual basic flow paths are independent and communicate with a higher main stream branch through their first ports K1 or second ports K2, thus forming a combined flow path which can realize parallel liquid intake (which can also be used for liquid discharge). One end opening of the main stream branch is closed, and the other end opening serves as a common outlet of each basic flow path for transporting the liquid, as shown in FIG. 11A to FIG. 11C.

FIG. 11A-FIG. 1C list some of combination forms in which the individual basic flow paths shown in FIG. 1 to FIG. 6 are connected in parallel to the same main stream branch.

For example, "1-K1-A type" means that the basic flow path in FIG. 1 is connected to the main stream branch through the first port K1, "1-K2-A type" means that the basic flow path in FIG. 1 is connected to the main stream branch through the second port K2, "2-K1-A type" means that the basic flow path in FIG. 2 is connected to the main stream branch through the first port K1, and so on.

As another example, as shown in FIG. 11A to FIG. 1C, the first port K1 of the basic flow path shown in one of FIG. 1A to FIG. 1E, the second port K2 of the basic flow path shown in one of FIG. 1A to FIG. 1E and the first port K1 of the basic flow path shown in FIG. 2 can be independently connected to the same main flow path respectively; or the first port K1 (or the second port K2) of the basic flow path shown in FIG. 3, the first port K1 of the basic flow path shown in FIG. 4 and the second port K2 of the basic flow path shown in FIG. 4 can be connected to the same main flow path; or the second port K2 of the basic flow path shown in FIG. 6 and the first port or the second port (not shown) of other basic flow paths can be selected to be connected to the same main flow path. Each of the above-mentioned basic flow paths can carry out independent liquid intake according to the aforementioned metering and liquid intake step.

At the same time, in "1-K1-A type", "2-K1-A type", "3-K1-A type", "3-K2-A type", "4-K1-A type" and "6-K2-A type", a branch tube communicating with the main stream branch is provided with a liquid detector S, used for metering and positioning or detecting whether the liquid reaches a detection position to ensure that the liquid will not enter the main stream branch according to the requirements of a working condition during metering.

It can be understood that the combined flow path solutions shown in FIG. 11A to FIG. 11C are only part of all the possible permutations and combinations of the basic flow paths shown in FIG. 1A to FIG. 1E and FIG. 2 to FIG. 6, and the protection scope of the present application covers all permutation and combination forms thereof. For example, N basic flow paths can be connected on the same main flow path, where N is a natural number greater than or equal to 1. Each basic flow path can select its own feasible first port K1 or second port K2 to be connected to the same main flow path. It can also be understood that the basic flow paths are not limited to the basic flow path solutions shown in FIG. 1 to FIG. 6, and the basic flow path solutions shown in FIG. 7 to FIG. 10 can also be selected.

It can be understood that, as mentioned above, although the present application emphasizes the use of the micro tubule, it does not mean excluding other non-micro tubule devices which can compose various complex combined channels in the present application. Under the condition of not affecting the inventive purpose of the present application, a passage with a larger pore diameter can also be used locally. As shown in FIG. 11C, when it is necessary to define a conventional volume of more than 2 ml for example, a thick volume-defining tube can be used as the first by-pass 11 of "6-K2-A type" to increase of the liquid intake or liquid discharge speed, thereby improving the overall treatment and detection speed of the apparatus.

The A type combined flow path has the beneficial effect that a water sample or reagents connected with the individual basic flow paths can be subjected to concurrent liquid intake and metering at the same time. This performance can greatly improve the overall treatment efficiency or detection speed of the apparatus.

3.2 P Type Combined Flow Path

In a preferred case, in order to more conveniently realize the flow of the liquid, at least one peristaltic pump B can be disposed on the main flow path of the A type combined flow path, as shown in FIG. 12. This type of combined flow path is named as "P type combined flow path" in the present application.

FIG. 12 lists "5-K2-P type" and "6-K2-P type" combined flow paths. Because of the peristaltic pump B on the main flow path, the liquid can flow by gravity or under the driving action of other pumps in the basic flow path. Besides, the peristaltic pump B on the main flow path can also be used for better controlling the movement of the liquid. It can be understood that FIG. 12 is merely an exemplary representation. A different number of other basic flow paths can also be selected, and each basic flow path can select its own first port K1 or second port K2 for connection to the same main flow path. At this time, the peristaltic pump B in the P type main flow path needs to cooperate with the respective peristaltic pumps and cut-off valves in the basic flow path, so as to better transport the liquid in the flow path according to specified requirements.

3.3 B Type Combined Flow Path:

The B type combined flow path is defined as follows: the first by-passes 11 of the basic flow paths of the same type are merged and shared, and then connected to a higher main stream branch through the merged and shared first port K1 or separately independent second ports K2 (K2'), thus forming a combined flow path which can realize parallel liquid intake (which can also be used for liquid discharge). One end opening of the main stream branch is closed, and the other end opening serves as a common outlet of each B type combined flow path for transporting the liquid, as shown in FIG. 13A to FIG. 13D.

FIG. 13A to FIG. 13D list combination forms in which the individual basic flow paths shown in FIG. 1A to FIG. 1E and FIG. 2 to FIG. 6 are merged and combined according to the above-mentioned rules, and then connected to the same main stream branch in parallel through the first port K1 or the second port K2.

For example, "1-K1-B type" means that the first by-passes 11 of the basic flow paths in FIG. 1A-FIG. 1E are merged and shared, and then connected to the main stream branch through the first port K1; "1-K2-B type" means that the first by-passes 11 of the basic flow paths in FIG. 1A-FIG. 1E are merged and shared, and then connected to the main stream branch through the second port K2; "4-K1-B type" means that the first by-passes 11 of the basic flow paths in FIG. 4 are merged and shared, and then connected to the main stream branch through the first port K1; "4-K2-B type" means that the first by-passes 11 of the basic flow paths in FIG. 4 are merged and shared, and then connected to the main stream branch through the second port K2; "6-K2-B type" means that the first by-passes 11 of the basic flow paths in FIG. 6 are merged and shared, and then connected to the main stream branch through the second port K2; and so on.

All the above-mentioned basic flow paths can carry out liquid intake according to the aforementioned metering and liquid intake principles and steps. However, when one of the flow passages operates, except for devices on the first by-pass 11 which cooperate therewith, devices on other basic flow paths should be at rest (the peristaltic pump is at rest, and the cut-off valve is closed), which will not be further described herein.

In a preferred case, a branch tube of each B type combined flow path communicating with the main stream branch can be provided with a liquid detector S, used for metering and positioning or detecting whether the liquid reaches a detection position to ensure that the liquid will not enter the main stream branch according to the requirements of a working condition.

It can be understood that the combined flow path solutions shown in FIG. 13A to FIG. 13D are only embodiments formed by combining the basic flow paths shown in part of the drawings according to the B type combined flow path. It can be understood that the present application is not limited to this, and the protection scope of the present application covers all permutation and combination forms of the various basic flow paths. For example, the basic flow paths used for realizing the combined flow path are not limited to the basic flow path solutions shown in FIG. 1A-FIG. 1E and FIG. 2 to FIG. 6. Besides, the basic flow path solutions shown in FIG. 7 to FIG. 10 can also be selected, and basic flow path solutions which are not shown in the drawings can be selected as well.

Compared with the A type and P type combined flow paths, the B type combined flow path has the beneficial effect of reducing the number of the peristaltic pumps or cut-off valves, thus saving the cost accordingly and improving the stability.

3.4 C Type Combined Flow Path:

The C type combined flow path is defined as follows: the second by-passes 12 of the basic flow paths of the same type are merged and shared, and then connected to a higher main stream branch through the separately independent first ports K1 (K1') or merged and shared second port K2, thus forming a combined flow path which can realize respective liquid intake (which can also be used for liquid discharge). One end opening of the main stream branch is closed, and the other end opening serves as a common outlet of each C type combined flow path for transporting the liquid, as shown in FIG. 14A to FIG. 14C.

FIG. 14A to FIG. 14C list combination forms in which the individual basic flow paths shown in FIG. 1A-FIG. 1E and FIG. 2 to FIG. 6 are merged and combined according to the above-mentioned rules, and then connected to the same main stream branch in parallel through the first port K1 or the second port K2.

For example, "1-K1-C type" means that the second by-passes 12 of the basic flow paths in FIG. 1 are merged and shared, and then connected to the main stream branch through the first port K1; "1-K2-C type" means that the second by-passes 12 of the basic flow paths in FIG. 1A are merged and shared, and then connected to the main stream branch through the second port K2; "4-K2-C type" means that the second by-passes 12 of the basic flow paths in FIG. 4 are merged and shared, and then connected to the main stream branch through the second port K2; and so on.

All the above-mentioned basic flow paths can carry out liquid intake according to the aforementioned metering and liquid intake principles and steps. However, when one of the flow passages operates, except for devices on the first by-pass 11 which cooperate therewith, devices on other basic flow paths should be at rest (the peristaltic pump is at rest, and the cut-off valve is closed), which will not be further described herein.

At the same time, a branch tube of each C type combined flow path communicating with the main stream branch can be provided with a liquid detector S, used for metering and positioning or detecting whether the liquid reaches a detection position to ensure that the liquid will not enter the main stream branch according to the requirements of a working condition during metering.

It can be understood that the combined flow path solutions shown in FIG. 14A to FIG. 14C are only part of the most practical and feasible flow paths formed by combining the basic flow paths shown in FIG. 1A-FIG. 1E and FIG. 2 to FIG. 6 according to the C type combined flow path, and the protection scope of the present application covers all permutation and combination forms thereof. For example, the basic flow paths used for realizing the combined flow path are not limited to the basic flow path solutions shown in FIG. 1A-FIG. 1E and FIG. 2 to FIG. 6. Besides, the basic flow path solutions shown in FIG. 7 to FIG. 10 can also be selected, and basic flow path solutions which are not shown in the drawings can be selected as well.

It should be noted that, for the connection of the "1-K1-C type" combined flow path to the main stream branch, there are two or more connection points: K1 and K1'. The above two points can be connected to different positions in the same main stream branch (as shown in FIG. 14A to FIG. 14C), or can be distributedly connected to different main stream branches (not shown).

Compared with the A type and P type combined flow paths, the C type combined flow path has the beneficial effect of reducing the number of the peristaltic pumps or cut-off valves, thus saving the cost accordingly and improving the stability.

3.5 BC Type Combined Flow Path:

The BC type combined flow path is defined as follows: the first by-passes 11 and the second by-passes 12 of the basic flow paths of the same type are respectively merged and shared, and then connected to a higher main stream branch through the merged and shared first port K1 or merged and shared second port K2, thus forming a combined flow path which can realize respective liquid intake (which can also be used for liquid discharge). One end opening of the main stream branch is closed, and the other end opening serves as a common outlet of each BC type combined flow path for transporting the liquid, as shown in FIG. 15A to FIG. 15D.

FIG. 15A to FIG. 15D list combination forms in which the individual basic flow paths shown in FIG. 1A-FIG. 1E and FIG. 2 to FIG. 6 are merged and combined according to the above-mentioned rules, and then connected to the same main stream branch in parallel through the first port K1 or the second port K2.

For example, "1-K1-BC type" means that the first by-passes 11 and the second by-passes 12 of the basic flow paths in one of FIG. 1A-FIG. 1E are respectively merged and shared, and then connected to the main stream branch through the first port K1; "1-K2-BC type" means that the first by-passes 11 and the second by-passes 12 of the basic flow paths in FIG. 1 are respectively merged and shared, and then connected to the main stream branch through the second port K2; "4-K1-BC type" means that the first by-passes 11 and the second by-passes 12 of the basic flow paths in FIG. 4 are respectively merged and shared, and then connected to the main stream branch through the first port K1; "4-K2-BC type" means that the first by-passes 11 and the second by-passes 12 of the basic flow paths in FIG. 4 are respectively merged and shared, and then connected to the main stream branch through the second port K2; "6-K2-BC type" means that the first by-passes 11 and the second by-passes 12 of the basic flow paths in FIG. 6 are respectively merged and shared, and then connected to the main stream branch through the second port K2; and so on.

The combined flow paths in FIG. 15A to FIG. 15C exhibit combinations of two different types of variants of "1-basic type". Devices connected in series on the flow passage are peristaltic pumps and cut-off valves respectively, and have the same cut-off effect.

All the above-mentioned basic flow paths can carry out liquid intake according to the aforementioned metering and liquid intake principles and steps. However, when one of the flow passages operates, except for devices on the first by-pass 11 which cooperate therewith, devices on other basic flow paths should be at rest (the peristaltic pump is at rest, and the cut-off valve is closed), which will not be further described herein.

At the same time, a branch tube of each BC type combined flow path communicating with the main stream branch can be provided with a liquid detector S, used for metering and positioning or detecting whether the liquid reaches a detection position to ensure that the liquid will not enter the main stream branch according to the requirements of a working condition during metering.

It can be understood that the combined flow path solutions shown in FIG. 15A to FIG. 15D are only embodiments formed by combining the basic flow paths shown in FIG. 1A-FIG. 1E and FIG. 2 to FIG. 6 according to the BC type combined flow path, and the protection scope of the present application covers all permutation and combination forms thereof. It can also be understood that, for example, the basic flow paths used for realizing the combined flow path are not limited to the basic flow path solutions shown in FIG. 1A-FIG. 1E and FIG. 2 to FIG. 6. Besides, the basic flow path solutions shown in FIG. 7 to FIG. 10 can also be selected, and basic flow path solutions which are not shown in the drawings can be selected as well.

Compared with the A type, P type, B type and C type combined flow paths, the BC type combined flow path has the beneficial effect of more effectively reducing the number of the peristaltic pumps or cut-off valves, thus saving the cost accordingly and improving the stability.

3.6 H Type Combined Flow Path:

The H type combined flow path is defined as follows: the bifurcation points a of various types of basic flow paths are merged and shared, and directly connected to the main stream branch through the point a, where one peristaltic pump or cut-off valve is connected in series on the main stream branch; or one of some of the first by-passes or the second by-passes in the basic flow paths are directly used as the main stream branch. In the H type combined flow path, one peristaltic pump or one cut-off valve must be connected in series on a flow passage branch, the first by-pass 11 and the second by-pass 12 of each basic flow path, and there must be one peristaltic pump. In all the above-mentioned first by-passes 11 and second by-passes 12, part of the first by-passes 11 or second by-passes 12 are used as volume-defined metering guide tubes, and the other first by-passes 11 or second by-passes 12 or the aforementioned main stream branch can be used an outlet for transporting the liquid, as shown in FIG. 16. According the above-mentioned combination rules, a plurality of combined flow paths which can realize flexibly combined liquid intake (which can also be used for liquid discharge) can be formed.

FIG. 16A shows two H type combined flow paths. In each of the two combined flow paths, the basic flow paths in FIG. 1 are adopted, and the bifurcation points a are merged. The difference lies in that the flow path on the left is provided with one peristaltic pump connected in series on the main stream branch, and the flow path on the right is provided with one cut-off valve connected in series on the main stream branch.

FIG. 16B shows a more complex H type combined flow path. Except the three flow passage branches below, the individual branches above can be used as volume-defined metering tubes or liquid output outlets.

All the above-mentioned basic flow paths can carry out liquid intake according to the aforementioned metering and liquid intake principles and steps. However, when one of the flow passages operates, except for devices on a certain first by-pass 11 or a certain second by-pass which cooperate therewith, devices on other basic flow paths should be at rest (the peristaltic pump is at rest, and the cut-off valve is closed), which will not be further described herein.

Compared with the A type, P type, B type, C type and BC type combined flow paths, the H type combined flow path has the following biggest advantages: flexible combinations are realized, a minimal number of devices can be used, and the liquid can be subjected to volume-defined metering according to different specifications and then transported to different end openings (such as a plurality of reaction vessels) for subsequent treatment.

Various combination solutions of the basic flow paths of the present application are described in detail above. In operation, the liquid in each container can be subjected to predetermined-volume interception respectively or be intercepted simultaneously; or interception can be selectively carried out in one or some of the containers. Finally, the liquid is pushed out from the selected end openings sequentially or simultaneously. Therefore, according to the various combination solutions of the above-mentioned basic flow paths, the liquid in a plurality of different containers can be individually subjected to high-accuracy quantitative liquid interception simultaneously or in a predetermined sequence, and the quantitative liquid intercepted at a high accuracy can be transported out. Moreover, the basic flow paths are combined, so that the use of the components can be greatly reduced, thus reducing the overall cost.

In addition, as described above, FIG. 11A to FIG. 11C and FIG. 12 to FIG. 16A and FIG. 16B exemplarily show various types of combined flow path solutions based on the basic flow paths. The basic flow paths used for realizing the combined flow path are not limited to the basic flow path solutions shown in FIG. 1A to FIG. 1E and FIG. 2 to FIG. 6. Besides, the basic flow path solutions shown in FIG. 7 to FIG. 10 can also be selected, and basic flow path solutions which are not shown in the drawings can be selected as well. The various possible combination modes of these basic flow paths are all within the scope of the present application.

In addition, it should be indicated that the liquid intake and/or liquid discharge operations in the above-mentioned various combined flow paths can be realized according to the liquid intake and/or liquid discharge modes of the various types of basic flow paths. Therefore, these variations are all within the scope of the present application.

IV. Applied Flow Path Solution

In an applied flow path solution, a (reaction) vessel 100 is included. The vessel 100 is used for reaction treatment and/or detection analysis, and has a top opening located at the top and/or a bottom opening located at the bottom.

In order to inject the required predetermined liquid sample (intercepted with an accurate volume) into the vessel 100 for reaction treatment and/or detection analysis, the above-mentioned basic flow path solutions and/or combined flow path solutions can be enabled to communicate with the vessel 100. Depending upon applied working conditions, the communication with the vessel 100 can be carried out at the bottom opening; or the communication with the vessel 100 can be carried out at the bottom opening and the top opening; or the communication with the vessel 100 can be carried out at the bottom opening and the middle part of the vessel 100. In other words, the bottom, top or middle part of the vessel 100 can be used as a connection point for communication. In a preferred case, the bottom opening of the vessel 100 is connected with the peristaltic pump or cut-off valve to keep the reaction liquid in the vessel 100 or discharge the liquid after the reaction.

As shown in FIG. 17, the device for quantitatively treating a liquid (specifically, its applied flow path) has a vessel 100. The vessel 100 is used for reaction treatment and/or detection analysis, and has a top opening located at the top. The top opening simultaneously communicates with various types of basic flow paths or various types of combined flow paths (or a suitable combination thereof). The individual containers in the various types of basic flow paths or various types of combined flow paths can be used for containing different liquids, such as distilled water, a water sample to be detected, a standard liquid, a shielding agent, a color-developing agent, a cleaning solution, etc. The bottom of the reaction vessel 100 communicates with the peristaltic pump or cut-off valve, preferably a peristaltic pump capable of realizing forward driving and reverse driving (which are respectively used for discharging the liquid downwards and blowing air upwards to stir the liquid).

Figure 18:
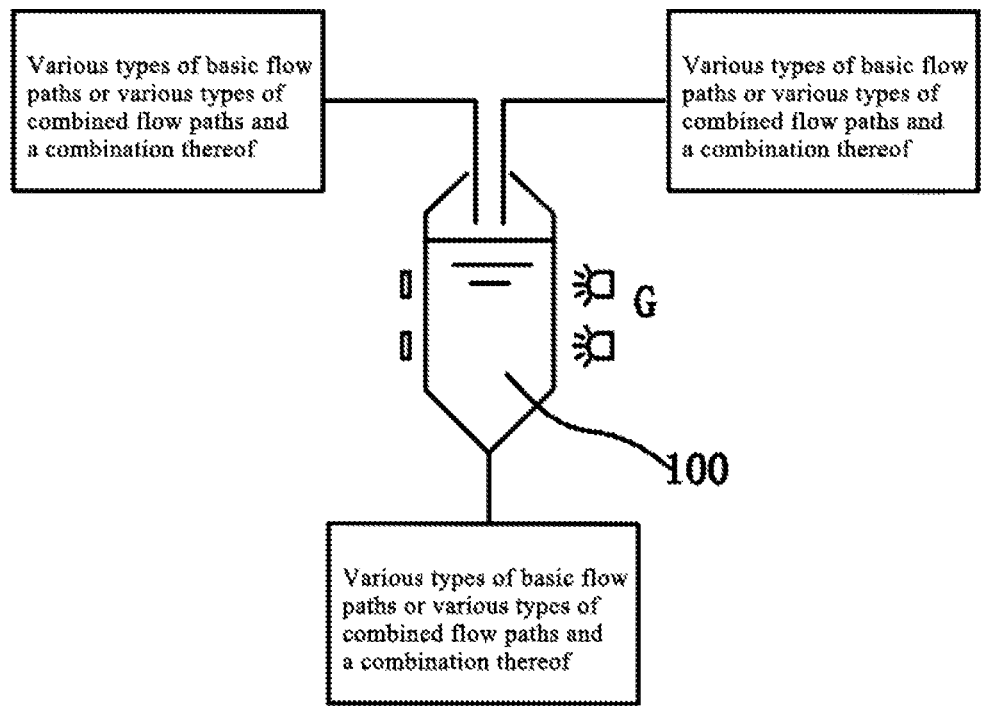

As shown in FIG. 18, the device for quantitatively treating a liquid (specifically, its applied flow path) has a vessel 100. The vessel 100 is used for reaction treatment and/or detection analysis, and has a top opening located at the top and a bottom opening located at the bottom. The top opening and the bottom opening simultaneously communicate with various types of basic flow paths or various types of combined flow paths (or a suitable combination thereof). The individual containers in the various types of basic flow paths or various types of combined flow paths can be used for containing different liquids, such as distilled water, a water sample to be detected, a standard liquid, a shielding agent, a color-developing agent, a cleaning solution, etc.

Figure 19:
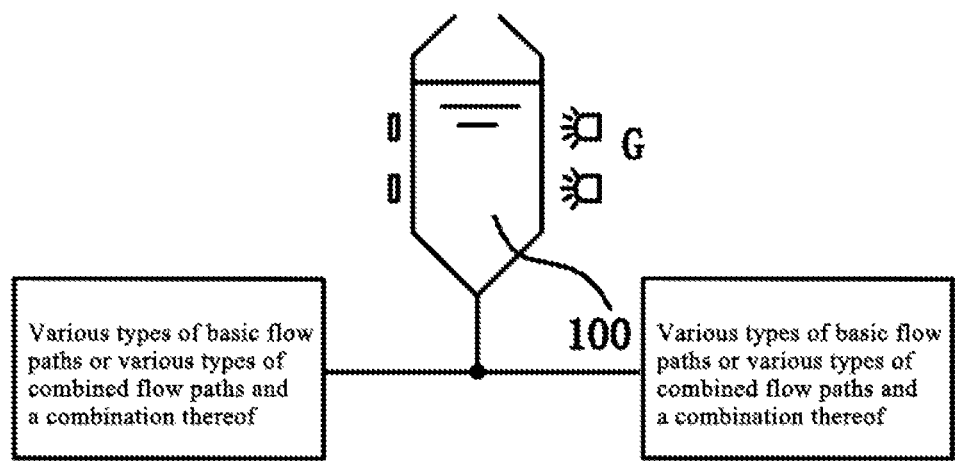
Figure 20:
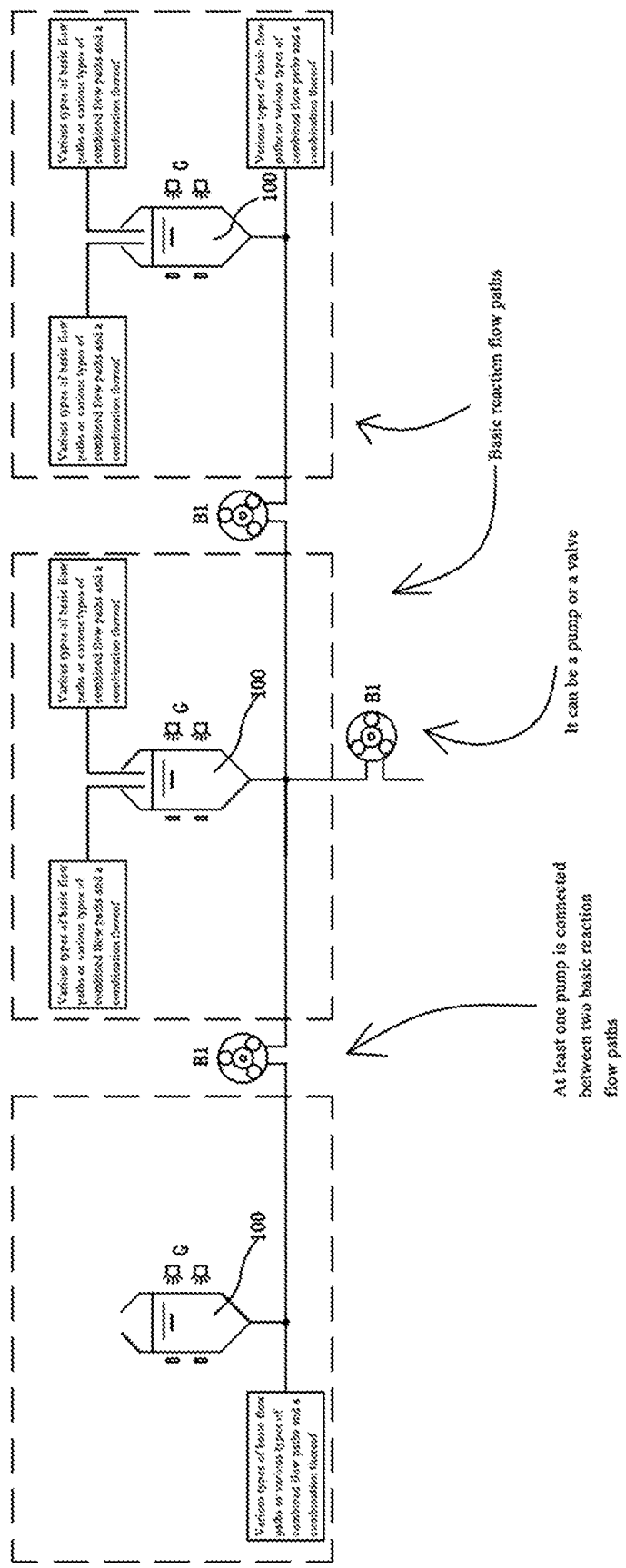

As shown in FIG. 19 and FIG. 20, the device for quantitatively treating a liquid (specifically, its applied flow path) has a vessel 100. The vessel 100 is used for reaction treatment and/or detection analysis, and has a top opening located at the top and a bottom opening located at the bottom. The bottom opening simultaneously communicates with various types of basic flow paths or various types of combined flow paths (or a suitable combination thereof). The individual containers in the various types of basic flow paths or various types of combined flow paths can be used for containing different liquids, such as distilled water, a water sample to be detected, a standard liquid, a shielding agent, a color-developing agent, a cleaning solution, etc. When the bottom opening communicates with the basic flow paths or combined flow paths, the container P can be used for containing a waste liquid or can be used for containing a cleaning solution. The introduction of the cleaning solution into the vessel 100 facilitates the cleaning operation of the vessel 100.

Figure 23:
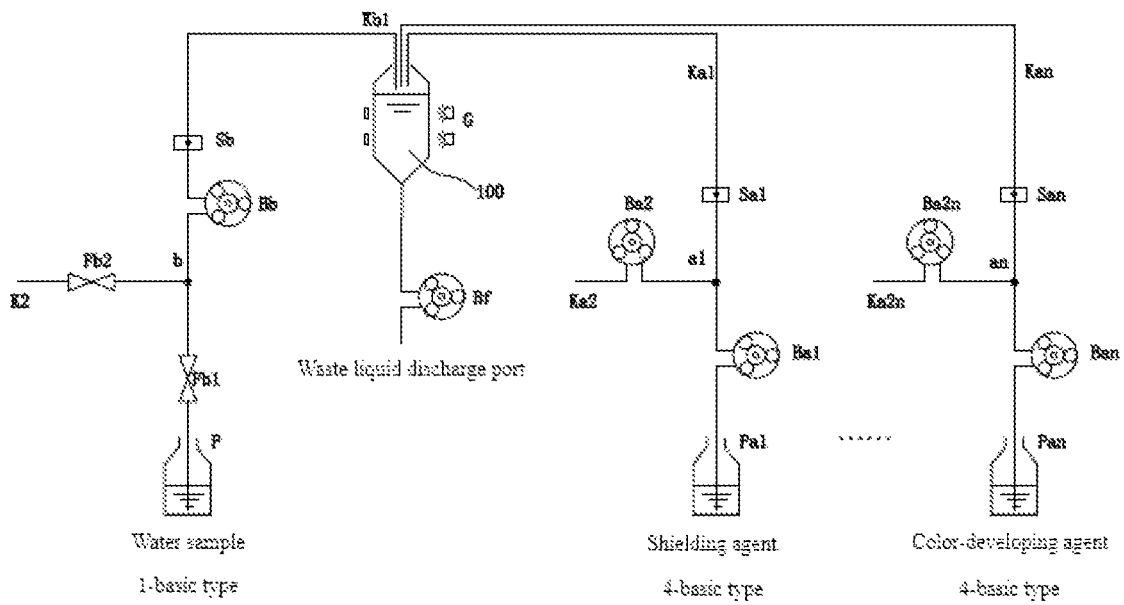

As shown in FIG. 20, in a preferred case, a basic reaction flow path is formed around a reaction vessel 100. The bottoms of a plurality of basic reaction flow paths can be connected together, so that one or more liquid discharge outlets are shared, thereby allowing the plurality of reaction vessels 100 to simultaneously work, so as to greatly improve the working efficiency. As shown in FIG. 23, at least one peristaltic pump or cut-off valve must be connected in series on each connection channel between adjacent reaction vessels, for controlling the turn-on/turn-off between connection passages.

Under the guidance of the communication mode between the above-mentioned basic flow paths or combined flow paths and the reaction vessel 100, multiple applied flow path combination solutions for the device for quantitatively treating a liquid can be formed.

Figure 21:
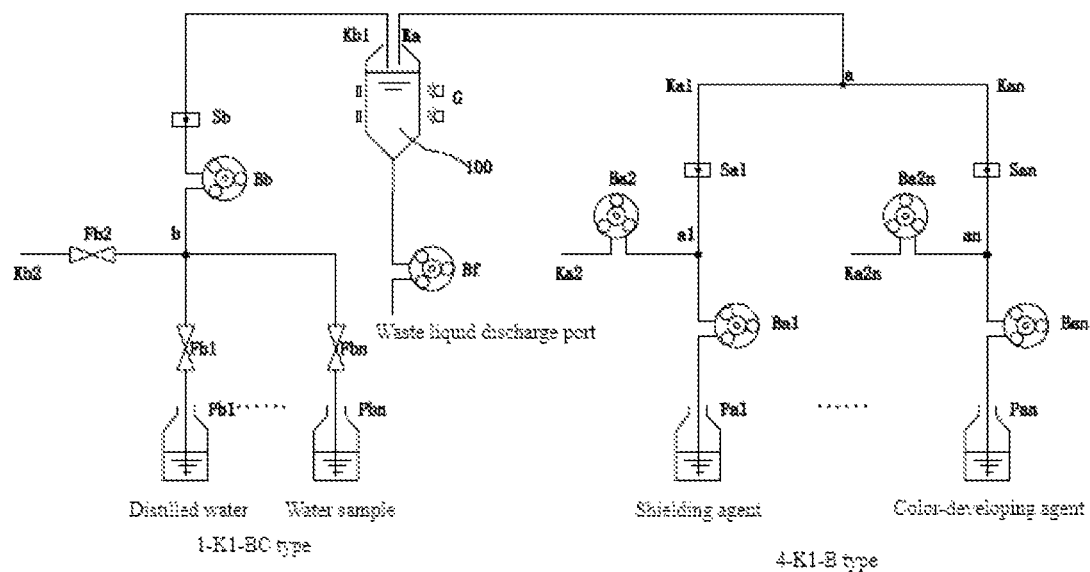
Figure 22:
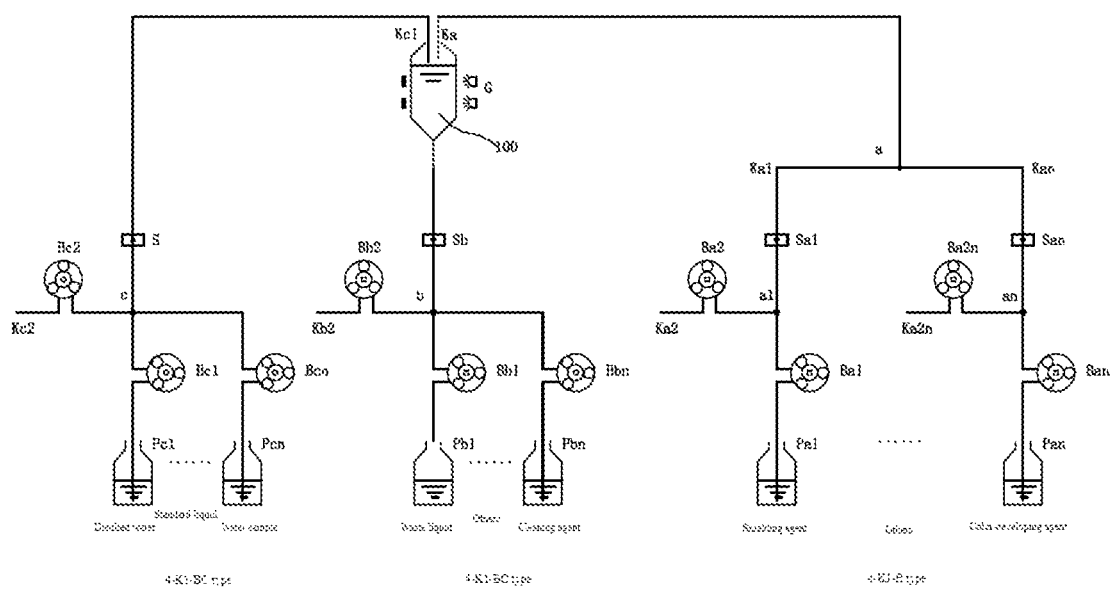

FIG. 21 to FIG. 23 show an exemplary embodiment in which the basic flow path or combined flow path solutions communicate with the top opening of the reaction vessel 100. In this embodiment, different types of liquids (such as the water sample, the shielding agent, the color-developing agent, etc.) can be relatively independently introduced into the vessel 100 from above, thereby avoiding cross contamination of the water sample and the reagents.

The left side of the flow path in FIG. 21 uses for example the "1-K1-BC" type combined flow path to carry out metering and liquid intake on the distilled water and the water sample which flow in from the top of the reaction vessel 100. At the same time, the right side uses the "4-K1-B" type combined flow path to carry out liquid intake from the top of the reaction vessel 100. The bottom of the reaction vessel 100 communicates with the peristaltic pump or cut-off valve, preferably a peristaltic pump capable of realizing forward driving and reverse driving (which are respectively used for discharging the liquid downwards and blowing air upwards to stir the liquid). The design has the advantages of simple principle, simple structure, high measurement accuracy. The preparation and metering of the water sample and the reagents can be concurrently carried out at the same time, thus saving time. Meanwhile, the liquid intake operations of the water sample and the reagents do not interfere with each other, thereby avoiding cross contamination.

Figure 24:
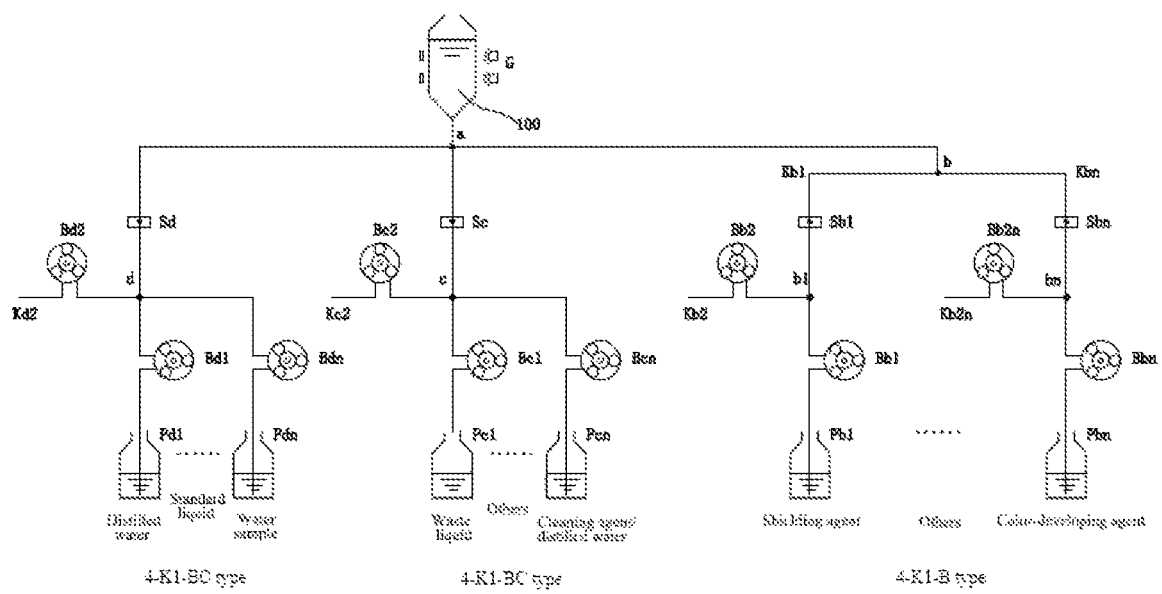

The flow path in FIG. 22 is characterized in that the peristaltic pump or cut-off valve communicating with the bottom of the reaction vessel 100 in FIG. 24 is replaced by a "4-K1-BC" type combined flow path on the basis of the flow path in FIG. 21. At the same time, 2 flow passages are connected at a node b, used for discharging the waste liquid and carrying out metering and liquid intake on the cleaning solution respectively. In this design, a liquid detector Sb is connected in series on the passage at the bottom of the reaction vessel 100. The liquid detector cooperates with the peristaltic pump below to realize a dilution operation on the liquid.

The specific operation process is as follows: First, the water sample is taken in the reaction vessel 100. Then, the liquid is discharged through a peristaltic pump Bb1, until the last liquid just passes through a liquid detector Sb. At this time, the liquid discharge operation is stopped, the peristaltic pump Bb1 or a peristaltic pump Bb2 is rotated in the opposite direction, and the intercepted volume-fixed liquid is fed back into the reaction vessel 100. Afterwards, a peristaltic pump Bbn starts to take in the distilled water, and the liquid intake volume can be determined by the liquid detector Sb in coordination with the liquid intake time of the peristaltic pump Bbn. Finally, the peristaltic pump Bb1 or the peristaltic pump Bb2 is rotated in the opposite direction, and all the dilutions above the node b are blown into the reaction vessel 100 to complete the dilution of the original water sample. Compared with FIG. 21, FIG. 22 illustrates a flow path topology and dilution method for diluting the water sample based on the flow path construction idea of the present application.

The left side of the flow path in FIG. 23 uses the "1A-basic type" basic flow path to carry out metering and liquid intake on the water sample which flows in from the top of the reaction vessel 100. At the same time, the right side uses 2 "4-basic type" basic flow paths to carry out liquid intake from the top of the reaction vessel 100. The bottom of the reaction vessel 100 communicates with the peristaltic pump or cut-off valve, preferably a peristaltic pump capable of realizing forward driving and reverse driving (which are respectively used for discharging the liquid downwards and blowing air upwards to stir the liquid). Compared with the flow path in FIG. 21, the design has the advantages of realizing complete separation of the two reagents on the right side and preventing any possible cross contamination.

FIG. 24 to FIG. 27 show a mode in which the basic flow path or combined flow path solutions communicate with the bottom opening of the reaction vessel 100. In this embodiment, different types of liquids (such as the water sample, the shielding agent, the color-developing agent, etc.) can be relatively independently taken in and introduced into the vessel 100 from below, the waste liquid can be received, and a cleaning operation can be carried out. This design has the beneficial effect that the peristaltic pumps, the cut-off valves, the liquid detectors and other devices which have the same functions on different combined branches can be merged, such as pumps for liquid discharge or air blowing, distilled water pumps for cleaning and the liquid detectors for liquid detection, thereby simplifying the flow path and saving the cost. In addition, the mode of taking in/discharging the liquid from the bottom of the reaction vessel 100 is very beneficial to cleaning of the individual passages, achieves a high cleaning efficiency, saves water for cleaning and reduces the number of air vents and discharge ports.

The flow path shown in FIG. 24 is characterized in that both the liquid intake of the "4-K1-BC" type combined flow path from the left side and the liquid intake of the "4-K1-B" type combined flow path from the right side on the top of the reaction vessel 100 in the flow path in FIG. 22 are changed into the liquid intake from the bottom of the reaction vessel 100.

Figure 25:
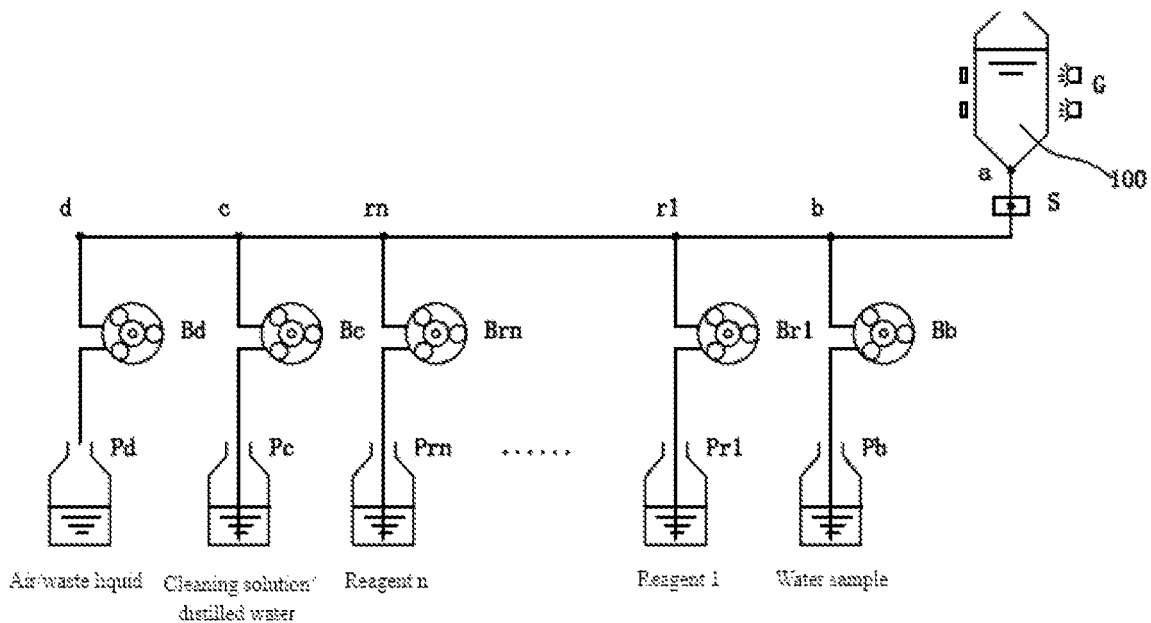

FIG. 25 shows a flow path which can more concisely realize a liquid intake function without reducing the number of a water sample and reagents. In the flow path, a "4-K1-BC" type combined flow path is connected below the reaction vessel, and a common first by-pass extends from the point b to the point a to serve as an output port for the water sample or reagents. A branch of an in-series peristaltic pump Bd connected at a point d is a common second by-pass used for discharging the liquid or pumping air into the main flow path and pushing the metered liquid into the reaction vessel 100. A plurality of branches where peristaltic pumps Bc, Brn, Br1 and Bb are located are flow passages. The different metering principles and liquid intake procedures of this combined flow path have been explained in the introduction of the basic flow path in FIG. 4 and the BC type combined flow path in FIG. 15A to FIG. 15D.

In all the applied flow paths of the present application, volume defining during liquid intake can be realized by controlling the rotating speed and time of each peristaltic pump for liquid intake, or by locating the head of a liquid section at a position near the liquid detector S (FIG. 25). For example, in FIG. 25 and FIG. 26, the liquid detector S between the node a and the node b can be used to accurately define the volume of the liquid, or to make an early warning judgment on whether the liquid passes through this point when the instrument operates.

Figure 26:
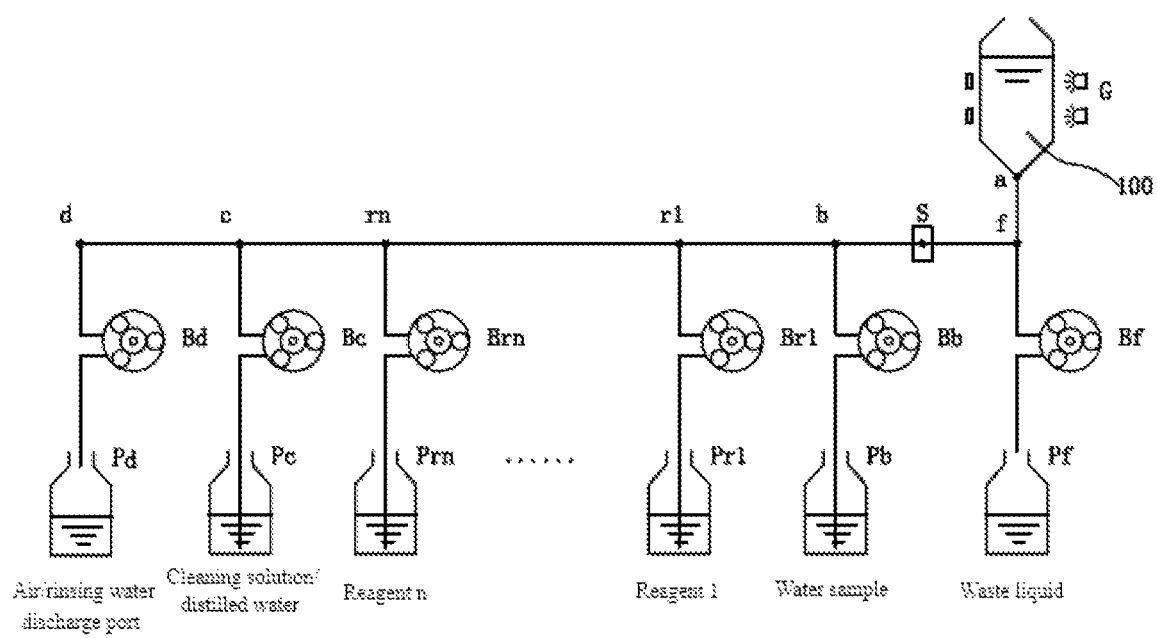

In FIG. 26, in order to more accurately complete the metering and volume defining of the liquid, an in-series peristaltic pump Bf connected at a point f can be used to evacuate the liquid from the point f to the point a or above into a waste liquid barrel through a waste liquid branch. At this time, the right end position for accurate volume defining of the liquid is determined by the position of the physical node f. FIG. 26 shows such a connection structure.

Figure 27:
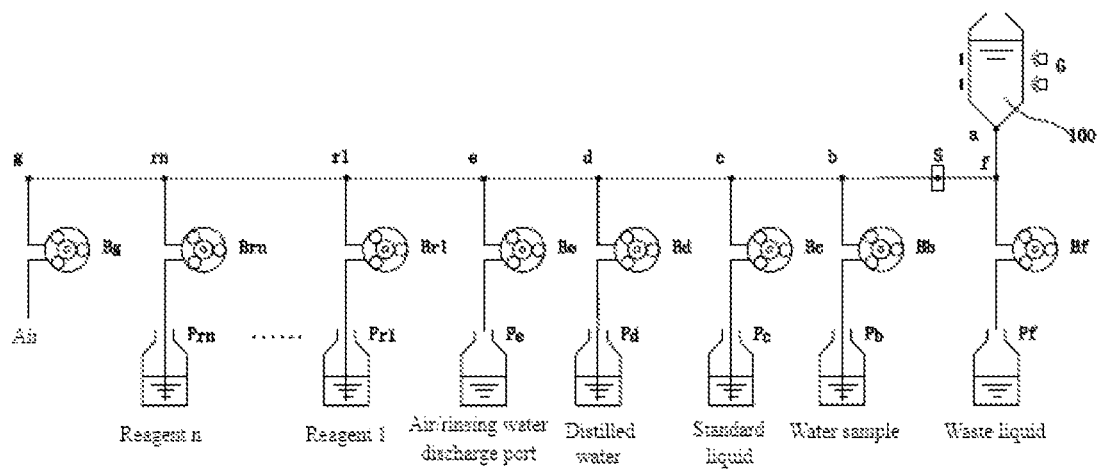

In order to more flexibly use the physical space volume between the nodes on the main stream branch to define the volume of the liquid to be intercepted, the designer can add some branches communicating with air or the liquid on the main stream branch to more accurately intercept different volumes of micro-amount liquid. FIG. 27 shows an example in which the designer adds a new branch communicating with air or used for discharging rinsing water at a point e between a reagent branch and a distilled water branch, so as to avoid cross contamination between the reagents and the water sample (the standard liquid and the distilled water) as much as possible.

Figure 28:
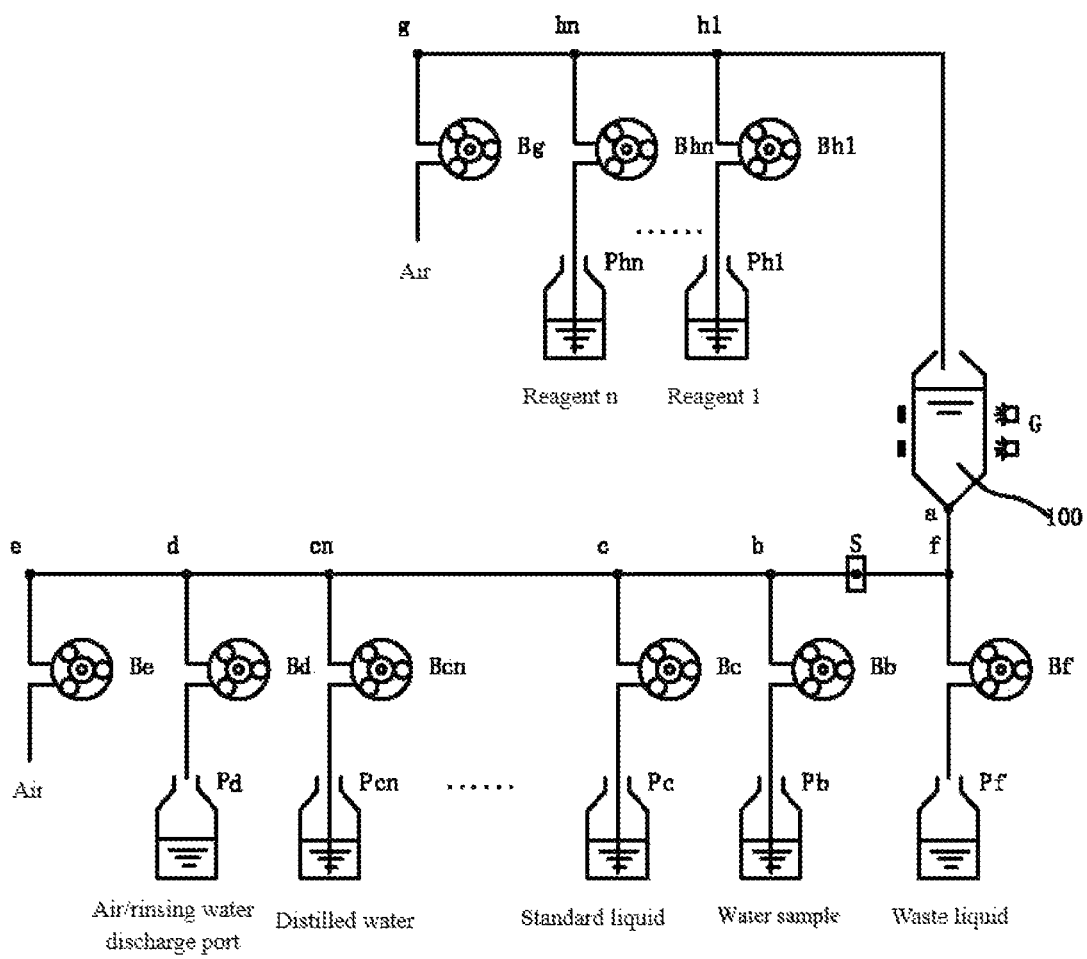

In order to completely avoid cross contamination between the reagents and the water samples (the standard liquid and the distilled water), the water sample and reagents can be concurrently taken in at the same time. FIG. 28 shows an example in which the outlets of all the reagents are moved to the top of the reaction vessel 100 for liquid intake.

Next, FIG. 27 is taken as an example to illustrate the basic principles and procedures of metering, liquid intake, stirring, liquid discharge and dilution for this type of flow path. It should be noted that the corresponding principles and procedures of other flow paths in FIG. 25 to FIG. 28 are similar, so the working process of the similar applied flow paths will not be described in detail.

The metering procedure for high-accuracy liquid intake in FIG. 27 is as follows: if the water sample needs to be taken in, the peristaltic pump Bb is rotated counterclockwise. The water sample passes through the liquid detector S and stops after having an overshoot of a certain volume. Then, the peristaltic pump Bb is at rest, and the peristaltic pump Bf is rotated clockwise for a while to suck the overshooting excess liquid beyond the point f into waste liquid evacuation for discharge. In this way, high-accuracy intake of a micro-amount liquid (such as 0.05-2 ml) can be completed once. Of course, we can also use the colorimetric detector G in the reaction vessel 100 to complete volume-defined metering of a large-amount liquid (when the liquid level reaches a horizontal line of an optical axis at a point G, the device detects a signal, thus completing positioning and metering). Then, the peristaltic pumps Bb and Bf are at rest, and a peristaltic pump Bg or Be is rotated counterclockwise to feed the liquid between the point b and the point f into the reaction vessel 100. In this manner, metering and liquid intake can be carried out on other liquids and reagents in the flow path. By selecting different cut-off points and blowing push points at the head of the water section ("waterhead" for short), the designer can achieve the liquid intake of different volumes of the micro-amount liquid. In doing so, defined volumes of different liquids in different containers can be pushed into the vessel 100 in a predetermined order, so as to carry out reaction and/or analysis in the vessel 100.

When the peristaltic pump Bg or Be or Bf is rotated counterclockwise, air can be blown to the reaction vessel 100 to stir the liquid. The above three pumps can also be used as outlets for liquid discharge.

The dilution operation realized by the flow path in FIG. 27 on the liquid in the reaction vessel 100 is as follows: the peristaltic pump Bg or Be is activated to carry out liquid discharge. Before the watertail passes through the point f, the above peristaltic pump is stopped. Then, the peristaltic pump Bf is rotated clockwise to discharge the excess liquid to be diluted beyond the point f. Then, the peristaltic pump Bg or Be is rotated counterclockwise to feed the intercepted liquid into the reaction vessel 100. Finally, by adopting the above-mentioned metering and liquid intake mode, the distilled water is taken in the reaction vessel 100 in a micro-amount or large-volume liquid intake mode, and then subjected to air blowing, stirring and uniform mixing.

In the combined flow paths at the bottom or top of the reaction vessel 100 in FIG. 22 to FIG. 28, at least one peristaltic pump communicates with the atmosphere. Preferably, the peristaltic pump communicating with the atmosphere is the farthest from the vessel 100 on the common micro tubule. Therefore, the peristaltic pump can realize accurate intake from all the reagent containers or reagent vessels on the common micro tubule to the reaction vessel 100.

In a preferred case, as shown in FIG. 22 to FIG. 28, the liquid detector S is disposed at a position adjacent to the bottom opening on the common micro tubule, so that the volume-defined liquid between each bifurcation point and the liquid detector S can be intercepted, thus obtaining the volume of the liquid sample having a higher interception accuracy. The liquid detector can be located in any position between the intersection point b and the bottom a of the reaction vessel 100. The advantages of the liquid detector S can be found in the above detailed description.

In addition, in all the applied flow paths, the arrangement sequence of the individual containers P relative to the vessel 100 can be selectively designed according to the working procedure. For example, various reaction liquids need to be pushed by means of air, so compared with the peristaltic pumps connected in series in flow passages of other containers, the peristaltic pump which directly communicates with the atmosphere needs to be the farthest from the 100.

It can be known from the above description that the combination of the basic flow paths has achieved a high degree of dynamic integration obviously in the embodiments shown in FIG. 25 to FIG. 28. As shown in FIG. 26, the reaction flow path also includes a waste liquid container Pf. The waste liquid container is a container communicating with the atmosphere and has a waste liquid passage which extends outwards out of the waste liquid container Pf from the interior of the waste liquid container Pf. The peristaltic pump Bf is disposed in series in the waste liquid passage. Preferably, the peristaltic pump in the waste liquid passage communicates with a part (the bifurcation point f in FIG. 26) between the point b and the bottom opening a. At this time, the liquid detector (S) is located near the intersection point f. As shown in FIG. 26, the leftmost peristaltic pump directly communicates with the atmosphere, thereby introducing air into the common micro tubule. At the same time, the waste liquid container Pf and its peristaltic pump Bf are exclusively used for receiving the waste liquid, thus avoiding mutual interference with air introduction. Moreover, the waste liquid container Pf is close to the vessel 100, so that the liquid can be discharged nearby, thus improving the efficiency and avoiding pollution of the waste liquid. The features of the waste liquid container Pf can also be applied to other suitable applied flow paths.

In the embodiment shown in FIG. 27, an air/rinsing water discharge port container is added to achieve a dilution function. In the flow path of the present application, the method for achieving the dilution function is flexible, and the dilution function can be realized through different operations in addition to the aforementioned dilution solution. Specifically, for the liquid to be diluted in the vessel 100, under the condition that other peristaltic pumps are at rest, the peristaltic pump of the air/rinsing water discharge port container is rotated, so that the liquid to be diluted is sucked into the air/rinsing water discharge port container. At this time, the liquid to be diluted is filled between the air/rinsing water discharge port and the bottom opening a. Then, the other peristaltic pumps are closed, and only the peristaltic pump of the waste liquid container is rotated, so that the liquid to be diluted between the intersection point f and the bottom opening a is discharged into the waste liquid. At this time, the liquid to be diluted is filled between the air/rinsing water discharge port and f. Then, the other peristaltic pumps are closed, and only the leftmost peristaltic pump is enabled to operate, so that the liquid to be diluted between the intersection points e and f is pushed to the vessel 100 by air. Then, the distilled water is sucked into the vessel 100, thus realizing the dilution process of the liquid to be diluted.

Figure 29:
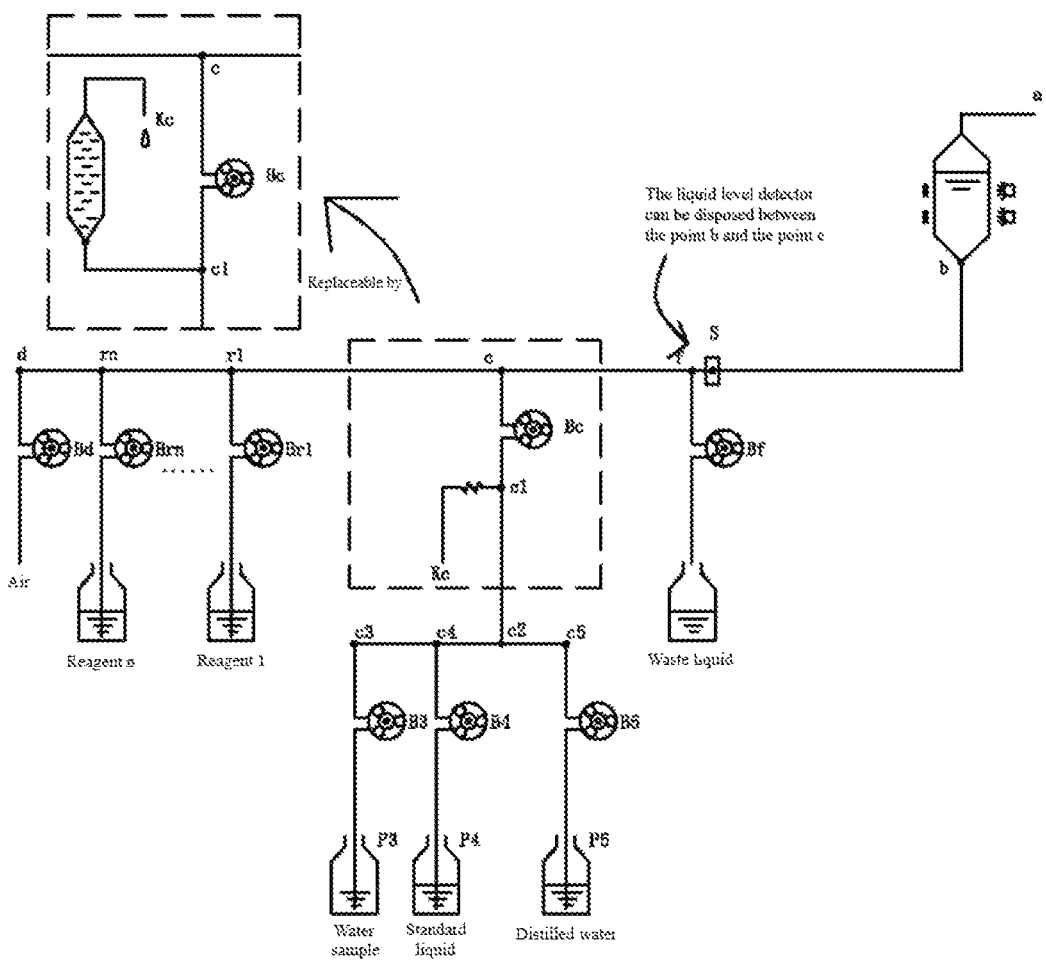

FIG. 29 shows a structure in which discrete liquid intake branches for the original water sample, the standard liquid and the distilled water are replaced by the "4-K2-BC type" combined flow path on the basis of FIG. 26 to FIG. 28. Because the first by-pass cl-Kc is shared, the water sample, the standard liquid and the distilled water are identical in the liquid intake volume and are less prone to cross contamination with the reagents. If a larger volume of the liquid needs to be metered, the volume-defining guide tube cl-Kc can be replaced by a branch in which a thick tube is connected in series in the middle. The thick tube must open upwards, and the outlet must be higher than the bifurcation point cl to ensure that the liquid will not flow off from the outlet of the thick tube.

Figure 30:
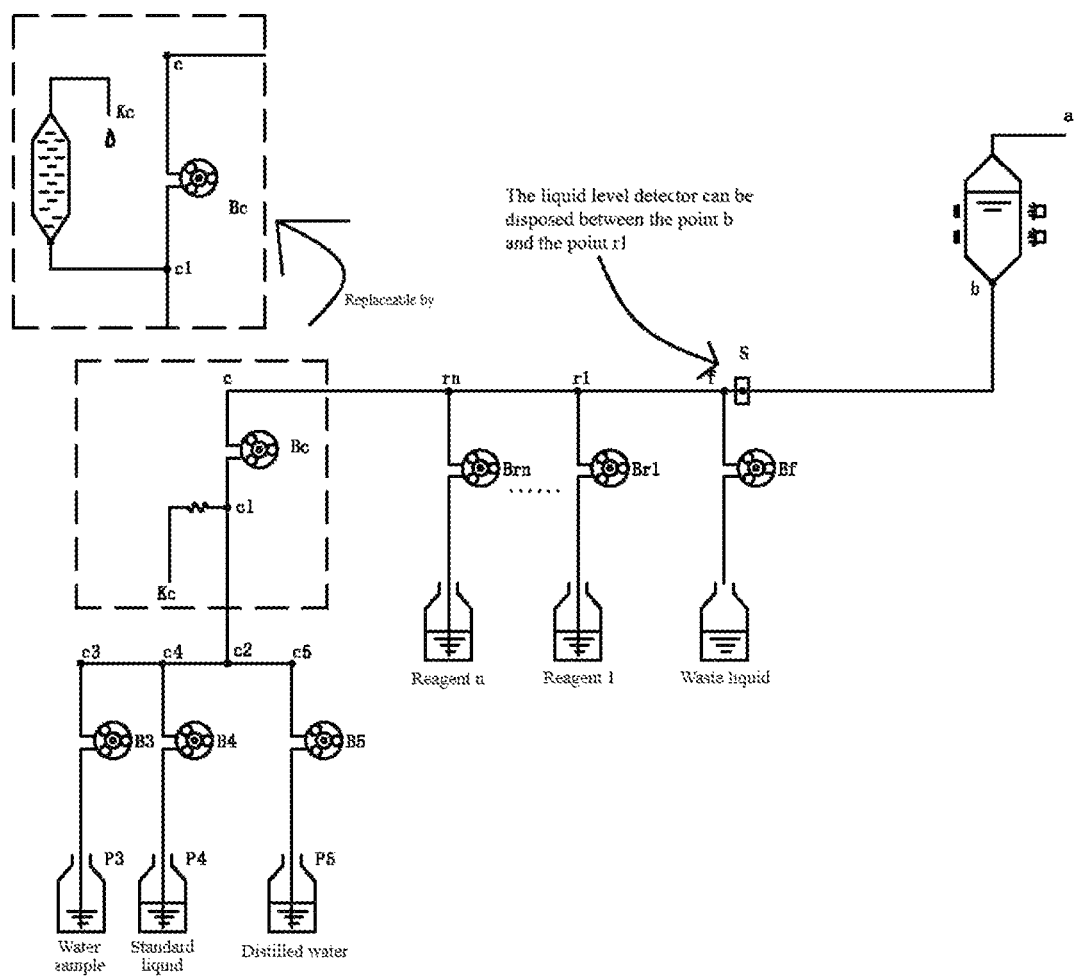

FIG. 30 is characterized in that the combined flow path for liquid intake of the water sample, the standard liquid and the distilled water in FIG. 29 is moved to the tail end of the main flow path (the far end on the left side, relative to the reaction vessel 100). Such a construction can enable the port Kc to be directly used as an air vent/rinsing water discharge port. At the same time, the arrangement of the water sample, the standard liquid and the distilled water at the far end on the left side is beneficial to prevent the above three liquids from polluting the reagents or reaction solutions on the right side. The position adjustment of these similar basic flow paths or combined flow paths on the main flow path can be carried out in multiple forms which are not limited to the specific forms shown in the drawings. These variations are all within the scope of the present application.

Figure 31:
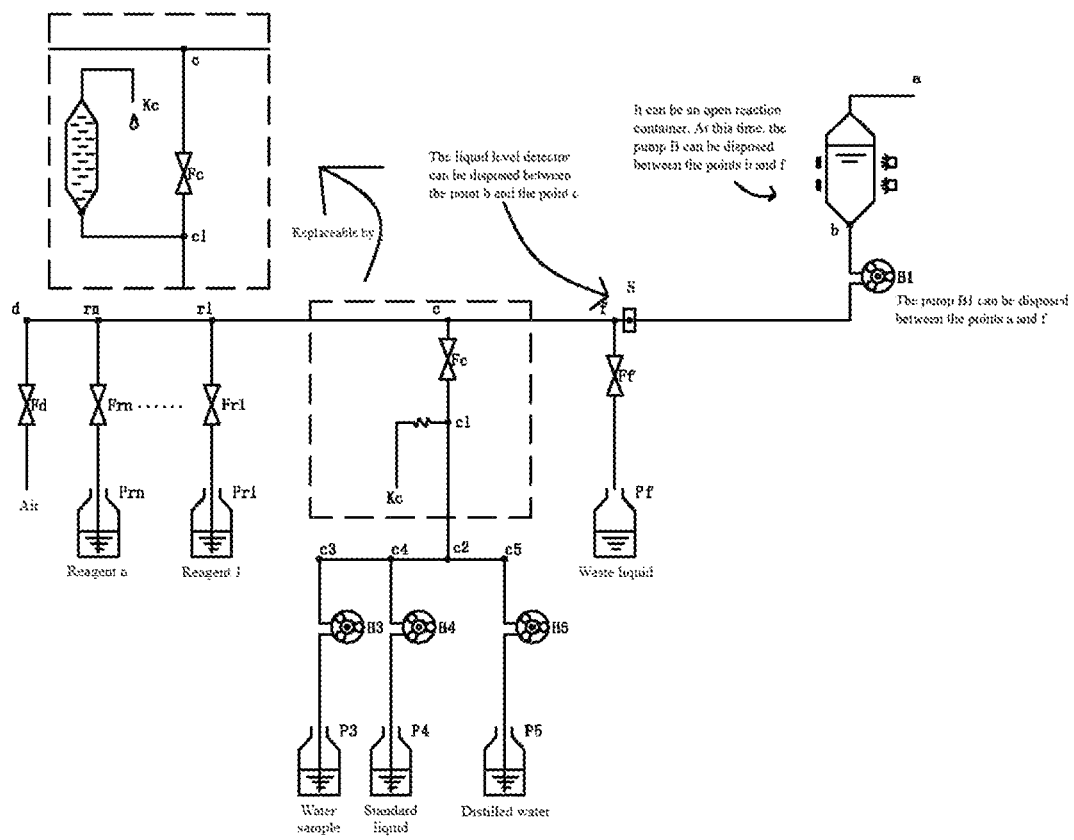
Figure 32:
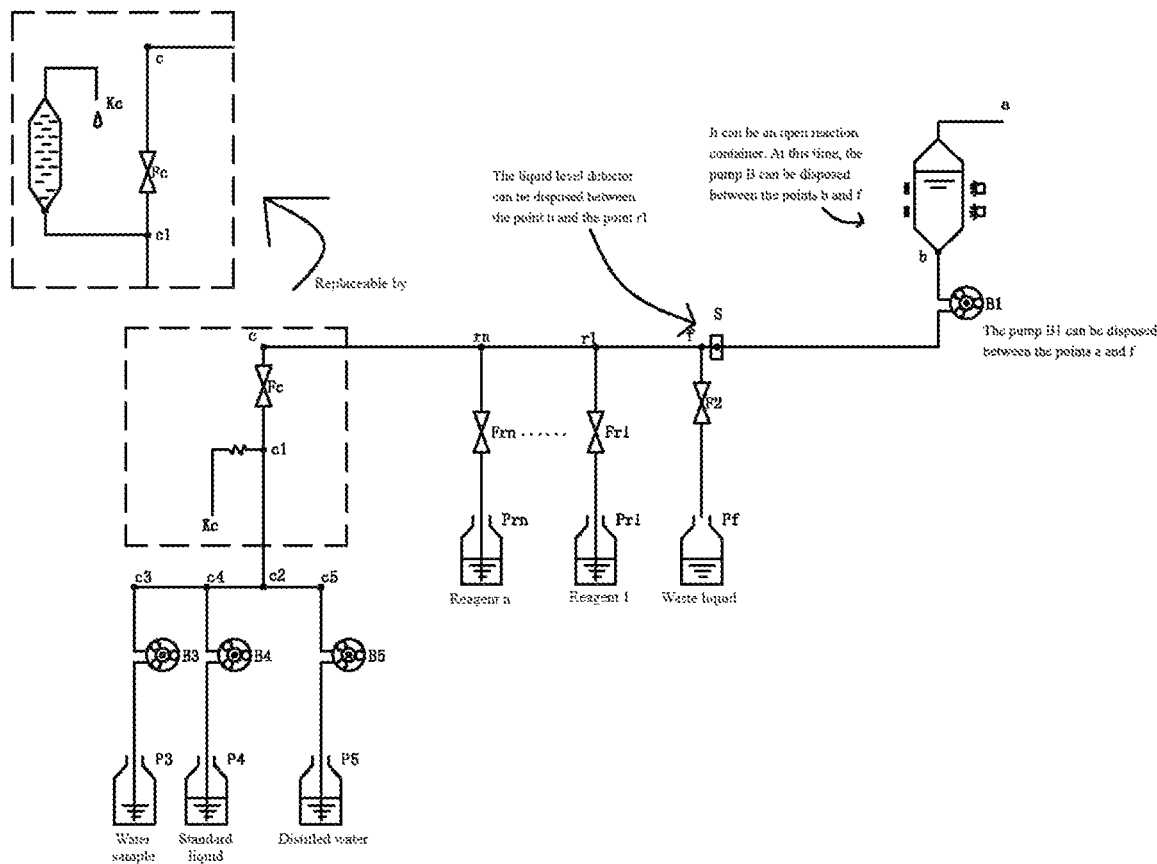

FIG. 31 and FIG. 32 are respectively characterized in that the "4-K2-BC type" combined flow path in the main stream branch in FIG. 29 and FIG. 30 is replaced by another flow path. The type of the new flow path in the main stream branch is "1-K1-P type". The liquid intake mode and procedure can be found in the aforementioned description of the present application.

The applied flow paths in FIG. 25 to FIG. 32 are characterized in that the first by-passes 11 cooperating with the individual liquid intake/discharge ports are merged and shared, and/or the second by-passes 12 are merged and shared, so that the devices (the peristaltic pumps, the cut-off valves or the liquid detectors) used in the applied flow path are reduced as much as possible, thereby simplifying the flow path and reducing the cost.

In the applied flow paths in FIG. 25 to FIG. 32, because volume-defining branch tubes are shared, all the reagents can only be sequentially subjected to volume defining in the common volume-defining branch tube, and then fed into the reaction vessel 100. In order to speed up metering and liquid intake, the present application also proposes several applied flow paths which can carry out concurrent metering and can realize rapid analysis.

Figure 33:
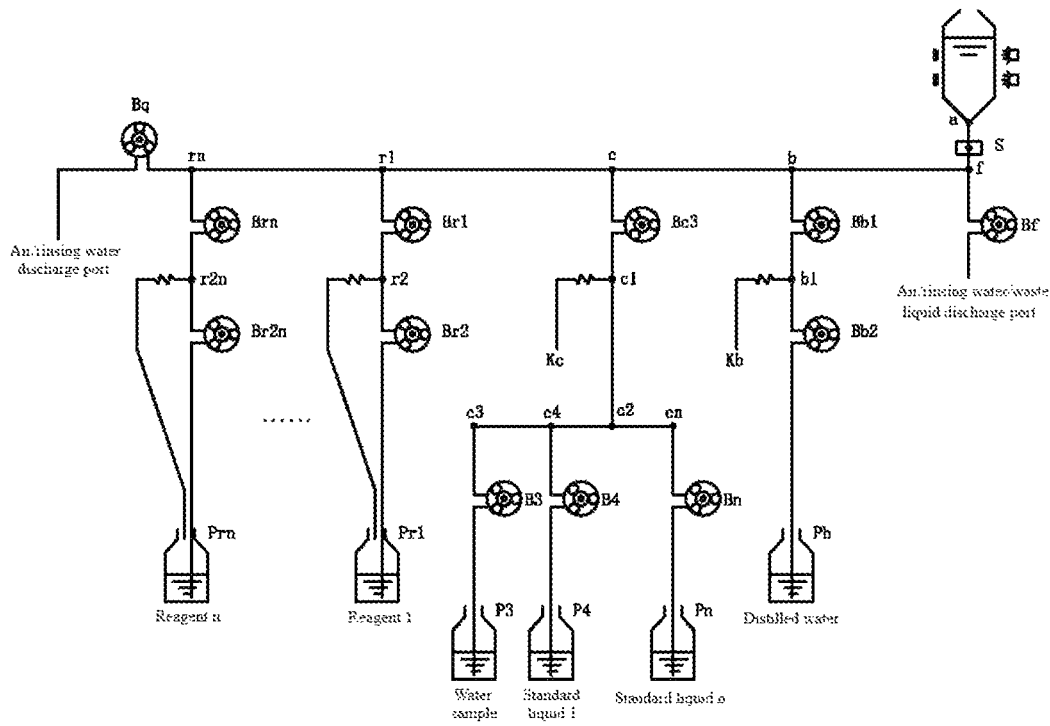

FIG. 33 is characterized in that the flow passage for the reagent 1 to the reagent n is replaced by the "4-basic type" flow path (N flow paths for liquid intake of the above reagents compose one "4-K2-BC" combined flow path) on the basis of FIG. 29. This type of flow path has the biggest advantages that concurrent metering and volume defining of the water sample and individual reagents can be realized, and rapid liquid intake can be sequentially carried out according to the requirements of the procedure. Similarly, each branch can be cleaned at the same time, which can greatly save the whole cycle detection time of the instrument.

It should be noted that the outlet of the first by-pass 11 of the "4-basic type" flow path for each of the above-mentioned reagents still returns to the reagent bottle container P. This has the advantage that the reagent pumped out by the peristaltic pump returns to the reagent bottle, which not only saves the reagent, but also eliminates the impact of bubbles that may have been contained in the micro tubule. The rotating time of the peristaltic pump is increased to ensure the stability and high accuracy of the whole liquid intake system. The structural feature and beneficial effects thereof are applicable to all the flow paths submitted by the present application.

Figure 34:
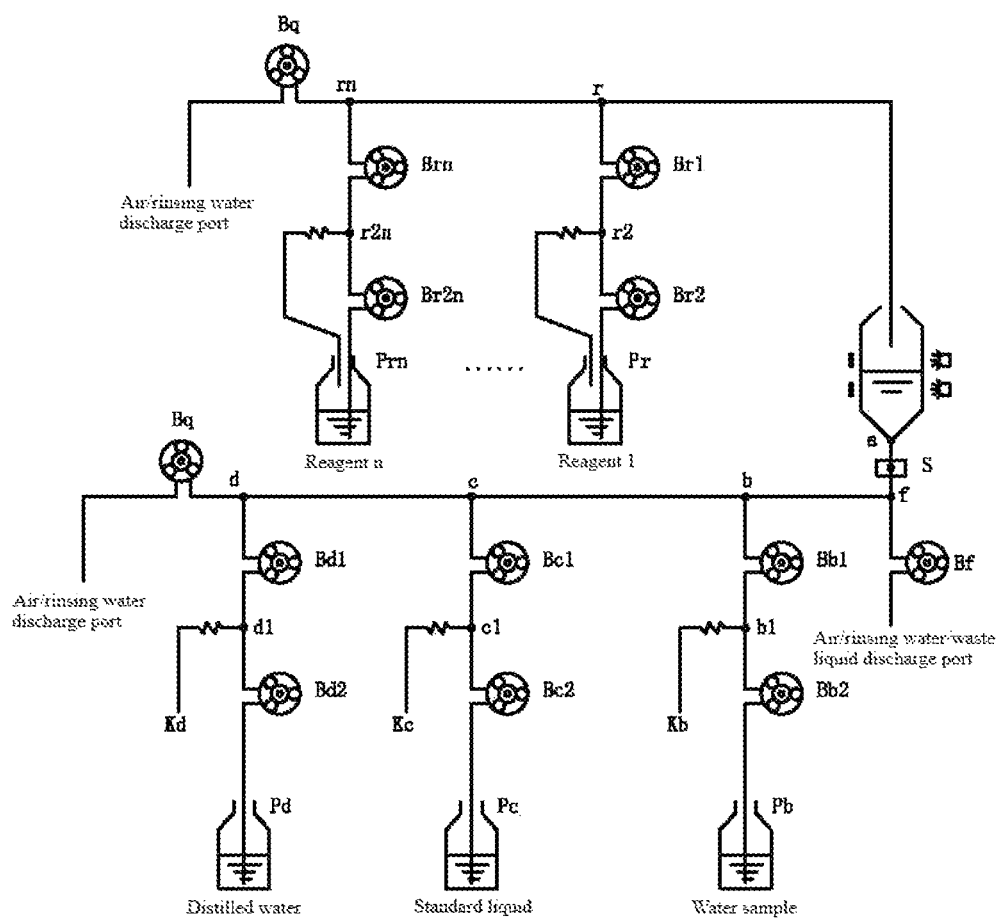

FIG. 34 shows another practical applied flow path. The water sample, the standard liquid and the distilled water are respectively subjected to metering and volume defining in parallel on the respective first by-pass through the "4-basic type" flow path, then connected to a higher "4-basic type"

flow path and finally connected to the bottom of the reaction vessel 100. Each reagent is connected to the top opening of the reaction vessel 100 in the same manner. The flow path has the advantage that the individual liquids are independently subjected to metering and liquid intake at a high speed. Especially during dilution, since the distilled water for dilution is ready, the dilution speed of the flow path will be very fast. In order to further reduce the devices, "air/rinsing water discharge port" peristaltic pumps of upper and lower main stream branches in the applied flow path can be omitted, and air or rinsing water is directly discharged from the end openings such as Kb/Kc/Kd.

Figure 35:
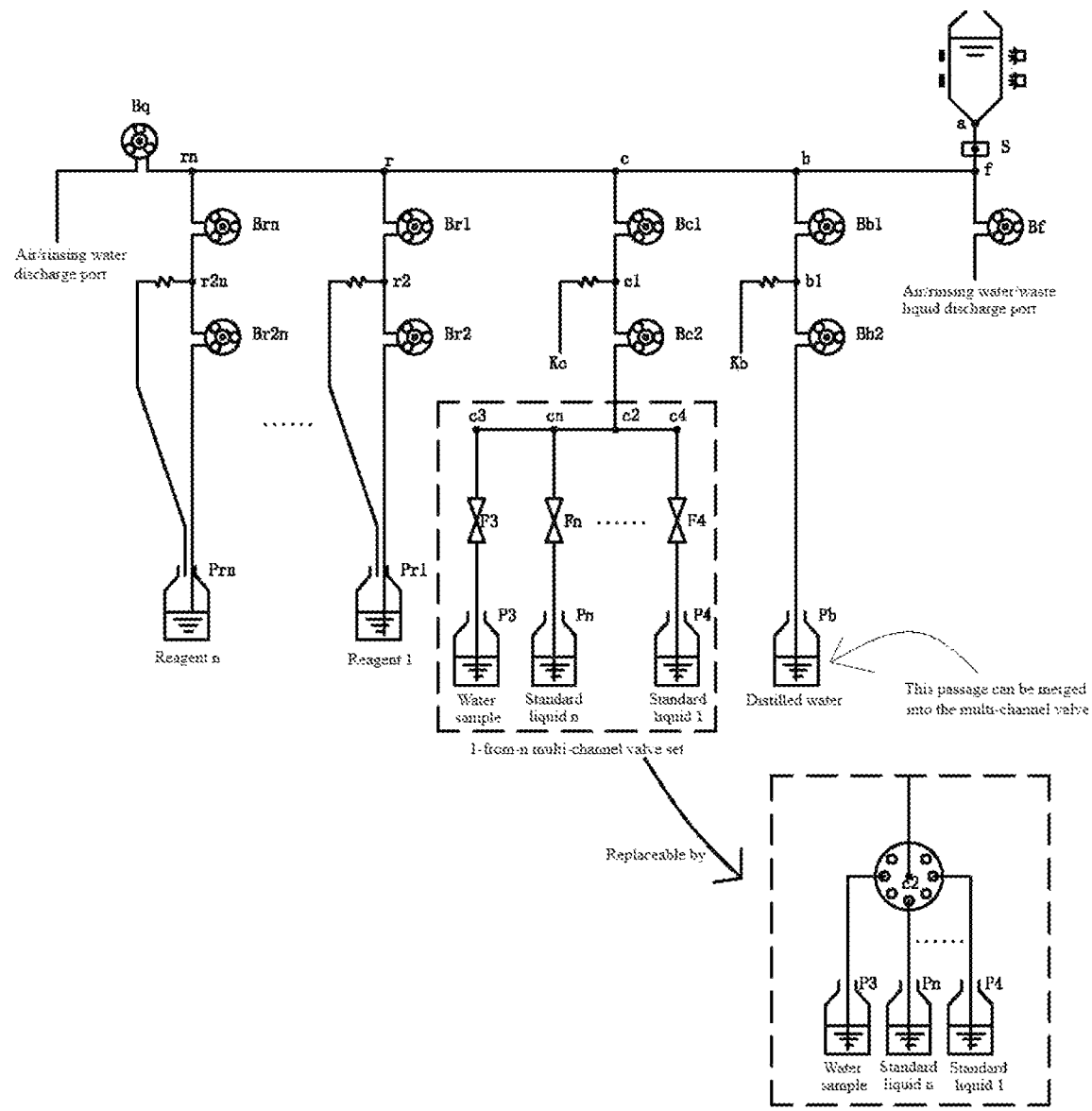

FIG. 35 shows an applied flow path. The flow path adopts a cut-off valve set (F3, F4, . . . , Fn in the dashed box) and a peristaltic pump Bc2 which functionally replace a plurality of sub-branches connected with the peristaltic pumps at the lower end of a point C1 in FIG. 33. The cut-off valve set can also be replaced by one 1-from-N multi-channel switch valve.

Figure 36:
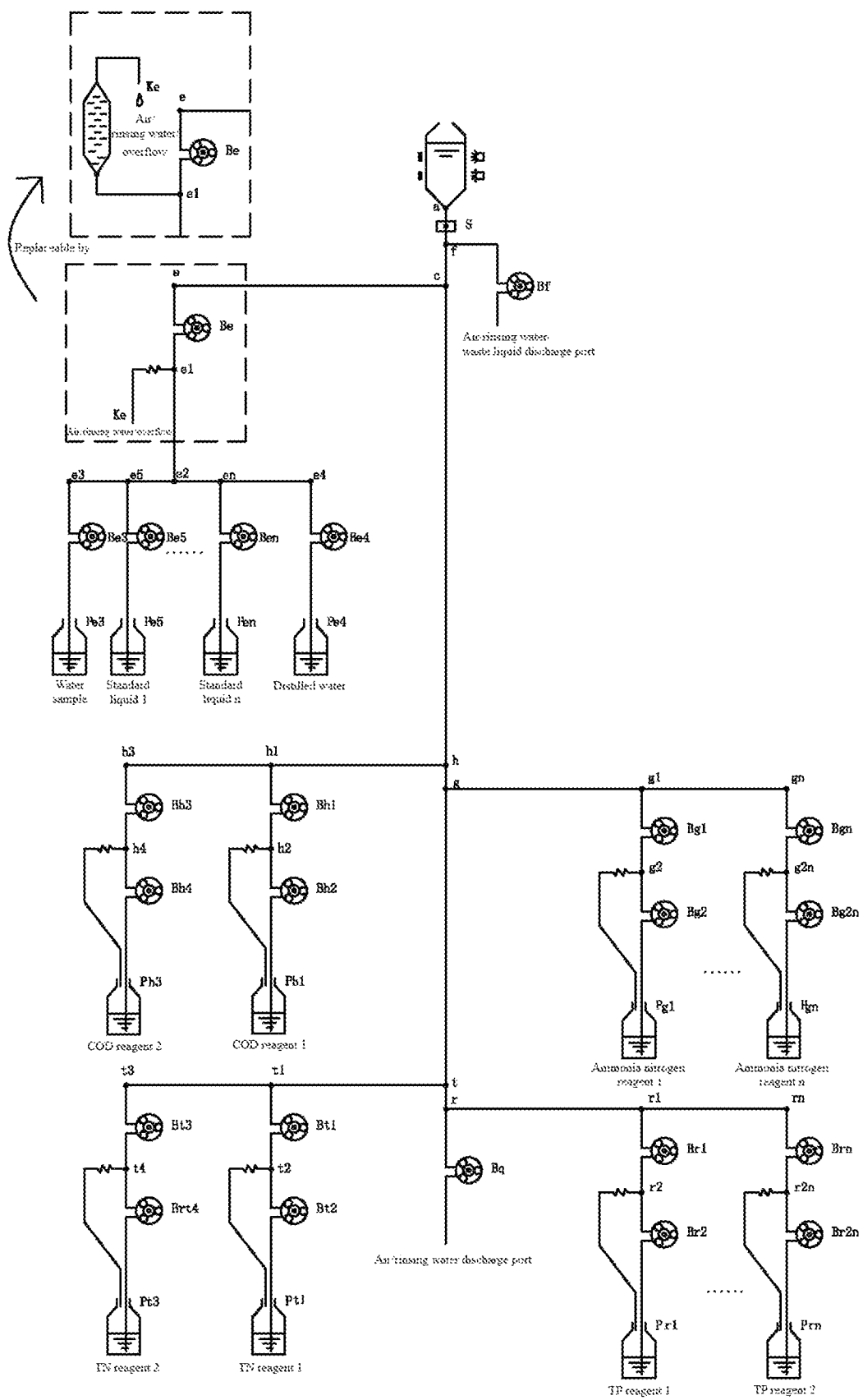

FIG. 36 shows an applied flow path which has multiple expanded detection indices on the basis of FIG. 33. In the flow path, the reagents for 4 different detection indices (COD, ammonia nitrogen, total phosphorus and total nitrogen) are respectively connected to the main flow path below the reaction vessel through different nodes h, g, t and r. The reaction vessel 100 is shared for the four indices. The liquid intake channels for the water sample, the standard liquid and the distilled water are connected to the main flow path below the reaction vessel from the point C. Liquid discharge and air pumping-in are driven by the peristaltic pump Bf and a peristaltic pump Bq, and are shared as well. At the low cost of only increasing several peristaltic pumps and control devices thereof, the applied flow path can be conveniently expanded to achieve a function of sequentially detecting 4 indices in a time-shared manner.

Figure 37:
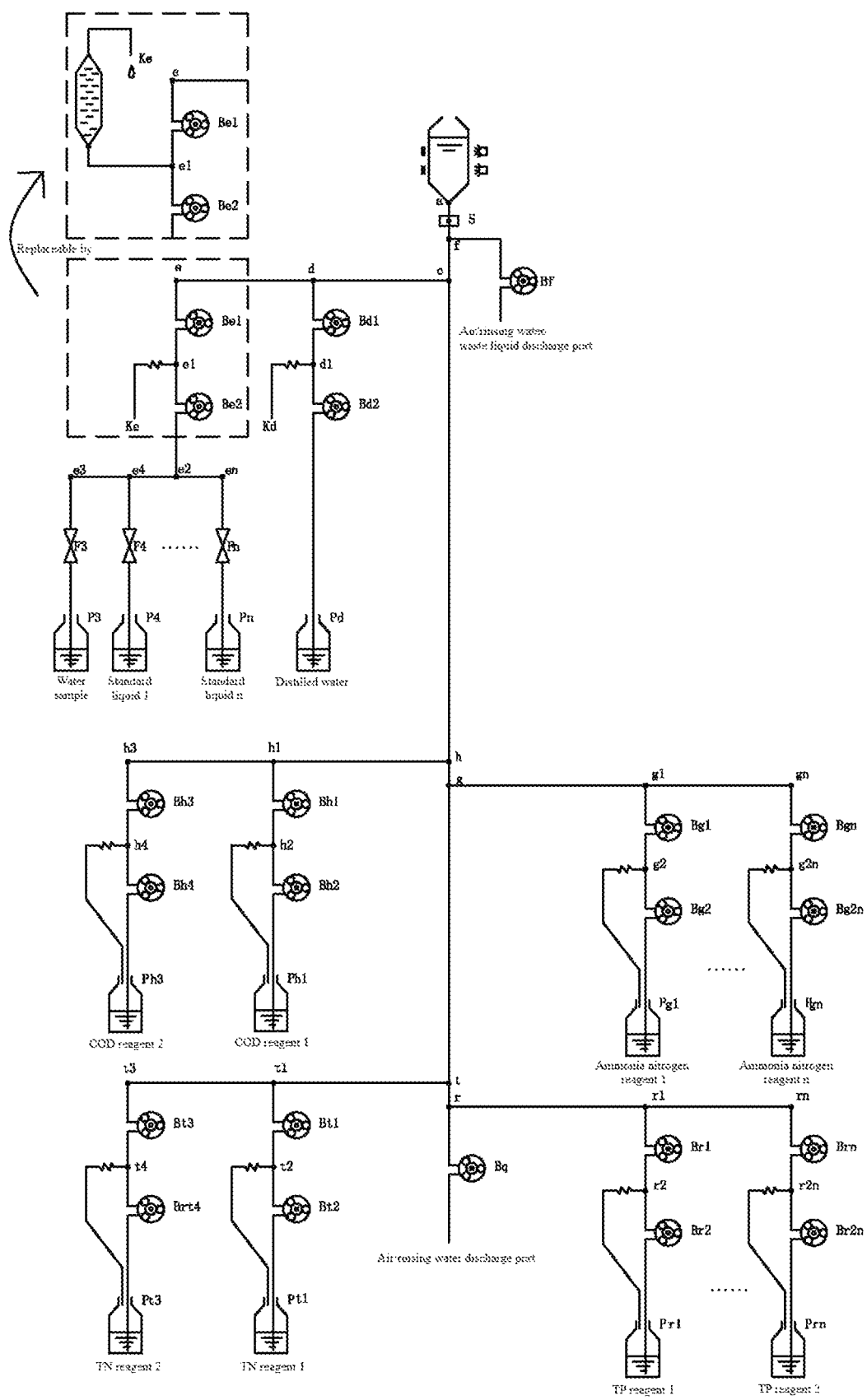

The flow path in FIG. 37 separates out the distilled water branch of the flow path in FIG. 36 as the structure of the "4-basic type" flow path, which can be used to complete metering and volume defining of the diluent distilled water in advance during an dilution operation, thus reducing the liquid preparation time of the dilution operation.

Figure 38:
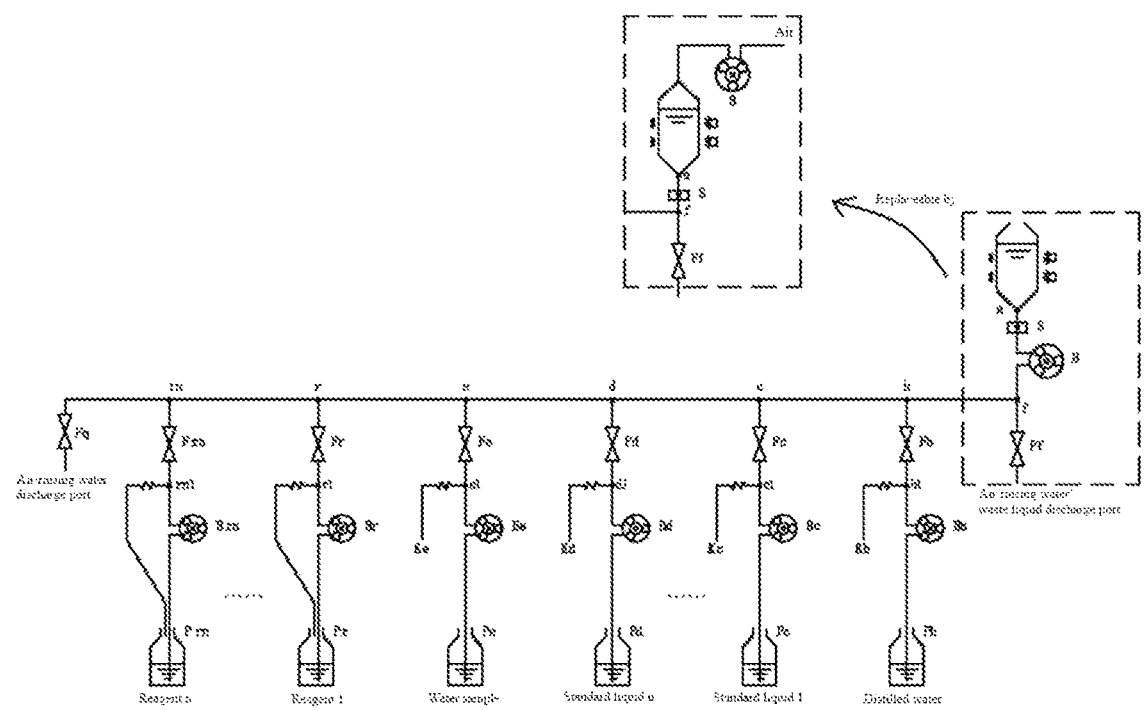
Figure 39:
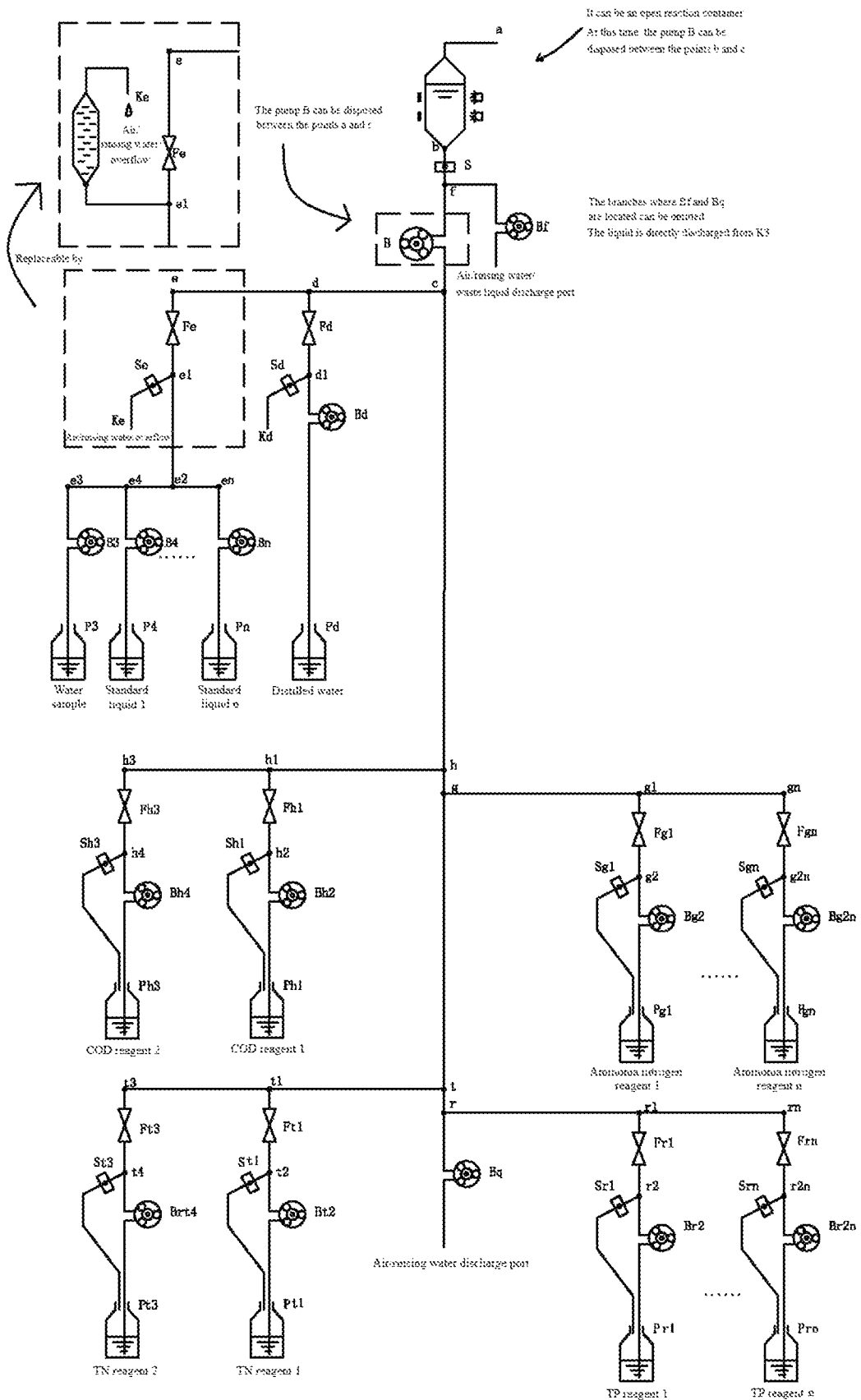

FIG. 38 and FIG. 39 are another practical applied flow path type. In FIG. 38, the main body connected at the bottom of the reaction vessel is one "5-K2-P type" (or "6-K2-P type") combined flow path, the "5-basic type" flow paths (or "6-basic type" flow paths) are connected on the individual intersection points b, c, d, e, r and m, and the left side and the right side of the flow path are respectively provided with one "air/rinsing water/waste liquid discharge port" to realize rapid liquid intake/discharge and complete the dilution function. It should be noted that, the peristaltic pump B at the bottom of the reaction vessel 100 can also be located on a passage connected at the top.

FIG. 39 adopts a combination idea of FIG. 37, except that all the "4-basic type" flow paths and "4-K2-C" type combined flow paths in FIG. 37 are respectively replaced by "5-basic type" (or "6-basic type") flow paths and "5-K2-P type" (or "6-K2-P type") combined flow paths.

Figure 40:
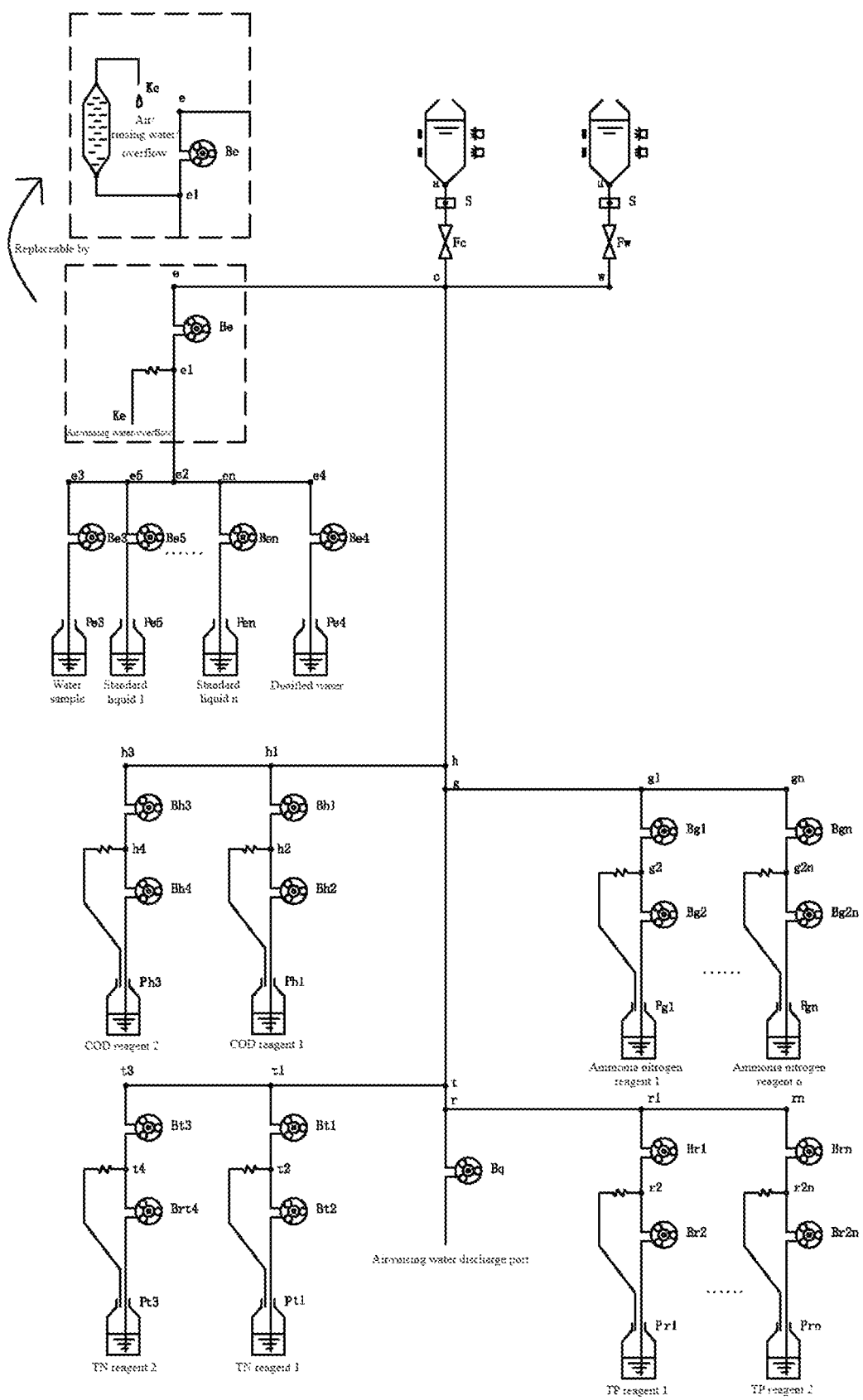
Figure 41:
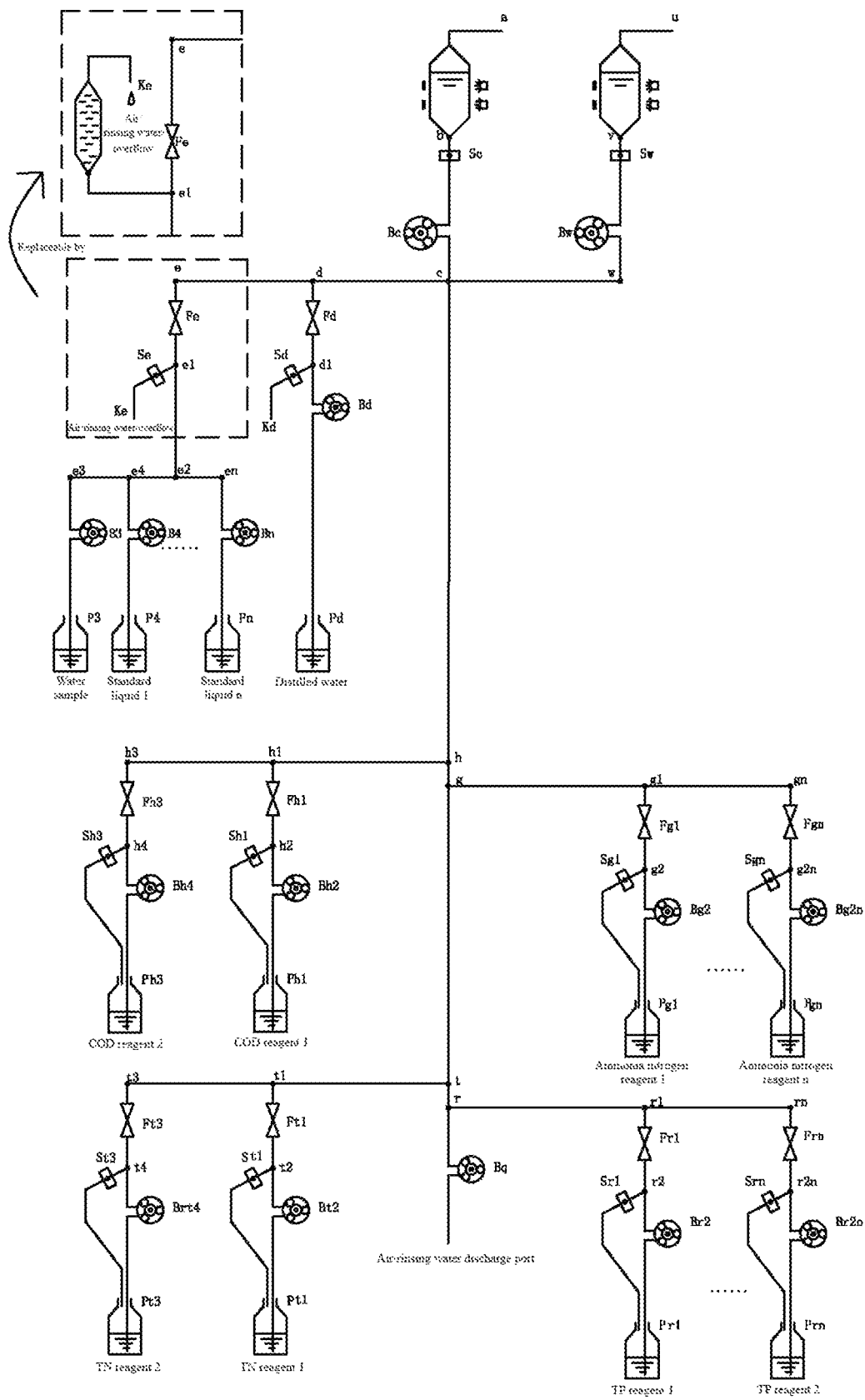
Figure 42:
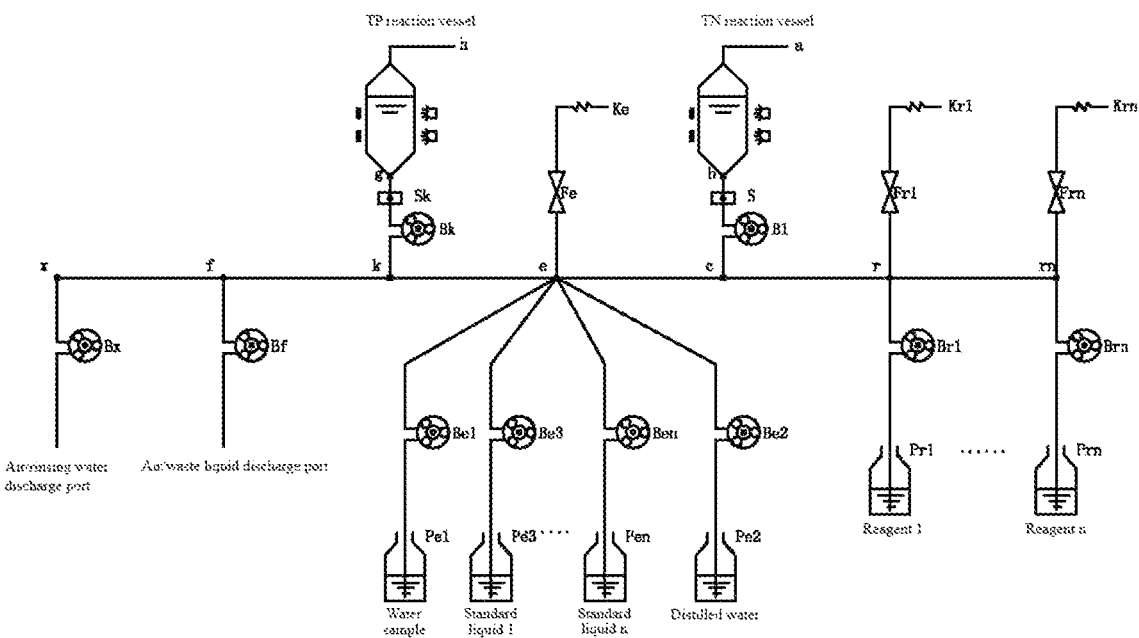

For the purpose of detecting more indices (more reagents needed) or achieving more functions with as few devices as possible, for example, in an analyzer for total phosphorus and total nitrogen, there is one common reagent, and customers wish to own an instrument which has a two-in-one function and can detect total phosphorus and total nitrogen simultaneously. FIG. 40 to FIG. 42 provide several flow paths for solving the above problem.

FIG. 40 is characterized in that one parallel reaction vessel is added beside the original reaction vessel 100 through the intersection point c on the basis of FIG. 36. Bottom passages of the above two reaction vessels are respectively connected in series with one cut-off valve Fc/Fw. By controlling on-off of the cut-off valves Fc and Fw, the individual index reagents connected below the main flow path can be controlled to enter the two different reaction vessels, thereby realizing simultaneous detection of the two indices.

FIG. 41 is characterized in that one parallel reaction vessel is added beside the original reaction vessel 100 through the intersection point c on the basis of FIG. 39. Bottom passages of the above two reaction vessels are respectively connected in series with one peristaltic pump Bc/Bw. By controlling rotation/stop of the peristaltic pump Bc/Bw, the individual index reagents connected below the main flow path can be controlled to enter the two different reaction vessels, thereby realizing simultaneous detection of the two indices. The above peristaltic pump can also be connected in series on a sealed passage at the top of the reaction vessel.

FIG. 42 shows a practical applied flow path based on the H type combined flow path. The flow path only uses a few peristaltic pumps, cut-off valves, liquid detectors and 2 reaction vessels to realize simultaneous inspection of total phosphorus and total nitrogen. Moreover, one reagent end opening as well as water sample, standard liquid and distilled water end openings used for the two indices can be shared as well.

By taking measurement of the water sample as an example, the specific liquid intake and liquid discharge process is as follows: before the operation, the cut-off valves and the peristaltic pumps on all the branches are closed or at rest. First, a cut-off valve Fe is opened, and a peristaltic pump Be1 is rotated counterclockwise, so that the water sample enters the micro tubule at the end e-Ke to overflow and be subjected to volume defining. Afterwards, the peristaltic pump Be1 is closed, and a peristaltic pump Bk is rotated counterclockwise, so that the water sample is sucked into the reaction vessel on the left side from the interior of the micro tubule at the section e-Ke. After that, the water sample is fed into the reaction vessel on the right side according to the same method. Then, the various reagents are sequentially subjected to volume defining in a micro tubule r-Kr1 or a micro tubule rn-Km according to a similar method, and are sucked into the different reaction vessels on the left and right sides for reaction detection. After the detection, Bx, Bf, Bk and B1 (generally, the flow rates of the Bx and Bf are greater than those of the Bk and B1) are rotated clockwise to discharge the liquid.

FIG. 21 to FIG. 42 are schematic diagrams of reaction flow paths in preferred embodiments of the present application respectively. The working process can be selectively applied in conjunction with the basic flow path and combined flow path solutions. As shown in the accompanying drawings of the specification, arrows in the drawings can be used to make corresponding explanations, and can also be used to indicate replacement of adjacent diagrammatic presentations. A zigzag line can represent a long passage. In addition, some end openings can flow back into the container P, so as to save the liquid during overflow and simultaneously avoid polluting the external environment.

In addition, it should be explained that when the working processes of the above basic flow paths, combined flow paths and applied flow paths are described, the liquid intake processes and liquid discharge processes of the various basic flow paths are described in detail, and certain embodiments of the liquid intake processes and liquid discharge processes of the various combined flow paths and applied flow paths are described in detail by way of examples. However, it can be understood to those skilled in the art that, on the basis of the liquid intake and liquid discharge processes of the basic flow paths, among the embodiments of the combined flow paths and applied flow paths and various variations and combinations thereof, possible embodiments which fully utilize the liquid intake and liquid discharge modes of the various basic flow paths and can be carried out synchronously and/or sequentially shall all fall into the scope of the present application, and the scope of the present application is not limited to those embodiments explicitly disclosed in the present application and the accompanying drawings of the specification thereof.

For the sake of brevity, the combined flow paths and applied flow paths and the liquid intake and liquid discharge processes thereof in the present application are not each described in detail, but by way of examples. Therefore, for those skilled in the art, based on what has been disclosed in the present application, other technical contents of the combined flow paths and applied flow paths that have not been described in detail can be obtained. Thus, these technical contents of the combined flow paths and applied flow paths are also considered to be fully disclosed in the present application.

In addition, in order to fully exhibit the structures and operation principles of the technical solutions, the present application is described mainly according to a three-level architecture of the basic flow paths, combined flow paths and applied flow paths, and each solution at each level has its own characteristics in actual industrial application. Therefore, the applicant has designed a patent layout for each technical solution at each level disclosed in the present application, and has successively filed subsequent applications according to the patent layout, so as to fully protect the inventive achievements of the present application by patents.

Figure 43:
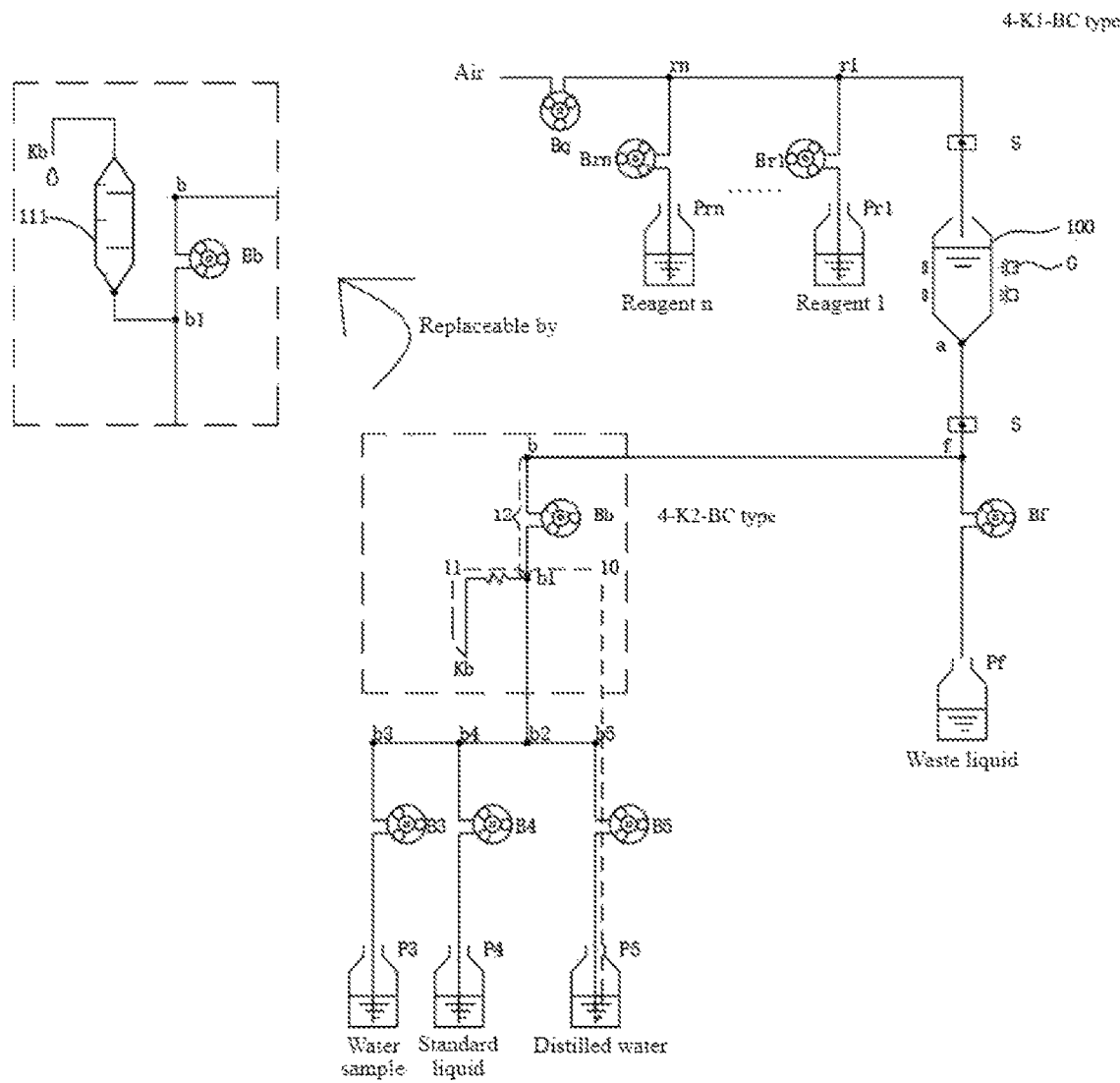

Preferred embodiments of the present application have been described in detail above with reference to the accompanying drawings, but the present application is not limited to the specific details in the above embodiments. Within the technical concept of the present application, many simple modifications can be made to the technical solutions of the present application, and these simple modifications shall all fall into the protection scope of the present application (for example, the flow paths shown in FIG. 43). It should be further noted that the specific technical features described in the above specific embodiments may be combined in any suitable manner in the case of no contradiction. In order to avoid unnecessary repetition, various possible combinations of the present application will not be further described. In addition, any combination of different embodiments of the present application can be made as long as it does not deviate from the idea of the present application, and it should also be regarded as the contents of the present application.

What is claimed is:

1. An apparatus for quantitatively treating a liquid, comprising:
    a container, the container being used for containing a liquid to be extracted; and
    a micro tubule, the micro tubule comprising:
        a flow passage, the flow passage extending outwards from the interior of the container to a bifurcation point;
        a first by-pass, the first by-pass communicating with the flow passage and extending from the bifurcation point to a first port; and
        a second by-pass, the second by-pass communicating with the flow passage and extending from the bifurcation point to a second port;
    wherein a first peristaltic pump is disposed in series in at least one of the flow passage, the first by-pass and the second by-pass, and a first cut-off valve or a second peristaltic pump is disposed in series in at least another of the flow passage, the first by-pass and the second by-pass, so that a predetermined volume of liquid between the bifurcation point and the first port or the second port is intercepted, wherein the micro tubule has a pore diameter ranging from 0.05 mm to 5 mm, preferably from 0.1 mm to 3 mm, more preferably from 0.5 mm to 2 mm;
    wherein the container is a closed container which does not communicate with the atmosphere, the closed container is connected with a pressurization apparatus for increasing the air pressure in the container, and the flow passage extends outwards out of the container from the interior of the container.

2. The apparatus according to claim 1, wherein the first cut-off valve is disposed in series in the flow passage, a third peristaltic pump is disposed in series in the second by-pass, and the third peristaltic pump, the first cut-off valve and the pressurization apparatus cooperate to enable the predetermined volume of liquid between the bifurcation point and the first port to flow out of the first port or the second port.

3. The apparatus according to claim 2, wherein a second cut-off valve is disposed in series in the first by-pass, and the third peristaltic pump also serves as the pressurization apparatus.

4. The apparatus according to claim 2, wherein the pressurization apparatus is a heater disposed in the container, and the heater is used for heating air in the container; or
    the pressurization apparatus comprises an auxiliary container communicating with the atmosphere, and the auxiliary container communicates with the container through a fourth peristaltic pump to pump the liquid in the auxiliary container into the container; or
    the pressurization apparatus comprises the fourth peristaltic pump, and the liquid container communicates with the outside atmosphere through the fourth peristaltic pump.

5. The apparatus according to claim 2, wherein
    the first by-pass is provided with a liquid detector, and the predetermined volume of liquid between the bifurcation point and the first port is the liquid between the bifurcation point and the liquid detector; and/or
    an extension section extending downwards, preferably extending vertically downwards, is disposed at the first port.

6. The apparatus according to claim 5, wherein the liquid between the bifurcation point and the liquid detector is the liquid from the bifurcation point to a predetermined offset point based on the liquid detector.

* * * * *